US012574855B2

(12) United States Patent (10) Patent No.: US 12,574,855 B2
Huang et al. (45) Date of Patent: Mar. 10, 2026

(54) UPLINK TRANSMISSION METHOD, TERMINAL AND NETWORK DEVICE

(71) Applicant: DATANG MOBILE COMMUNICATIONS EQUIPMENT CO., LTD., Beijing (CN)

(72) Inventors: Qiuping Huang, Beijing (CN); Runhua Chen, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 466 days.

(21) Appl. No.: 17/635,679

(22) PCT Filed: Aug. 12, 2020

(86) PCT No.: PCT/CN2020/108635
§ 371 (c)(1),
(2) Date: Feb. 15, 2022

(87) PCT Pub. No.: WO2021/031949
PCT Pub. Date: Feb. 25, 2021

(65) Prior Publication Data
US 2022/0322239 A1 Oct. 6, 2022

(30) Foreign Application Priority Data

Aug. 16, 2019 (CN) .......................... 201910760493.1

(51) Int. Cl.
*H04B 7/06* (2006.01)
*H04L 5/00* (2006.01)
(Continued)

(52) U.S. Cl.
CPC ........ *H04W 52/146* (2013.01); *H04B 7/0639* (2013.01); *H04L 5/0051* (2013.01); *H04W 52/367* (2013.01); *H04W 72/1268* (2013.01)

(58) Field of Classification Search
CPC ................ H04B 7/0636; H04B 7/0639; H04L 5/0048; H04L 5/0051; H04W 52/00;
(Continued)

(56) References Cited

U.S. PATENT DOCUMENTS 11,191,033 B2 * 11/2021 Sridharan ........... H04W 52/545
2011/0081934 A1 4/2011 Imamura et al.
(Continued)

FOREIGN PATENT DOCUMENTS

CN 102714848 A 10/2012
CN 102948226 A 2/2013
(Continued)

OTHER PUBLICATIONS

Extended European Search Report for European Patent Application No. 20854539.2 issued on Jan. 20, 2023 by the European Patent Office.
First Office Action and search report for Chinese Patent Application No. 201910760493.1 issued on Sep. 3, 2021 with English translation provided by applicant's foreign counsel.
(Continued)

*Primary Examiner* — Matthew W Genack
(74) *Attorney, Agent, or Firm* — Ladas & Parry, LLP

(57) ABSTRACT

The present disclosure provides an uplink transmission method, a terminal and a network device. The method includes: receiving uplink scheduling information of uplink; determining transmission power of the uplink signal according to configuration information of a target resource or first indication information from a network device, wherein the target resource includes a sounding reference signal resource configured by the network device for obtaining channel state
(Continued)

Determining reference power corresponding to a precoding matrix in a codebook subset corresponding to an uplink signal according to configuration information of a target resource or using a power determination method indicated by first indication information transmitted to a terminal ⟋ 21

Determining the uplink scheduling information of the uplink signal according to the reference power corresponding to the precoding matrix in the codebook subset corresponding to the uplink signal ⟋ 22

Transmitting the uplink scheduling information to the terminal ⟋ 23 information of uplink, and the first indication information is used to indicate a mode of determining the transmission power of the uplink signal; transmitting the uplink signal according to the transmission power and the uplink scheduling information.

19 Claims, 2 Drawing Sheets

(51) Int. Cl.
| | |
|---|---|
| *H04W 52/14* | (2009.01) |
| *H04W 52/36* | (2009.01) |
| *H04W 72/1268* | (2023.01) |

(58) Field of Classification Search
CPC ............. H04W 52/02; H04W 52/0203; H04W 52/0209; H04W 52/14; H04W 52/146; H04W 52/18; H04W 52/22; H04W 52/221; H04W 52/367; H04W 72/12; H04W 72/1263; H04W 72/1268; H04W 72/20; H04W 72/21
See application file for complete search history.

(56) References Cited

U.S. PATENT DOCUMENTS

| | | | |
|---|---|---|---|
| 2013/0100828 A1 | 4/2013 | Kishiyama et al. | |
| 2014/0226551 A1 | 8/2014 | Ouchi et al. | |
| 2017/0264402 A1 | 9/2017 | Papasakellariou | |
| 2019/0068260 A1 | 2/2019 | Yan et al. | |
| 2019/0199571 A1* | 6/2019 | John Wilson ....... | H04W 52/146 |
| 2020/0154364 A1* | 5/2020 | Rahman ............... | H04B 7/0404 |
| 2020/0267701 A1 | 8/2020 | Park et al. | |

FOREIGN PATENT DOCUMENTS

| | | | |
|---|---|---|---|
| CN | 103843422 A | 6/2014 |
| CN | 106455030 A | 2/2017 |
| CN | 108781152 A | 11/2018 |
| CN | 109565855 A | 4/2019 |
| CN | 109842926 A | 6/2019 |
| WO | 2019193426 A1 | 10/2019 |
| WO | 2020167071 A1 | 8/2020 |

OTHER PUBLICATIONS

International Search Report for PCT Application PCT/CN2020/108635 issued on Nov. 17, 2020 and its English translation provided by WIPO.
International Written Opinion for PCT Application PCT/CN2020/108635 issued on Nov. 17, 2020 and its English translation provided by WIPO.
3GPP TSG RAN WG1#97, Reno, USA, May 13-17, 2019, Agenda Item: 7.2.8.4, R1-1907671, vivo, "Feature lead summary on Full TX Power UL transmission," entire document.
First Korean Office Action for Korean Patent Application No. 10-2022-7008272 issued by the Korean Patent Office on Aug. 21, 2023 and its English Translation provided by the foreign associate.
3rd Generation Partnership Project; Technical Specification Group Radio Access Network; NR; Physical layer procedures for control (Release 15), 3GPP TS 38.213 V15.6.0 (Jun. 2019), all pages.
"Summary on Codebook based UL Transmission," 3GPP TSG RAN WG1 Meeting #94b, R1-1813977, Spokane, USA, Nov. 12-16, 2018, Source: Intel Corporation, Agenda item: 7.1.2.1, all pages.
"On the full Tx Power UL transmission," 3GPP TSG-RAN WG1 Meeting #97, R1-1907318 , Reno, USA, May 13-17, 2019, Source: Nokia, Nokia Shanghai Bell, Agenda item: 7.2.8.4, all pages.
"3rd Generation Partnership Project; Technical Specification Group Radio Access Network; NR; Physical layer procedures for control (Release 15)" 3GPP TS 38.213, Jun. 24, 2019, all pages.
Partial Supplementary European Search Report for European Patent Application 20854539.2 issued by the European Patent Office on Sep. 15, 2022.
"Feature lead summary on Full TX Power UL transmission," 3GPP TSG RAN WG1#96bis, R1-1905637, Xi'an, China, Apr. 8-12, 2019, Source: vivo, Agenda Item: 7.2.8.4, all pages.
"UL MIMO full power transmission with multiple PAs," 3GPP TSG RAN WG1 Meeting #97, R1-1906031, Reno, USA, May 13-17, 2019, Agenda Item: 7.2.8.4, Source: Huawei, HiSilicon, all pages.
"Uplink full Tx power transmission," 3GPP TSG RAN WG1 Meeting #97, R1-1906347, Reno, USA, May 13-17, 2019, Source: CATT, Agenda Item: 7.2.8.4, all pages.
"On Solutions for Full TX UL Transmission," 3GPP TSG RAN WG1 #97, R1-1906862, Reno, US, May 13-17, 2019, Agenda Item: 7.2.8.4, Source: InterDigital Inc. , all pages.
"On the full Tx power UL transmission," 3GPP TSG-RAN WG1 Meeting #97, R1-1907318, Reno, USA, May 13-17, 2019, Agenda Item: 7.2.8.4, Source: Nokia, Nokia Shanghai Bell, all pages.

* cited by examiner

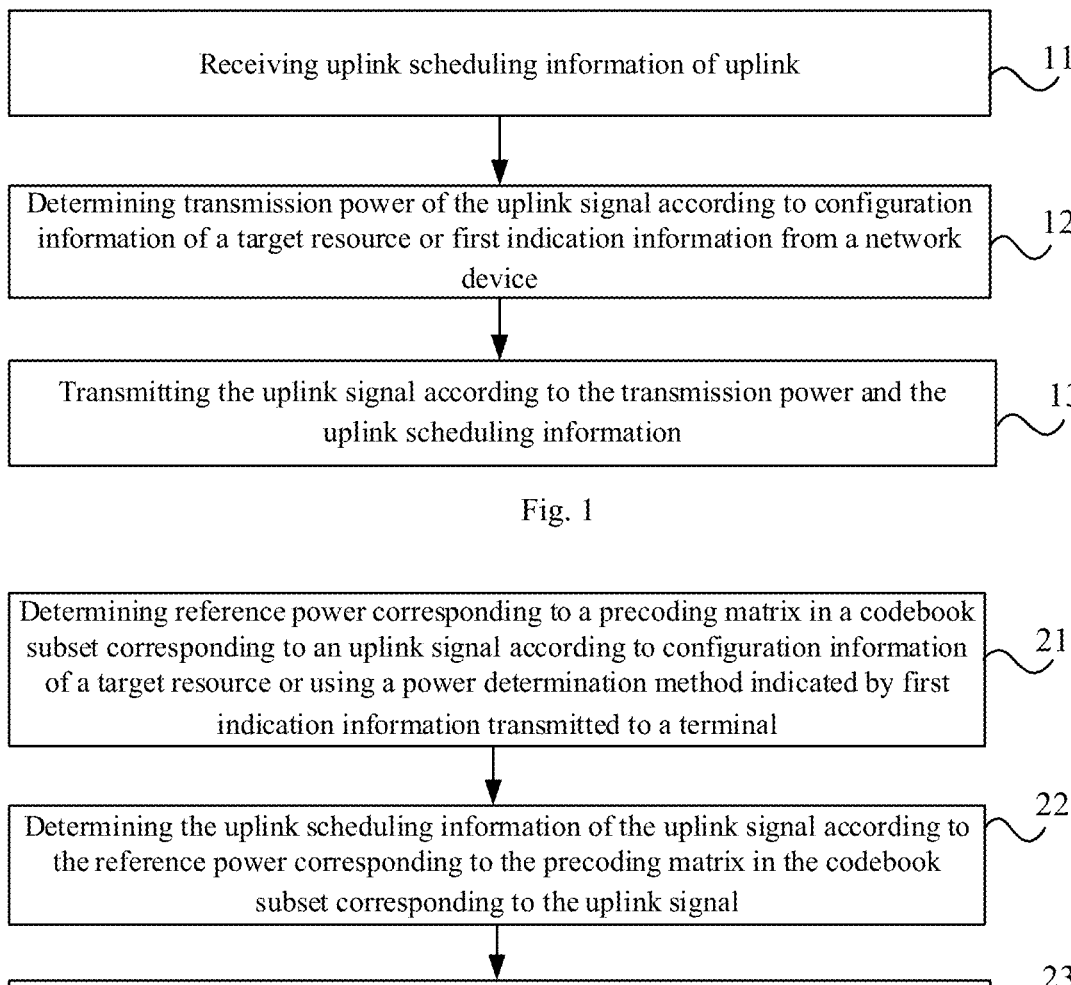

| Receiving uplink scheduling information of uplink | 11 |

| Determining transmission power of the uplink signal according to configuration information of a target resource or first indication information from a network device | 12 |

| Transmitting the uplink signal according to the transmission power and the uplink scheduling information | 13 |

Fig. 1

| Determining reference power corresponding to a precoding matrix in a codebook subset corresponding to an uplink signal according to configuration information of a target resource or using a power determination method indicated by first indication information transmitted to a terminal | 21 |

| Determining the uplink scheduling information of the uplink signal according to the reference power corresponding to the precoding matrix in the codebook subset corresponding to the uplink signal | 22 |

| Transmitting the uplink scheduling information to the terminal | 23 |

Fig. 2

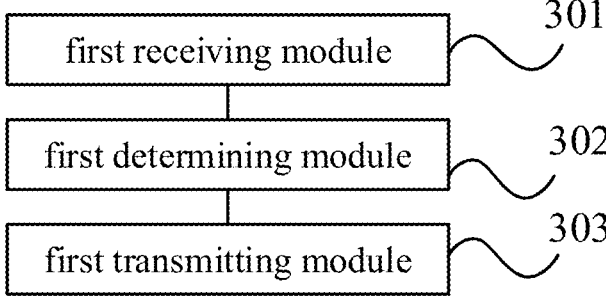

| first receiving module | 301 |
| first determining module | 302 |
| first transmitting module | 303 |

Fig. 3

UPLINK TRANSMISSION METHOD,
TERMINAL AND NETWORK DEVICE

CROSS-REFERENCE TO RELATED
APPLICATIONS

This application is the U.S. national phase of PCT Application No. PCT/CN2020/108635 filed on Aug. 12, 2020, which claims priority to the Chinese patent application No. 201910760493.1 filed on Aug. 16, 2019, the disclosures of which are incorporated herein by reference in their entireties.

TECHNICAL FIELD

The present disclosure relates to the field of communications technology, in particular to an uplink transmission method, a terminal and a network device.

BACKGROUND

A user equipment (UE) may have multiple power amplifiers (PA), and coherent transmission or non-coherent transmission may be possible between different PAs. The codebook design of the New Radio (NR) system takes into account the coherent transmission capability of the antenna of the UE.

The base station can configure the following three codebook subset constraints for the UE through the radio resource control (RRC) signaling 'codebookSubset':

fullyAndPartialAndNonCoherent
    partialAndNonCoherent
    nonCoherent

The codebook subset corresponding to nonCoherent is all precoding codewords in the codebook that correspond to any one data stream and are transmitted through only one antenna port;

The codebook subset corresponding to partialAndNonCoherent is all codewords in the codebook that meet the following conditions: precoding codewords of any data stream transmitted through one antenna port, or the first and third ports, or the second and fourth ports;

The codebook subset corresponding to fullyAndPartialAndNonCoherent is all codewords in the codebook.

Correspondingly, the NR system defines the physical uplink shared channel (PUSCH) coherent transmission capability pusch-TransCoherence of the UE, and the UE reports the antenna coherent transmission capability of the UE by reporting the codebook subset constraints supported by the UE. pusch-TransCoherence includes the following three values:

nonCoherent,
    partialNonCoherent,
    fullCoherent.

When the capability reported by the UE is nonCoherent, the base station can only configure the nonCoherent codebook subset constraints for the UE; when the capability reported by the UE is partialNonCoherent, the base station can configure the nonCoherent or partialAndNonCoherent codebook subset constraints for the UE; when the capability supported by the UE is fullCoherent, the base station can configure nonCoherent or partialAndNonCoherent or fullyAndPartialAndNonCoherent codebook subset constraints for the UE. It can be seen that the base station needs to configure the codebook subset constraints according to the PUSCH coherent transmission capability reported by the UE.

In addition, the terminal determines the precoding and transmission stream number indication information in the downlink control information (DCI) according to the codebooksubset indicated by the base station, the number of antenna ports of the PUSCH, the maximum number of transmission streams maxRank of the PUSCH, and the uplink transmission waveform, and decodes the precoding and transmission stream number indication information in the DCI according to the overhead to determine the precoding and transmission stream number corresponding to PUSCH transmission.

Correspondingly, in the NR system, the multi-antenna power allocation method of PUSCH using the codebook-based uplink multiple-input multiple-output technology (MIMO) is that, if the number of antenna ports triggered by DCI format 0_1 and of each Sounding reference signal (SRS) resource is greater than 1, and the UE will scale the PUSCH transmission power calculated according to the uplink power control formula (in the Rel-15 and Rel-16 versions of the NR system, it corresponds to $P_{PUSCH,b,f,c}(i, j, q_d, l)$ in section 7.1.1 of the protocol TS 38.2130 in the first 3rd Generation Partnerships Project (3GPP)) according a proportion of the number of ports on which non-zero signals are actually transmitted to the maximum number of SRS ports in one SRS resource supported by the terminal, and then the scaling power is evenly divided among the antenna ports on which the signals are actually transmitted.

For example, suppose the maximum number of SRS ports in one SRS resource supported by the terminal is 4, the uplink transmission is configured with 4 antenna ports, the precoding matrix indicated by the base station is $$\frac{1}{2}\begin{bmatrix}1\\0\\1\\0\end{bmatrix},$$

and the transmission power calculated by the UE according to the PUSCH power control formula is P, the actual transmission power of PUSCH is P/2, and the transmission power of the first antenna port and the transmission power of the third antenna port are each P/4. This scaling does not require that each antenna port of the UE can reach the maximum transmission power, thus allowing the UE to use lower-cost radio frequency components to implement multi-antenna functions.

Moreover, in the related art, the terminal determines the transmission power of the uplink signal based on a predefined PUSCH power control rule, which is only applicable to a scenario that the number of antenna ports of the SRS resource configured by the base station for the UE to obtain channel state information (CSI) is greater than 1 and less than the maximum number of ports in one SRS resource supported by the terminal, it cannot be applied to more scenarios.

SUMMARY

An object of the present disclosure is to provide an uplink transmission method, a terminal and a network device, so as to solve the problem that the method of determining the transmission power of the uplink signal in the related art cannot apply to more resource configuration scenarios.

An embodiment of the present disclosure provides an uplink transmission method, applied to a terminal, includes: receiving uplink scheduling information of uplink; determining transmission power of the uplink signal according to configuration information of a target resource or first indication information from a network device, wherein the target resource includes a sounding reference signal resource configured by the network device for obtaining channel state information of uplink, and the first indication information is used to indicate a mode of determining the transmission power of the uplink signal; transmitting the uplink signal according to the transmission power and the uplink scheduling information.

An embodiment of the present disclosure provides an uplink transmission method, applied to a network device, includes: determining reference power corresponding to a precoding matrix in a codebook subset corresponding to an uplink signal according to configuration information of a target resource or using a power determination method indicated by first indication information transmitted to a terminal, wherein the target resource includes a sounding reference signal resource configured by the network device for obtaining channel state information of uplink, and the first indication information is used to indicate a mode of determining transmission power of the uplink signal by the terminal; determining uplink scheduling information of uplink according to the reference power corresponding to the precoding matrix in the codebook subset corresponding to the uplink signal; transmitting the uplink scheduling information to the terminal.

An embodiment of the present disclosure provides a user equipment, including: a transceiver, a memory, a processor, and a computer program stored in the memory and executed by the processor, wherein the computer program is executed by the processor to implement the following steps: receiving uplink scheduling information of uplink; determining transmission power of the uplink signal according to configuration information of a target resource or first indication information from a network device, wherein the target resource includes a sounding reference signal resource configured by the network device for obtaining channel state information of uplink, and the first indication information is used to indicate a mode of determining the transmission power of the uplink signal; transmitting the uplink signal according to the transmission power and the uplink scheduling information.

An embodiment of the present disclosure provides a network device, including: a transceiver, a memory, a processor, and a computer program stored in the memory and executed by the processor, wherein the computer program is executed by the processor to implement the following steps: determining reference power corresponding to a precoding matrix in a codebook subset corresponding to an uplink signal according to configuration information of a target resource or using a power determination method indicated by first indication information transmitted to a terminal, wherein the target resource includes a sounding reference signal resource configured by the network device for obtaining channel state information of uplink, and the first indication information is used to indicate a mode of determining transmission power of the uplink signal by the terminal; determining uplink scheduling information of uplink according to the reference power corresponding to the precoding matrix in the codebook subset corresponding to the uplink signal; transmitting the uplink scheduling information to the terminal.

An embodiment of the present disclosure provides a user equipment, including: a first receiving module, configured to receive uplink scheduling information of uplink; a first determining module, configured to determine transmission power of the uplink signal according to configuration information of a target resource or first indication information from a network device, wherein the target resource includes a sounding reference signal resource configured by the network device for obtaining channel state information of uplink, and the first indication information is used to indicate a mode of determining the transmission power of the uplink signal; a first transmitting module, configured to transmit the uplink signal according to the transmission power and the uplink scheduling information.

An embodiment of the present disclosure provides a network device, including: a transceiver, a memory, a processor, and a computer program stored in the memory and executed by the processor, wherein the computer program is executed by the processor to implement the following steps: determining reference power corresponding to a precoding matrix in a codebook subset corresponding to an uplink signal according to configuration information of a target resource or using a power determination method indicated by first indication information transmitted to a terminal, wherein the target resource includes a sounding reference signal resource configured by the network device for obtaining channel state information of uplink, and the first indication information is used to indicate a mode of determining transmission power of the uplink signal by the terminal; determining uplink scheduling information of uplink according to the reference power corresponding to the precoding matrix in the codebook subset corresponding to the uplink signal; transmitting the uplink scheduling information to the terminal.

An embodiment of the present disclosure provides a computer-readable storage medium with a computer program stored thereon, wherein the program is executed by a processor to implement the uplink transmission method.

The beneficial effect of the above technical solutions are as follows.

The embodiments of the present disclosure can determine the transmission power of the uplink signal according to the configuration information of the sounding reference signal resource configured by the network device for the terminal to obtain the channel state information of uplink, or the indication information from the network device, so that the uplink signal can be transmitted according to the received uplink scheduling information of uplink and the transmission power. Therefore, the embodiments of the present disclosure determine the transmission power of the uplink signal according to the configuration information of the sounding reference signal resource configured by the network device for the terminal to obtain the channel state information of uplink or the specific instruction of the network device, so that the uplink signal can use different uplink transmission power under different SRS resource configuration information, better uplink transmission performance can be obtained for different application scenarios.

BRIEF DESCRIPTION OF THE DRAWINGS

FIG. 1 is a schematic flowchart of an uplink transmission method according to an embodiment of the present disclosure;

FIG. 2 is another schematic flowchart of an uplink transmission method according to an embodiment of the present disclosure;

FIG. 3 a schematic diagram of modules of a UE according to an embodiment of the disclosure;

DETAILED DESCRIPTION

Figure 4:
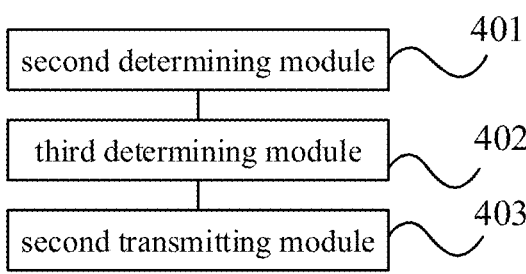
FIG. 4 a schematic diagram of modules of a network device according to an embodiment of the disclosure.

In order to make the technical problems, technical solutions, and advantages to be solved by the present disclosure clearer, a detailed description will be given below in conjunction with the accompanying drawings and specific embodiments. In the following description, specific details such as specific configurations and components are provided only to facilitate a comprehensive understanding of the embodiments of the present disclosure. Therefore, it should be clear to those skilled in the art that various changes and modifications can be made to the embodiments described herein without departing from the scope and spirit of the present disclosure. In addition, for clarity and conciseness, descriptions of known functions and configurations are omitted.

It should be understood that "one embodiment" or "an embodiment" mentioned throughout the specification means that a specific feature, structure, or characteristic related to the embodiment is of at least one embodiment of the present disclosure. Therefore, "in one embodiment" or "in an embodiment" throughout the specification do not necessarily refer to the same embodiment. In addition, these specific features, structures, or characteristics can be combined in one or more embodiments in any suitable manner.

In the various embodiments of the present disclosure, it should be understood that the size of the sequence number of the following processes does not mean the order of execution. The execution order of each process should be determined by its function and internal logic, and should not constitute any limitation on the implementation process of the present disclosure.

In addition, the terms "system" and "network" in the disclosure are often used interchangeably.

In the embodiments provided in the present disclosure, it should be understood that "B corresponding to A" means that B is associated with A, and B can be determined according to A, or A can be determined according to B, or there are some commonalities between A and B or other information can be determined jointly based on A and B. However, it should also be understood that determining B based on A does not mean that B is determined only based on A, and B can also be determined based on A and/or other information.

In the embodiments of the present disclosure, the form of the access network is not limited, and may include Macro Base Station, Pico Base Station, Node B (3G mobile base station), enhanced base station (eNB), gNB (5G mobile base station), home enhanced base station (Femto eNB or Home eNode B or Home eNB or HeNB), relay station, access point, remote radio unit (RRU), remote radio head (RRH) and other access networks. The UE can be a mobile phone or a cell phone, or other equipment capable of transmitting or receiving wireless signals, including user equipment, personal digital assistants (PDAs), wireless modems, wireless communication devices, handheld devices, laptops, cordless phones, Wireless Local Loop (WLL) stations, Customer Premise Equipment (CPE) that can convert mobile signals into wireless fidelity (WiFi) signals, or mobile smart hotspots, smart home appliances or other devices that can spontaneously communicate with the mobile communication network without human operation.

In the description of the embodiments of the present disclosure, the related art is first explained.

In the present disclosure, antenna ports are used in many places. For the convenience of description, in part of the content in the present disclosure, signal ports are directly described as antenna ports of signals. For example, the PUSCH port is described as the antenna port of the PUSCH, the SRS port is described as the antenna port of the SRS, etc., or the port of a certain signal is directly described as the antenna port. It should be understood that these are content that can be understood by those skilled in the art.

In the current uplink transmission scheme and power control scheme, when the number of antenna ports of SRS resources obtained by the channel state information (CSI) configured by the base station for the UE is greater than 1 and less than maximum number of ports of one SRS resource supported by the terminal, no matter what kind of precoding matrix indicted by the base station for the UE, the terminal cannot perform full power transmission of the PUSCH. When the number of antenna ports of the SRS resource configured for the UE for CSI acquisition by the base station is equal to the maximum number of ports in one SRS resource supported by the terminal, and the precoding matrix indicated by the base station for the UE is a non-coherent codeword or a partially coherent codeword, the UE cannot perform full power transmission. When the PUSCH coherent transmission capability pusch-TransCoherence of the UE is partialNonCoherent or nonCoherent, since the base station cannot configure fullyAndPartialAndNonCoherent codebook subset constrains for the UE, the UE cannot perform full power uplink transmission.

In order to solve the problem that the UE cannot perform full power transmission, the R16 version of the 3GPP NR system determines to introduce three full power transmission capabilities of the terminal, which are respectively:

Capability 1: Each PA of the terminal can perform maximum power transmission with the terminal power class (PC) capability.

Capability 2: The terminal supports full power transmission, but the transmission power of no PA can reach the maximum transmission power with the terminal PC capability.

Capability 3: The terminal supports full power transmission, and the transmission power of some PAs can reach the maximum transmission power with the terminal PC capability.

In order to solve the problem that the UE cannot perform full power transmission, in the 3GPP RANI #97 meeting, it was proposed to allow the UE to perform uplink transmission by using the following transmission methods:

The UE can configure one SRS resource or multiple SRS resources including different numbers of SRS ports in the SRS resource set in which usage is set as "codebook". Among them, the UE uses the same antenna virtualization method to transmit SRS and PUSCH, uses R15 codebook and codebook subset constrains, and performs full power transmission based on the indicated SRS resource indicator (SRI) and/or transmission precoding matrix indicator (TPMI). In addition, when the SRS resource is greater than one port, the UE can indicate a group of TPMIs that can be transmitted at full power for the UE of capability 3.

Specifically, for example: when the SRS resource indicated by the SRI includes one port, a single-port SRS transmission method is adopted to transmit a single-stream PUSCH with full power. If the SRS resource indicated by the SRI includes multiple ports, in addition to power control scaling, MIMO behavior of R15 is adopted for other aspects (determining the number of transmission streams, TPMI indicator, etc.).

It can be seen from the above that in the related art, the terminal determines the transmission power of the uplink signal based on a predefined PUSCH power control rule. In the related art, multiple PUSCH power control rules are not supported, and no terminal has multiple PUSCH power controls in the system. The introduction of multiple PUSCH power control rules into the system can fully use the transmission power of the terminal. Therefore, it is necessary to consider how the terminal determines the PUSCH power control rule.

In addition, the terminal determines the precoding matrix indicated by the base station according to the high-level signaling codebooksubset indicated by the base station, the number of antenna ports of PUSCH, the maximum number of PUSCH transmission streams maxRank, and the uplink transmission waveform. The current method is only applicable to a scenario where the number of ports of SRS resources of the transmitted SRS resource set is the same, and is not applicable to the scenario where the number of ports of SRS resources of the codebook-based uplink transmission SRS resource set is different. When the SRS resources of the codebook-based uplink transmission SRS resource set can be configured as different ports, the terminal can use antenna virtualization to realize the transmission of some ports. At this time, the coherent transmission relationship between the antenna ports may be changed. In the related art, the method of determining the codebook subset corresponding to PUSCH transmission has greater limitations.

The First Embodiment

The embodiments of the present disclosure provide an uplink transmission method, which is applied to a terminal, and solves the problem that the method for determining the transmission power of an uplink signal in the related art cannot be applied to scenarios with more resource configurations.

As shown in FIG. 1, the uplink transmitting method of the embodiment of the present disclosure specifically includes the following steps:

Step 11: Receiving uplink scheduling information of uplink.

Wherein, before step 11, the base station transmits the SRS resource configuration information of uplink to the terminal, and the terminal transmits the SRS based on the SRS resource configuration information of the received uplink signal. The base station calculates the reference power according to the resource configuration information of uplink or the first indication information transmitted to the terminal (that is, in the same way that the terminal determines the transmission power of the uplink signal), and then, according to the reference power, and based on the SRS transmitted by the terminal, determines the scheduling information of uplink, so as to transmit the scheduling information of uplink to the terminal.

Optionally, the uplink signal is a PUSCH signal based on a codebook.

Step 12: Determining transmission power of the uplink signal according to configuration information of a target resource or first indication information from a network device.

Wherein, the target resource includes a sounding reference signal resource configured by the network device for obtaining the channel state information of uplink, and the first indication information is used to indicate a method of determining the transmission power of the uplink signal.

Step 13: Transmitting the uplink signal according to the transmission power and the uplink scheduling information.

It can be seen that in the embodiments of the present disclosure, the transmission power of the uplink signal is determined based on the configuration information of the sounding reference signal resource configured by the network device for the user equipment for obtaining the channel state information of uplink or the specific instructions of the network device, so that different uplink transmission power are used for the uplink signal under different SRS resource configuration information, better uplink transmission performance can be obtained for different application scenarios.

Optionally, the determining the transmission power of the uplink signal according to the configuration information of the target resource includes:

Determining the transmission power of the uplink signal according to a number of antenna ports of a target resource or a number of antenna ports of a first resource in the target resource;

Wherein, the first resource is a sounding reference signal resource indicated by a sounding reference signal resource indicator, or all sounding reference signal resources of a first sounding reference signal resource set, and the first sounding reference signal resource set is a resource set in which a sounding reference signal resource indicated by the sounding reference signal resource indicator is configured.

It can be seen that the transmission power of the uplink signal can be determined according to the number of antenna ports of the target resource, or the number of antenna ports of the resource indicated by the SRI, or the number of antenna ports of all resources in the resource set in which the resource indicated by the SRI is configured.

Wherein, the target resource may include one SRS resource, or may include multiple SRS resources, then when the target resource includes one SRS resource, the transmission power of the uplink signal may be determined by any one of the following Mode 1 and Mode 2.

Mode 1: When the uplink signal is a codebook-based PUSCH signal, the first basic power is multiplied by a first ratio to obtain the first scaling power, and the first scaling power is split equally across the antenna ports with non-zero power of PUSCH, the first ratio is $N/M_1$, N represents the number of antenna ports with a non-zero transmission power of PUSCH, and $M_1$ represents the maximum number of antenna ports of one SRS resource supported by the terminal;

Mode 2: When the uplink signal is a codebook-based PUSCH signal, the first basic power is multiplied by a second ratio to obtain the second scaling power, and the second scaling power is split equally across antenna ports with non-zero power of PUSCH, the second ratio is $N/M_2$, N represents the number of antenna ports with a non-zero transmission power of PUSCH, and $M_2$ represents the number of antenna ports of the SRS resource used to determine the precoding matrix of the uplink signal.

Optionally, when the capability of the terminal is to support combination of any two antenna ports to transmit the uplink signal with full power, the terminal uses the following mode to determine the transmission power of the PUSCH: the first basic power is multiplied by the third ratio to obtain the third scaling power, and the third scaling power is split equally across the antenna ports with non-zero power of the uplink signal, and the third ratio is $\min\{2*N/M_2, 1\}$, N represents the antenna ports with a non-zero transmission power of the uplink signal, and $M_2$ represents the number of antenna ports of the sounding reference signal resource used to determine the precoding matrix of the uplink signal.

Optionally, when the capability of the terminal is to support combination of any two antenna ports to transmit the uplink signal with full power, the terminal uses the following mode to determine the transmission power of the PUSCH: the first basic power is multiplied by the fourth ratio to obtain the fourth scaling power, and the fourth scaling power is split equally across the antenna ports with non-zero power of the uplink signal, and the fourth ratio is $\min\{2*N/M_1, 1\}$, N represents the antenna port with a non-zero transmission power of the uplink signal, and $M_1$ represents the maximum number of antenna ports supported by the terminal in one SRS resource.

Optionally, when the target resource includes at least two sounding reference signal resources, the determining the transmission power of the uplink signal according to the number of antenna ports of the target resource includes:

Determining whether the SRS resources in the target resource are with the same number of antenna ports, and obtaining a first determination result;

Determining the transmission power of the uplink signal according to the first determination result.

Wherein one SRS resource corresponds to a number of antenna ports (for ease of description, the SRS port of the SRS resource is described as the antenna port of the SRS resource), then when the target resource includes multiple SRS resources, there are multiple antenna ports of the target resource.

In addition, when determining the transmission power of the uplink signal according to the first determination result, any of the following mode 1, mode 2, and mode 3 may be specifically adopted:

Mode 1: The determining the transmission power of the uplink signal according to the first determination result includes:

In the case that the first determination result indicates that the number of antenna ports of the SRS resources in the target resource is the same and the number of antenna ports of the target resource is all greater than 1, the predetermined first basic power is multiplied by the first ratio to obtain the first scaling power, and the first scaling power is split equally across the antenna ports with non-zero power of the uplink signal, the first ratio is $N/M_1$, and N represents the number of a non-zero transmission power with non-zero power of the uplink signal, $M_1$ represents the maximum number of antenna ports supported by the terminal in one SRS resource;

In the case that the first determination result indicates that at least part of numbers of antenna ports of the SRS resources in the target resource is different, the predetermined first basic power is multiplied by a second ratio to obtain the second scaling power, and the second scaling power is split equally across the antenna ports with non-zero power of the uplink signal, the second ratio is $N/M_2$, and N represents the number of antenna ports with the non-zero transmission power of the uplink signal, $M_2$ represents the number of antenna ports of the sounding reference signal resource used to determine the precoding matrix of the uplink signal.

Mode 2: The determining the transmission power of the uplink signal according to the first determination result includes:

In the case that the first determination result indicates that the number of antenna ports of the SRS resources in the target resource is the same and the number of antenna ports of the target resource is all greater than 1, the predetermined first basic power is multiplied by the first ratio to obtain the first scaling power, and the first scaling power is split equally across the antenna ports with non-zero power of the uplink signal, the first ratio is $N/M_1$, and N represents the number of antenna ports with non-zero power of the uplink signal, $M_1$ represents the maximum number of antenna ports supported by the terminal in one SRS resource;

When the first determination result indicates that at least part of the numbers of antenna ports of the target resource are different, and the number of antenna ports of the sounding reference signal resource indicated by the sounding reference signal resource indicator is less than $M_1$, it is determined that the uplink signal is transmitted with full power;

When the first determination result indicates that at least part of the numbers of antenna ports of the target resource is different, and the number of antenna ports of the sounding reference signal resource indicated by the sounding reference signal resource indicator is equal to $M_1$, the predetermined first basic power is multiplied by the first ratio to obtain the first scaling power, and the first scaling power is split equally across the antenna ports with non-zero power of the uplink signal, and the first ratio is $N/M_1$, N represents the number of antenna ports with a non-zero transmission power of the uplink signal, and $M_1$ represents the maximum number of antenna ports supported by the terminal in one SRS resource.

Mode 3: The determining the transmission power of the uplink signal according to the first determination result includes:

In the case that the terminal has the first preset capability, and the first determination result indicates that the number of antenna ports of the target resource is the same and the number of antenna ports of the target resource is greater than one, the predetermined first basic power is multiplied by a first ratio to obtain the first scaling power, and the first scaling power is split equally across the antenna ports with non-zero power of the uplink signal, the first ratio is $N/M_1$, N represents the number of antenna ports with a non-zero transmission power of the uplink signal, and $M_1$ represents the maximum number of antenna ports supported by the terminal in one SRS resource;

In the case that the terminal has the first preset capability, and the first determination result indicates that at least part of the numbers of antenna ports of the target resource are different, the predetermined first basic power is multiplied by the third ratio to obtain the third scaling power, and the third scaling power is split equally across the antenna ports with non-zero power of the uplink signal, and the third ratio is $\min\{2*N/M_2, 1\}$, N represents the antenna ports with a non-zero transmission power of the uplink signal, and $M_2$ represents the number of antenna ports of the sounding reference signal resource used to determine the precoding matrix of the uplink signal;

The first preset capability includes at least one of supporting transmitting the uplink signal with full power, supporting being configured with a plurality of sounding reference signal resources for obtaining the channel state information of uplink that associated with different numbers of antenna ports, or supporting transmitting the uplink signal with full power with any two antenna ports.

Wherein, min$\{2^*N/M_2, 1\}$ is the smaller one of $2^*N/M_2$ and 1. When the target resource includes one SRS set, the sounding reference signal resource used to determine the precoding matrix of the uplink signal is the target resource; when the target resource includes multiple SRS resources, the sounding reference signal resource used to determine the precoding matrix of the uplink signal is the SRS resource indicated by the SRI.

In addition, it should be noted that the terminal transmitting PUSCH with full power is defined in this embodiment, that is, without considering the simultaneous transmission of PUSCH and other signals, the uplink transmission power corresponding to at least one precoding codeword under the limitation of the uplink codebook subset is the transmission power of the PUSCH calculated according to the uplink power control formula (for example, in the NR system, corresponding to the transmission power of the PUSCH calculated in section 7.1.1 of the 3GPP protocol TS 38.213. When the transmission behavior of the terminal which does not meet the definition of the full power transmission is not full power transmission. If PUSCH and other signals (such as PUCCH or SRS) are transmitted at the same time (in a frequency division multiplexing manner), the transmission power of the terminal may need to be scaled according to the power of each signal. At this time, the transmission power of PUSCH needs to be multiplied by a coefficient related to signal multiplexing. In this case, the terminal transmits PUSCH with full power. In addition, if the transmission of PUSCH is single-port transmission, the terminal transmits the PUSCH with the PUSCH transmission power calculated according to the uplink power control formula (for example, in the NR system, corresponding to the transmission power of PUSCH calculated in section 7.1.1 of the 3GPP protocol TS 38.213), it is considered to be full power transmission.

Optionally: the determining whether the number of antenna ports of the target resource are the same includes:

In the case that the terminal has a second preset capability, determining whether the number of antenna ports of the target resource is the same.

Optionally, in a case that the terminal has the third preset capability, the transmission power of the uplink signal is determined according to a predetermined first power control rule.

That is, when the terminal has one or more capabilities, it is determined whether the number of antenna ports of the target resource is the same, and the transmission power control rule of the uplink signal is determined based on the determination result, and the transmission power of the uplink signal is determined based on the transmission power control rule; other transmission power control rules are used under other capabilities.

Optionally, the second preset capability or the third preset capability includes at least one of the following:

coherent transmission capability of the terminal;
codebook subset constraint information supported by the terminal;
indication information of codebook subset constraint transmitted with full power supported by the terminal, wherein the codebook subset that can be transmitted with full power means that there is at least one precoding matrix in the codebook subset so that the terminal can transmit uplink signals with full power;
power amplifier PA capability of the terminal;

full power transmission capability of the antenna port of the terminal;
capability that whether the terminal supports to transmit PUSCH using a precoding matrix that exceeds the PUSCH coherent transmission capability of the terminal;
full power transmission capability of the terminal.

Optionally, the determining the transmission power of the uplink signal according to the configuration information of the target resource includes:

In a case that the configuration information of the target resource is first preset configuration information, determining the transmission power of the uplink signal according to the capability information of the terminal;
In a case that the configuration information of the target resource is second preset configuration information, determining the transmission power of the uplink signal according to a predetermined second power control rule.

That is, under one or more SRS resource configurations, the transmission power of the uplink signal is determined based on the capability of the terminal, and under other SRS resource configurations, the transmission power of the uplink signal can be determined without the ability of the terminal.

Wherein, the first preset resource configuration may be a predefined configuration information of a target resource. For example, the number of antenna ports of the target resource is a predefined value, such as 4. For another example, the first preset resource configuration is the number of antenna ports of the target resource being equal to the maximum number of antenna ports supported by the terminal for PUCSH transmission. For another example, an example of the first preset resource configuration is: the target resource includes multiple SRS resources, and at least two SRS resources include different numbers of antenna ports.

The second preset resource configuration may be another predefined configuration information of the target resource, for example, the number of antenna ports of the target resource is 2. For another example, the second preset resource configuration is the number of antenna ports of the target resource being less than the maximum number of antenna ports supported by the terminal for PUCSH transmission. For another example, an example of the second preset resource configuration is: the target resource includes one SRS resource or multiple SRS resources including the same number of antenna ports.

Optionally, the target resource includes at least two sounding reference signal resources;

When the first resource is all the sounding reference signal resources of the first sounding reference signal resource set, the determining the transmission power of the uplink signal according to the number of antenna ports of the first resource in the target resource includes:

Determining whether the number of antenna ports of the first resource are the same, and obtaining a second determination result;
Determining the transmission power of the uplink signal according to the second determination result.

That is, in the case that the target resource includes multiple SRS resources, the transmission power of the uplink signal may be further determined according to the number of antenna ports of the SRS resource of the SRS resource set in which the SRS resource indicated by the SRI is configured.

Wherein, SRI is SRS resource indication information, which is used to indicate the SRS resource corresponding to the SRS for determining the precoding matrix of the uplink signal, or used to indicate the SRS resource corresponding to the SRS for determining the analog beamforming of the uplink signal.

Optionally, when determining the transmission power of the uplink signal according to the second determination result, any one of the following mode 1, mode 2, and mode 3 may be specifically adopted:

Mode 1: When the second determination result indicates that the number of antenna ports of the first resource is the same and is greater than 1, the predetermined first basic power is multiplied by a first ratio to obtain the first scaling power, and the first scaling power is split equally across the antenna ports with non-zero power of the uplink signal, the first ratio is $N/M_1$, and N represents the number of antenna ports with a non-zero transmission power of the uplink signal, $M_1$ represents the maximum number of antenna ports supported by the terminal in one SRS resource;

When the second determination result indicates that at least part of the numbers of antenna ports of the first resource is different, the predetermined first basic power is multiplied by a second ratio to obtain the second scaling power, and the second scaling power is split equally across antenna ports with non-zero power of the uplink signal, and the second ratio is $N/M_2$, where N represents the number of antenna ports with a non-zero transmission power of the uplink signal, $M_2$ represents the number of antenna ports of the sounding reference signal resource used to determine the precoding matrix of the uplink signal.

Mode 2: The determining the transmission power of the uplink signal according to the second determination result includes:

In the case that the second determination result indicates that the number of antenna ports of the first resource is the same and the number of antenna ports of the target resource is greater than 1, the predetermined first basic power is multiplied by the first ratio to obtain the first scaling power, and the first scaling power is split equally across the antenna ports with non-zero power of the uplink signal, the first ratio is $N/M_1$, and N represents the number of antenna ports with a non-zero transmission power of the uplink signal, $M_1$ represents the maximum number of antenna ports supported by the terminal in one SRS resource;

When the second determination result indicates that at least part of the numbers of antenna ports of the first resource is different, and the number of antenna ports of the sounding reference signal resource indicated by the sounding reference signal resource indicator is less than $M_1$, it is determined that the uplink signal is transmitted with full power;

When the second determination result indicates that at least part of the numbers of antenna ports of the first resource are different, and the number of antenna ports of the sounding reference signal resource indicated by the sounding reference signal resource indicator is equal to $M_1$, the predetermined first basic power is multiplied by a first ratio to obtain the first scaling power, and the first scaling power is split equally across the antenna ports with non-zero power of the uplink signal, the first ratio $N/M_1$, N represents the number of antenna ports with a non-zero transmission power of the uplink signal, and $M_1$ represents the maximum number of antenna ports supported by the terminal in one SRS resource.

Mode 3: The determining the transmission power of the uplink signal according to the second determination result includes:

In the case that the terminal has the first preset capability, and the second determination result indicates that the number of antenna ports of the first resource is the same and the number of antenna ports of the target resource is greater than 1, the predetermined first basic power is multiplied by a first ratio to obtain the first scaling power, and the first scaling power is split equally across the antenna ports with non-zero power of the uplink signal. The first ratio is $N/M_1$, where N represents the number of antenna ports with a non-zero transmission power of the uplink signal, and $M_1$ represents the maximum number of antenna ports supported by the terminal in one SRS resource;

In the case that the terminal has the first preset capability, and the second determination result indicates that at least part of the numbers of antenna ports of the first resource are different, the predetermined first basic power is multiplied by the first ratio to obtain the third scaling power, and the third scaling power is split equally across the antenna ports with non-zero power of the uplink signal, and the third ratio is $\min\{2*N/M_2, 1\}$, N represents the antenna ports with a non-zero transmission power of the uplink signal, and $M_2$ represents the number of antenna ports of the sounding reference signal resource used to determine the precoding matrix of the uplink signal;

The first preset capability includes at least one of supporting transmitting the uplink signal with full power, supporting being configured with a plurality of sounding reference signal resources for obtaining the channel state information of uplink that associated with different numbers of antenna ports, or supporting transmitting the uplink signal with full power with any two antenna ports.

Optionally, when the first resource is the sounding reference signal resource indicated by a sounding reference signal resource indicator, determining the transmission power of the uplink signal according to the number of antenna ports of the first resource in the target resource includes:

In a case that the number of antenna ports of the first resource is a fifth preset value, determining that the uplink signal is transmitted with full power;

In the case that the number of antenna ports of the first resource is a sixth preset value, the predetermined first basic power is multiplied by the fourth ratio to obtain the second scaling power, and the second scaling power is split equally across the antenna ports with non-zero power of the uplink signal, the fourth ratio is $N/M_3$, where N represents the number of antenna ports with a non-zero transmission power of the uplink signal, and $M_3$ represents the number of antenna ports of the first resource.

Wherein, the fifth preset value may be 1, and the sixth preset value may be 2 and 4. The first basic power is the transmission power of the uplink signal calculated according to the uplink power control formula in section 7.1.1 of TS 38.213-f40 in the NR system. That is, the first basic power is determined according to information such as the maximum transmission power of the terminal on an uplink carrier, a power target value of an open-loop receiving end, path loss estimation, and a path loss compensation factor.

In addition, when the first resource is the sounding reference signal resource indicated by the sounding reference signal resource indicator, and the transmission power of the uplink signal is determined according to the number of antenna ports of the first resource in the target resource, any one of the following mode 1 or mode 2 can also be used:

Mode 1: The determining the transmission power of the uplink signal according to the number of antenna ports of the first resource in the target resource includes:

In the case that the terminal has the fourth preset capability, determining the transmission power of the uplink signal according to the number of antenna ports of the first resource.

Optionally, the determining the transmission power of the uplink signal according to the number of antenna ports of the first resource in the target resource further includes:

In a case that the terminal has the fifth preset capability, determining the transmission power of the uplink signal according to a predetermined third power control rule.

That is, under one or more capabilities, for different numbers of antenna ports of the first resource, the terminal uses different uplink signal transmission power determination methods to determine the transmission power of the uplink signal; under other capacities, for different numbers of antenna ports of the first resource, the same uplink signal transmission power determination method is used to determine the transmission power of the uplink signal.

The fourth preset capability may include a capability of the terminal to support full power transmission. For example, the fourth preset capability includes the terminal supporting the base station to configure multiple resources including different numbers of antenna ports for the terminal to perform full power transmission. For another example, the fourth preset capability includes that combination of any two PA/PUSCH antenna ports of the terminal can perform full power transmission. For another example, the fourth preset capability includes that the terminal does not support the base station to configure multiple resources including different numbers of antenna ports for the terminal to perform full power transmission. For another example, the fourth preset capability includes that any one PA/PUSCH antenna port of the terminal can perform full power transmission.

The fifth preset capability may include another capacity of the terminal to support full power transmission. For example, the fifth preset capability includes that the terminal does not support the base station to configure multiple resources with different numbers of antenna ports for the terminal to perform full power transmission. For another example, the fifth preset capability includes that any one PA/PUSCH antenna port of the terminal can perform full power transmission. The PA/PUSCH antenna port of the terminal can perform full power transmission, that means the PA or PUSCH antenna port of the terminal can reach the transmission power corresponding to the power level of the terminal. For another example, the fifth preset capability includes that the terminal supports the base station to configure multiple resources including different numbers of antenna ports for the terminal to perform full power transmission. For another example, the fifth preset capability includes that combination of any two PA/PUSCH antenna ports of the terminal can perform full power transmission.

Mode 3: The determining the transmission power of the uplink signal according to the number of antenna ports of the first resource in the target resource includes:

In a case that the number of antenna ports of the first resource is a first preset number, determining the transmission power of the uplink signal according to the capability information of the terminal;

In a case that the number of antenna ports of the first resource is a second preset number, determining the transmission power of the uplink signal according to a predetermined fourth power control rule.

That is, under one or the number of antenna ports of the first resource, the transmission power of the uplink signal is determined based on the capability of the UE, and under the number of antenna ports of other first resources, the transmission power of the uplink signal can be determined without the capability of the UE.

Optionally, the determining the transmission power of the uplink signal according to the number of antenna ports of the target resource includes:

Determining the transmission power of the uplink signal according to the relationship between the number of antenna ports of the target resource and the maximum number of antenna ports supported by the terminal in one SRS resource.

Wherein, the relationship is the size relationship between the number of antenna ports of the target resource and the maximum number of antenna ports of one SRS resource supported by the terminal.

The determining the transmission power of the uplink signal according to the number of antenna ports of the target resource includes:

In a case that the second indication information transmitted by the network device is received, and the second indication information indicates that the transmission power of the uplink signal is determined according to the number of antenna ports of the target resource, determining the transmission power of the uplink signal according to the number of antenna ports of the target resource;

or

In the case that the third indication information transmitted by the network device is received, determining the transmission power of the uplink signal according to the number of antenna ports of the target resource, and the third indication information is used to indicate that the transmission power of the uplink signal is determined according to the number of antenna ports of the target resource.

Wherein, the second indication information may indicate that the content of the transmission power of the uplink signal is determined according to the number of antenna ports of the target resource, or may indicate that the content of the transmission power of the uplink signal is determined without the number of antenna ports of the target resource. The third indication information has only one content, that is, it indicates that the transmission power of the uplink signal is determined according to the number of antenna ports of the target resource.

That is, the terminal may also receive the second indication information transmitted by the base station, and determine, based on the content indicated by the second indication information, whether to determine the transmission power of the uplink signal according to the number of antenna ports of the target resource. Alternatively, the terminal determines whether the third indication information transmitted by the base station is received, and when receiving the indication information, the transmission power of the uplink signal is determined according to the number of antenna ports of the target resource.

Optionally, the determining the transmission power of the uplink signal according to the first indication information from the network device includes:

Determining the transmission power of the uplink signal according to the method for determining the transmission power of the uplink signal indicated by the first indication information and at least one of the following information:

Scheduling information of uplink;

Configuration information of the sounding reference signal resource for obtaining the channel state information of uplink.

That is, the transmission power of the uplink signal is determined based on the scheduling information of uplink and/or the configuration information of the sounding reference signal resource for obtaining the channel state information of uplink combined with the first indication information.

Optionally, the first indication information is used to indicate a manner in which the terminal determines the transmission power of the uplink signal when the number of antenna ports of the uplink signal is a first preset value;

or

The first indication information is used to indicate a manner in which the terminal determines the transmission power of the uplink signal when the number of antenna ports of the second resource is a second preset value, and the second resource is the sounding reference signal resource used to determine the precoding matrix of the uplink signal.

Wherein, the first preset value may have one or more values, and the second preset value may also have one or more values.

In addition, the number of antenna ports of an uplink signal corresponds to a method for determining the transmission power of the uplink signal, and the method for determining the transmission power of the uplink signal corresponding to the different numbers of antenna ports of uplink signals may be the same or different. In the first indication information, when the number of antenna ports of the uplink signal has different values, the terminal determines the transmission power of the uplink signal by a joint indication or a separate indication, for example, a joint indication is: the number of antenna ports of the uplink signal is 1 and 2, the first power determination method is used; a separate indication is: when the number of antenna ports of the uplink signal is 1, the first power determination method is used, and when it is 2, the first power determination method is used. In addition, when the number of antenna ports of the uplink signal may have multiple values, the first indication information may only indicate a manner of determining the transmission power of the uplink signal under one or more of the values. When the uplink signal refers to the PUSCH, the number of antenna ports of the uplink signal is the number of PUSCH ports.

Similarly, the number of antenna ports of a second resource corresponds to a method for determining the transmission power of uplink signal. The methods for determining the transmission power of uplink signal corresponding to the different numbers of antenna ports of second resources may be the same or different. In the first indication information, when the numbers of antenna ports of the second resource have different values, the terminal determines the transmission power of the uplink signal by a joint indication or a separate indication, for example, the joint indication is:

when the number of antenna ports is 1 and 2, the first power determination method is used; the separate indication is: when the number of antenna ports of the second resource is 1, the first power determination method is used, and when it is 2, the first power determination method is used. In addition, when the numbers of antenna ports of the second resource may have multiple values, the first indication information may only indicate a method for determining the transmission power of the uplink signal under one or more of the values.

In summary, the determination method of the transmission power of the uplink signal is described above.

In the embodiment of the present disclosure, a method of determining a codebook subset corresponding to the uplink signal and/or the overhead of the uplink scheduling information may also be included as follows.

Optionally, the method also includes:

Determining the codebook subset corresponding to the uplink signal and/or the overhead of uplink scheduling information according to the number of antenna ports of the target resource, or the number of antenna ports of the first resource in the target resource, or the fourth indication information from the network device;

Wherein, the first resource is a sounding reference signal resource indicated by a sounding reference signal resource indicator, or all sounding reference signal resources of a first sounding reference signal resource set, and the first sounding reference signal resource set is a resource set where the sounding reference signal indicated by the sounding reference signal resource indicator;

The fourth indication information is used to indicate the method of determining the codebook subset corresponding to the uplink signal and/or the overhead of the uplink scheduling information.

It can be seen that the codebook subset corresponding to the uplink signal and/or the overhead of uplink scheduling information can be determined according to the number of antenna ports of the target resource, or the number of antenna ports of the resource indicated by the SRI, or the number of antenna ports of all resources of the resource set in which the resource indicated by the SRI is configured.

Among them, after the terminal determines the codebook subset corresponding to the uplink signal and/or the overhead of the uplink scheduling information, the terminal determines a precoding and transmission stream number according to the codebook subset corresponding to the uplink signal and/or the overhead of the uplink scheduling information, and then the uplink signal is transmitted according to the precoding matrix and the number of transmission streams, and the transmission power of the uplink signal determined in the above.

Optionally, when the first resource is the sounding reference signal resource indicated by the sounding reference signal resource indicator, the method further includes:

Determining the overhead of the indication information for precoding information and number of transmission layers according to the number of antenna ports of the first resource.

That is, the overhead of the indication information for precoding information and number of transmission layers can be determined according to the number of antenna ports of the first resource.

Wherein, when the target resource includes one SRS resource set, any one of the following mode 1 and mode 2 may be used to determine the overhead of the indication information for precoding information and number of transmission layers:

Mode 1: The method in Rel-15 version protocol TS38.212 of 3GPP, that is, the terminal determines the overhead of the precoding and transmission stream number indication information in DCI according to the codebook-subset indicated by the base station, the number of antenna ports of the PUSCH, the maxRank (the maximum number of transmission streams) of the PUSCH and the waveform of the uplink transmission, and decode the precoding and transmission stream number indication information in the DCI according to the overhead, and determine the precoding and transmission stream number corresponding to PUSCH transmission;

Mode 2: The terminal determines the number of antenna ports of all SRS resources, and determines the overhead of the indication information for precoding information and number of transmission layers based on the number. Optionally, if the base station indicates a codebook subset constraints signaling to the terminal, the terminal also needs to determine the overhead of the indication information for precoding information and number of transmission layers in combination with the codebook subset constraints signaling. Optionally, if the base station indicates a maximum transmission stream number signaling to the terminal, the terminal also needs to determine the overhead of the precoding and transmission stream number indication in combination with the maximum transmission stream number signaling. For example, the base station configures the terminal with two SRS resources for PUSCH transmission based on the codebook, and the numbers of antenna ports of the two SRS resources are 2 and 4 respectively, and the terminal determines the overhead of the indication information for precoding information and number of transmission layers according to 4 antenna ports. The precoding and transmission stream number indication information are part of the uplink scheduling information.

Wherein, when determining the codebook subset corresponding to the uplink signal and/or the overhead of the uplink scheduling information according to the number of antenna ports of the target resource, any one of the following mode 1, mode 2, mode 3, and mode 4 may be specifically used:

Mode 1: When the target resource includes at least two sounding reference signal resources, the determining the codebook subset corresponding to the uplink signal and/or the overhead of uplink scheduling information according to the number of antenna ports of the target resource includes:

Determining whether the number of antenna ports of the target resource is the same, and obtaining a third determination result;

According to the third determination result, determining the codebook subset corresponding to the uplink signal and/or the overhead of the uplink scheduling information.

Optionally, when the third determination result indicates that the number of antenna ports of the target resource is the same, the terminal determines the codebook subset corresponding to the uplink signal and/or the overhead of the uplink scheduling information using the method in the Rel-15 version protocol TS38.212 of 3GPP.

Optionally, when determining the precoding and transmission stream number of the uplink scheduling information according to the third determination result, if the third determination result indicates that at least part of the numbers of antenna ports of the target resource are different, the maximum number of antenna ports of the target resource is acquired, and the overhead of the indication information for precoding information and number of transmission layers is determined based on the maximum number. Wherein, if the base station indicates the codebook subset constraints signaling to the terminal, the terminal also needs to determine the overhead of the indication information for precoding information and number of transmission layers in combination with the codebook subset constraints signaling. Further, if the base station indicates the maximum transmission stream number signaling to the terminal, the terminal also needs to determine the overhead of the precoding and transmission stream number indication in combination with the maximum transmission stream number signaling. For example, the base station configures the terminal with two SRS resources for PUSCH transmission based on the codebook, and the number of antenna ports of the two SRS resources is 2 and 4 respectively, and the terminal determines the overhead of the indication information for precoding information and number of transmission layers according to 4 antenna ports. The precoding and transmission stream number indication information are part of the uplink scheduling information.

For example, the base station configures one SRS resource set for obtaining CSI based on the codebook PUSCH to the terminal. The SRS resource set includes one SRS resource with two ports and one SRS resource with four ports. The base station indicates to the terminal the codebook subset constraints signaling codebooksubset and the maximum transmission stream number signaling maxRank, the value of codebooksubset is 'nonCoherent', and maxRank indicates a single stream. If the transmission waveform of the uplink signal is Cyclic Prefix Orthogonal Frequency Division Multiplexing (CP-OFDM), the codebook subset corresponding to the constraints signaling with 4 antenna ports is TPMI 0-3 in Table 1, the codebook subset corresponding to 2 antenna ports is TPMI 0-1 in Table 2. Since $\max\{2,4\}=4$, the base station determines the overhead of the precoding and transmission stream number according to the codebook subset corresponding to codebook subset constraints of 4 antenna ports, $\log 2(4)=2$ bits. The terminal determines that the numbers of antenna ports of the two SRS resources are different, and calculates $\max\{2, 4\}=4$, and the overhead of the precoding and transmission stream number is determined as $\log 2(4)=2$ bits according to the codebook subset corresponding to codebook subset constraints of 4 antenna ports.

Among them, the terminal determines the encoding of the precoding and transmission stream number indication information according to the overhead of the precoding and transmission stream number indication information and Table 3.

Table 1 is a precoding matrix W used for single-layer transmission using two antenna ports (when TPMI index is 0-1, codewords are for non-coherent transmission; other codewords are for fully coherent transmission)

| TPMI index | W — Sorting from left to right in ascending order of TPMI index | | | | | | |
|---|---|---|---|---|---|---|---|
| 0-5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | — — |

Table 2 is a precoding matrix W using four antenna ports for single-layer transmission under CP-OFDM waveform (when TPMI index is 0-3, codewords are for incoherent transmission; when TPMI index is 4-11, codewords are for partially coherent transmission; other codewords are for fully coherent transmission)

the information field. Optionally, the information may include multiple fields. At least one field is used to indicate the precoding matrix, and at least one field is used to indicate the number of transmission streams, and the overhead of precoding and transmission stream number is the total overhead of these fields.

| TPMI index | W — Sorting from left to right in ascending order of TPMI index | | | | | | | |
|---|---|---|---|---|---|---|---|---|
| 0-7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\1\end{bmatrix}$ | $\frac{1}{2}\begin{bmatrix}1\\1\\j\\j\end{bmatrix}$ | $\frac{1}{2}\begin{bmatrix}1\\1\\-1\\-1\end{bmatrix}$ | $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ | $\frac{1}{2}\begin{bmatrix}1\\j\\j\\-1\end{bmatrix}$ | $\frac{1}{2}\begin{bmatrix}1\\j\\-1\\-j\end{bmatrix}$ | $\frac{1}{2}\begin{bmatrix}1\\j\\-j\\1\end{bmatrix}$ | $\frac{1}{2}\begin{bmatrix}1\\-1\\1\\-1\end{bmatrix}$ | $\frac{1}{2}\begin{bmatrix}1\\-1\\j\\-j\end{bmatrix}$ | $\frac{1}{2}\begin{bmatrix}1\\-1\\-1\\1\end{bmatrix}$ | $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ | $\frac{1}{2}\begin{bmatrix}1\\-j\\j\\1\end{bmatrix}$ | $\frac{1}{2}\begin{bmatrix}1\\-j\\-1\\j\end{bmatrix}$ | $\frac{1}{2}\begin{bmatrix}1\\-j\\-j\\-1\end{bmatrix}$ | — | — | — | — |

Table 3 is a comparison table of precoding and transmission stream number indication information

| 2 antenna ports | | 4 antenna ports | |
|---|---|---|---|
| bit field mapped to the index | UE | bit field mapped to the index | UE |
| 0 | 1 layer: TPMI = 0 | 0 | 1 layer: TPMI = 0 |
| 1 | 1 layers: TPMI = 1 | 1 | 1 layers: TPMI = 1 |
| 2 | Reserved | 2 | 1 layers: TPMI = 2 |
| 3 | Reserved | 3 | 1 layers: TPMI = 3 |

The method for the terminal to determine the overhead of the precoding and transmission stream number indicator according to the codebook subset is based on the number of precoding matrices of the codebook subset, for example, the number is Y, and the logarithm of the number based on 2 is rounded up to obtain the overhead of the precoding and transmission stream number indictor.

In the present disclosure, the precoding and transmission stream number indicator refers to indication information used to indicate the precoding matrix and the number of transmission streams of the uplink signal. Optionally, the indication information may be in the same field, for example, the precoding information and number of layers field in the DCI. In this case, the overhead of the precoding and transmission stream number indicator is the overhead of Mode 2: The determining the codebook subset corresponding to the uplink signal and/or the overhead of the uplink scheduling information according to the number of antenna ports of the target resource includes:

Obtaining a maximum value of the number of antenna ports of the target resource;

Determining the codebook subset corresponding to the uplink signal and/or the overhead of the uplink scheduling information according to the maximum value of the number of antenna ports of the target resource.

That is, the terminal does not determine whether the number of antenna ports of the target resource is the same, but directly determines the codebook subset corresponding to the uplink signal and/or the overhead of the uplink scheduling information according to the maximum value of the number of antenna ports of the target resource.

Optionally, if the base station indicates the codebook subset constraints signaling to the terminal, the terminal also needs to determine the overhead of the indication information for precoding information and number of transmission layers in combination with the codebook subset constraints signaling. Optionally, if the base station indicates the maximum transmission stream number signaling to the terminal, the terminal also needs to determine the overhead of the precoding and transmission stream number indicator in combination with the maximum transmission stream number signaling. For example, the base station configures the terminal with two SRS resources for PUSCH transmission based on the codebook, and the number of antenna ports of the two SRS resources are 2 and 4 respectively, and the terminal determines the overhead of the precoding and transmission stream number indication information according to 4 antenna ports. The precoding and transmission stream number indication information are part of the uplink scheduling information.

In addition, if the uplink scheduling information is transmitted through the DCI, the terminal also needs to determine a candidate overhead of the DCI according to the precoding and transmission stream number indication information, and receive the DCI by using the overhead. Wherein, when the terminal determines the overhead of the precoding and transmission stream number indication information, the terminal can determine the encoding mode corresponding to the precoding and transmission stream number indication information, and then obtain the precoding and transmission stream number indication information according to the decoding of the DCI.

Mode 3: The determining the codebook subset corresponding to the uplink signal and/or the overhead of the uplink scheduling information according to the number of antenna ports of the target resource includes:

After receiving the fifth indication information transmitted by the network device, and the fifth indication information indicates that the codebook subset corresponding to the uplink signal and/or the overhead of the uplink scheduling information are determined according to the number of antenna ports of the target resource, the codebook subset corresponding to the uplink signal and/or the overhead of the uplink scheduling information is determined according to the number of antenna ports of the target resource.

Mode 4: The determining the codebook subset corresponding to the uplink signal and/or the overhead of uplink scheduling information according to the number of antenna ports of the target resource includes:

In the case of receiving the sixth indication information transmitted by the network device, determining the codebook subset corresponding to the uplink signal and/or the overhead of the uplink scheduling information according to the number of antenna ports of the target resource, the sixth indication information is used to indicate to determine the codebook subset corresponding to the uplink signal and/or the overhead of uplink scheduling information according to the number of antenna ports of the target resource.

Wherein, the fifth indication information may indicate that the codebook subset corresponding to the uplink signal and/or the overhead of the uplink scheduling information is determined according to the number of antenna ports of the target resource, or it may indicate that the codebook subset corresponding to the uplink signal and/or the overhead of the uplink scheduling information is determined without the number of antenna ports of the target resource. The sixth indication information has only one content, that is, it indicates that the codebook subset corresponding to the uplink signal and/or the overhead of the uplink scheduling information is determined according to the number of antenna ports of the target resource.

That is, the terminal may also receive the fifth indication information transmitted by the base station, and determine whether to determine the codebook subset corresponding to the uplink signal and/or the overhead of uplink scheduling information according to the number of antenna ports of the target resource or not based on the content indicated by the fifth indication information. Alternatively, the terminal determines whether the sixth indication information transmitted by the base station is received, and when receiving the sixth indication information, determines the codebook subset corresponding to the uplink signal and/or the overhead of uplink scheduling information according to the number of antenna ports of the target resource.

Optionally, when the first resource is all the sounding reference signal resources of the first sounding reference signal resource set, any one of the following mode 1, mode 2, mode 3, mode 4, and mode 5 may be used:

Mode 1: The determining the codebook subset corresponding to the uplink signal and/or the overhead of uplink scheduling information according to the number of antenna ports of the first resource in the target resource includes:

Determining whether the numbers of antenna ports of the first resource are the same, and obtaining a fourth determination result;

Determining the codebook subset corresponding to the uplink signal and/or the overhead of the uplink scheduling information according to the fourth determination result.

Mode 2: The determining the codebook subset corresponding to the uplink signal and/or the overhead of uplink scheduling information according to the number of antenna ports of the first resource in the target resource includes:

Obtaining a maximum value of the number of antenna ports of the first resource;

Determining the codebook subset corresponding to the uplink signal and/or the overhead of the uplink scheduling information according to the maximum value of the number of antenna ports of the first resource.

Mode 3: The determining the codebook subset corresponding to the uplink signal and/or the overhead of uplink scheduling information according to the number of antenna ports of the first resource in the target resource includes:

After ninth indication information transmitted by the network device is received, and the ninth indication information indicates that the codebook subset corresponding to the uplink signal and/or the overhead of the uplink scheduling information are determined according to the number of antenna ports of the first resource, determining the codebook subset corresponding to the uplink signal and/or the overhead of the uplink scheduling information is determined according to the number of antenna ports of the first resource.

Mode 4: The determining the codebook subset corresponding to the uplink signal and/or the overhead of uplink scheduling information according to the number of antenna ports of the first resource in the target resource includes:

In the case of receiving tenth indication information transmitted by the network device, determining the codebook subset corresponding to the uplink signal and/or the overhead of the uplink scheduling information according to the number of antenna ports of the first resource, the tenth indication information is used to indicate to determine the codebook subset corresponding to the uplink signal and/or the overhead of uplink scheduling information according to the number of antenna ports of the first resource.

Mode 5: The determining the codebook subset corresponding to the uplink signal and/or the overhead of uplink scheduling information according to the number of antenna ports of the first resource in the target resource includes:

In the case that the terminal has a sixth preset capability, determining the codebook subset corresponding to the uplink signal and/or the overhead of uplink scheduling information according to the number of antenna ports of the first resource.

Optionally, the determining the codebook subset corresponding to the uplink signal and/or the overhead of uplink scheduling information according to the number of antenna ports of the first resource in the target resource also includes:

In the case that the terminal has a seventh preset capability, determining the codebook subset corresponding to the uplink signal and/or the overhead of the uplink scheduling information according to a first preset rule.

That is, when the terminal has one or more capabilities, it is determined whether the number of antenna ports of the first resource is the same, and the transmission power control rule of the uplink signal is determined based on the determination result, and the codebook subset corresponding to the uplink signal and/or the overhead of the uplink scheduling information is determined based on the transmission power control rule; under other capabilities, other rules are used to determine the codebook subset corresponding to the uplink signal and/or the overhead of the uplink scheduling information.

Optionally, the sixth preset capability or the seventh preset capability includes at least one of the following:

coherent transmission capability of the terminal;

codebook subset constraints information supported by the terminal;

indication information of the codebook subset constraints supported by the terminal to perform full power transmission, wherein the codebook subset that can be transmitted with full power means that there is at least one precoding matrix in the codebook subset so that the terminal can transmit uplink signals with full power;

full power transmission capability of PAs of the terminal;

full power transmission capability of the antenna port of the terminal;

a capability whether the terminal supports to perform PUSCH transmission using a precoding matrix that exceeds the PUSCH coherent transmission capability of the terminal;

full power transmission capability of the terminal.

Optionally, when the first resource is a sounding reference signal resource indicated by a sounding reference signal resource indicator, determining the codebook subset corresponding to the uplink signal and/or the overhead of uplink scheduling information according to the number of antenna ports of the first resource in the target resource includes:

In the case that the number of antenna ports of the first resource is a third preset number, determining the codebook subset corresponding to the uplink signal and/or the overhead of uplink scheduling information according to the capability information of the terminal and/or the eighth indication information from the network device;

In a case that the number of antenna ports of the first resource is a fourth preset number, determining the codebook subset corresponding to the uplink signal and/or the overhead of uplink scheduling information according to a second preset rule.

Optionally, the determining the codebook subset corresponding to the uplink signal and/or the overhead of uplink scheduling information according to the number of antenna ports of the target resource includes:

In a case that the number of antenna ports of the first resource is the third preset number, determining the codebook subset corresponding to the uplink signal and/or the overhead of uplink scheduling information according to the capability information of the terminal;

In a case that the number of antenna ports of the first resource is a fourth preset number, determining the codebook subset corresponding to the uplink signal and/or the overhead of uplink scheduling information according to the second preset rule.

That is, under the number of antenna ports of one or more first resources, the codebook subset corresponding to the uplink signal and/or the overhead of uplink scheduling information is determined based on the capabilities of the terminal, and under the number of the antenna ports of the first resource, the codebook subset corresponding to the uplink signal and/or the overhead of the uplink scheduling information can be determined without the ability of the terminal.

Optionally, the fourth indication information is used to indicate the method of the terminal determining the codebook subset corresponding to the uplink signal and/or the overhead of the uplink scheduling information when the number of antenna ports of the uplink signal is the third preset value;

or

The fourth indication information is used to indicate the method of the terminal determining the codebook subset corresponding to the uplink signal and/or the overhead of the uplink scheduling information when the number of antenna ports of the second resource is the fourth preset value; the second resource is a sounding reference signal resource used to determine the precoding matrix of the uplink signal.

Wherein, the third preset value may be one or more values, and the fourth preset value may also be one or more values.

In addition, the number of antenna ports of an uplink signal corresponds to a method for determining the transmission power of the uplink signal, and the methods of determining the codebook subset corresponding to the uplink signal and/or the overhead of uplink scheduling information corresponding to numbers of antenna ports of different uplink signals can be the same or different. In the fourth indication information, when the numbers of antenna ports of the uplink signal are different, the method for the terminal to determine the codebook subset corresponding to the uplink signal and/or the overhead mode of the uplink scheduling information may be a joint indication or a separate indication, For example, a joint indication is: when the number of antenna ports of the uplink signal is 1 and 2, the first overhead determination method is used; a separate indication is: when the number of antenna ports of the uplink signal is 1, the first overhead determination method is used, and when it is 2, the first overhead determination method is used. Moreover, when the numbers of antenna ports of the uplink signal may have multiple values, the fourth indication information may only indicate the method for determining the codebook subset corresponding to the uplink signal and/or the overhead of the uplink scheduling information under one or more of the values.

Similarly, the number of antenna ports included a second resource corresponds to a method for determining the transmission power of the uplink signal, and the methods of determining the codebook subset corresponding to the uplink signal and/or the overhead of uplink scheduling information corresponding to numbers of antenna ports of different second resources can be the same or different. In the fourth indication information, when the numbers of antenna ports included the second resource are different, the method for the terminal to determine the codebook subset corresponding to the uplink signal and/or the overhead mode of the uplink scheduling information may be a joint indication or a separate indication, For example, a joint indication is: when the number of antenna ports of the second resource is 1 and 2, the first overhead determination method is used;

a separate indication is: when the number of antenna ports of the second resource is 1, the first overhead determination method is used, and when it is 2, the first overhead determination method is used. Moreover, when the numbers of antenna ports of the second resource may have multiple values, the fourth indication information may only indicate the method for determining the codebook subset corresponding to the uplink signal and/or the overhead of the uplink scheduling information under one or more of the values.

Optionally, the capability information of the terminal includes at least one of the following:

A1: codebook subset supported by the terminal;

A2: indication information of codebook subset supported by the terminal that can be transmitted with full power, and the codebook subset transmitted with full power means that at least one precoding matrix included in the codebook subset enables the terminal to transmits the uplink signal with full power;

A3: combination of power amplifiers of the terminal for transmitting the uplink signal with full power;

A4: a maximum number of antenna ports in the target resource when all precoding matrices corresponding to the target resource support full power transmission;

A5: a minimum number of antenna ports in the target resource when all precoding matrices corresponding to the target resource support full power transmission;

A6: combination of antenna ports through which the terminal transmits the uplink signal with full power.

For item A3, optionally, the method of the UE reporting capability information is: the UE reports a precoding matrix set that supports full power transmission, and PA combination corresponding to the precoding matrices can perform full power transmission.

Optionally, positions of non-zero elements corresponding to any two precoding matrices in the precoding matrix set are different. In this way, the overhead of UE reporting capability can be reduced.

An example may refer to the terminal side embodiment, which will not be repeated here.

Optionally, each precoding matrix in the precoding matrix set includes only one non-zero antenna port. After the base station receives the capability reported by the UE, it is assumed that the antenna port corresponding to any precoded non-zero element reported by the terminal can perform full power transmission.

For A4, for example, if the upper limit value is P, then the number of antenna ports of the SRS resource for which usage is 'codebook' (that is, the SRS resource used to obtain the CSI of the codebook-based PUSCH) is not greater than P, all TPMIs can be transmitted with full power.

For A5, for example, when the lower limit value is Q, then the number of antenna ports of the SRS resource for which usage is 'codebook' (that is, the SRS resource used to obtain the CSI of the codebook-based PUSCH) is less than Q, all TPMIs can be transmitted with full power.

For item A6, optionally, the UE reports the antenna ports for performing full power transmission in a bitmap manner. Optionally, the terminal reports a 4-bit capability information, and each bit indicates whether a port supports full power transmission. As an example, when each bit is 1, it means that the corresponding antenna port can perform full power transmission, and when it is 0, it means that the corresponding antenna port cannot perform full power transmission; of course, there can be another example, when each bit is 1, it means that the corresponding antenna port cannot perform full power transmission and when it is 0, it means that the corresponding antenna port can perform full power transmission.

Optionally, the capability information of the terminal may also include other information. Specific content may refer to the terminal-side embodiment for details, which will not be repeated here.

Optionally, the above-mentioned capabilities reported by the terminal are only applicable to a case that the number of antenna ports is equal to the maximum number of antenna ports of the sounding reference signal resource.

Optionally, the above-mentioned capabilities reported by the terminal are applicable to all SRS resources corresponding to codebook-based uplink transmission.

Optionally, the terminal may report different capabilities for the multiple numbers of antenna ports. That is, if the terminal supports the SRS resources with a maximum of 4 antenna ports, the terminal reports capability X for 4 antenna ports and reports capability Y for 2 antenna ports, where X and Y are two capabilities.

In summary, the embodiments of the present disclosure provide different methods for determining power control, codebook subset constraints, the overhead of the precoding and transmission stream numbers based on different numbers of ports of SRS resources of the SRS resource set of codebook-based uplink transmission in the system, for determining the precoding matrix and the number of transmission streams of PUSCH, for determining the overhead of the DCI and the information indicated by the DCI.

Among them, when the transmission of PUSCH corresponds to different SRS resources, different power control rules are used, which enables the terminal to transmit PUSCH corresponding to different SRS resources in different ways, so that the base station can flexibly schedule the terminal to perform full power transmission to against interference, or schedule the terminal to perform lower power transmission to match the channel in a better way and obtain better performance of the terminal.

In addition, when the transmission of PUSCH corresponds to different SRS resources, different codebook subset constrains and/or the overhead of precoding matrix and the number of transmission streams and/or the overhead of DCI can save overhead or the base station can flexibly schedule the terminal to perform transmission in different ways, so as to obtain better system performance.

Second Embodiment

The embodiments of the present disclosure provide an uplink transmission method, which is applied to a network device, and solves the problem that the reference power determination method in the related art cannot be applied to scenarios with more resource configurations.

As shown in FIG. 2, the uplink transmitting method of the embodiment of the present disclosure specifically includes the following steps:

Step 21: Determining reference power corresponding to a precoding matrix in a codebook subset corresponding to an uplink signal according to configuration information of a target resource or using a power determination method indicated by first indication information transmitted to a terminal.

Wherein, the target resource includes a sounding reference signal resource configured by the network device for obtaining the channel state information of uplink, and the first indication information is used to indicate a method of determining the transmission power of the uplink signal.

Optionally, the codebook subset corresponding to the uplink signal is the codebook subset of the uplink signal.

Optionally, the reference power corresponding to the precoding matrix is the reference power of the precoding matrix.

Step 22: Determining the uplink scheduling information of uplink according to the reference power corresponding to the precoding matrix in the codebook subset corresponding to the uplink signal.

Optionally, the uplink signal is a PUSCH signal based on a codebook.

Step 23: Transmitting the uplink scheduling information to the terminal.

Wherein, after the network device determines the reference power in step 21, the reference power is further used to calculate a first measurement value corresponding to any one of the precoding matrixes, wherein the first measurement value may specifically measured signal-to-interference and noise ratio corresponding to the precoding matrix, the Shannon capacity corresponding to the precoding matrix, the transmission block size corresponding to the precoding matrix, and other information, so that the network device determines the uplink scheduling information of uplink according to the first measurement value, such as Modulation and coding method (MCS), precoding matrix and number of transmission streams, etc.

In the embodiments of the present disclosure, the reference power is calculated by the network device based on the same technical rules as the terminal, so that the uplink scheduling information of uplink can be determined based on the reference power, which can be applied to more scenarios for resource allocation.

Optionally, determining the reference power corresponding to the precoding matrix in the codebook subset corresponding to the uplink signal according to the configuration information of the target resource includes:

Determining the reference power corresponding to the precoding matrix in the codebook subset corresponding to the uplink signal according to the number of antenna ports of the target resource or the number of antenna ports of the first resource in the target resource;

Wherein, the first resource is a sounding reference signal resource indicated by a sounding reference signal resource indicator, or all sounding reference signal resources of a first sounding reference signal resource set, and the first sounding reference signal resource set is the resource set in which the sounding reference signal resource indicated by a sounding reference signal resource is configured.

It can be seen that the reference transmission power can be determined according to the number of antenna ports of the target resource, or the number of antenna ports of the resource indicated by the SRI, or the number of antenna ports of all resources of the resource set in which the resource indicated by the SRI is configured.

Wherein, the target resource may include one SRS resource, or may include multiple SRS resources. Then, when the target resource includes one SRS resource, any one of the following modes 1 and 2 may be used to determine the reference power corresponding to the precoding matrix in the codebook subset corresponding the uplink signal:

Mode 1: When the uplink signal is a codebook-based PUSCH signal, the reference power corresponding to the precoding matrix in the codebook subset corresponding to the PUSCH is determined according to the following formula:

$$Pi = P0 * Ni/M_1;$$

Among them, P0 represents the predetermined second basic power, Ni represents the number of antenna ports with non-zero power corresponding to the i-th precoding matrix in the codebook subset corresponding to PUSCH, and Pi represents the reference power corresponding to the i-th precoding matrix in the codebook subset corresponding to PUSCH, $M_1$ represents the maximum number of antenna ports supported by the terminal in one SRS resource;

Mode 2: When the uplink signal is a codebook-based PUSCH signal, the reference power corresponding to the precoding matrix in the codebook subset corresponding to the PUSCH is determined according to the following formula:

$$Pi = P0 * Ni/M_1;$$

Among them, P0 represents the predetermined second basic power, Ni represents the number of antenna ports with non-zero power corresponding to the i-th precoding matrix in the codebook subset corresponding to PUSCH, and Pi represents the reference power corresponding to the i-th precoding matrix in the codebook subset corresponding to PUSCH, $M_2$ represents the number of antenna ports of the SRS resource used to determine the precoding matrix of the uplink signal.

Optionally, the target resource includes at least two sounding reference signal resources, and determining the reference power corresponding to the precoding matrix in the codebook subset corresponding to the uplink signal according to the number of antenna ports of the target resource includes:

Determining whether the SRS resources in the target resource are with the same number of antenna ports, and obtaining a first determination result;

Determining the reference power corresponding to the precoding matrix in the codebook subset corresponding to the uplink signal according to the first determination result.

Wherein, one SRS resource corresponds to one antenna port, and when the target resource includes multiple SRS resources, the number of antenna ports of the target resource is multiple.

In addition, when determining the reference power corresponding to the precoding matrix in the codebook subset corresponding to the uplink signal according to the first determination result, any one of the following mode 1, mode 2, and mode 3 may be specifically adopted:

Mode 1: The determining the reference power corresponding to the precoding matrix in the codebook subset corresponding to the uplink signal according to the first determination result includes:

In the case that the first determination result indicates that the numbers of antenna ports of the SRS resources in the target resource is the same and the number of antenna ports of the target resource is all greater than 1, the reference power corresponding to the precoding matrix in the codebook subset corresponding to the uplink signal is determined according to the following formula:

$$Pi = P0 * Ni/M_1;$$

Where, P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_1$ represents the maximum number of antenna ports supported by the terminal in one SRS resource;

In the case that the first determination result indicates that at least part of the number of antenna ports of the SRS resources in the target resource is different, the reference power corresponding to the precoding matrix in the codebook subset corresponding to the uplink signal is determined according to the following formula:

$$Pi=P0*Ni/M_2;$$

Where, P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_2$ represents the number of antenna ports of the sounding reference signal resource used to determine the precoding matrix of the uplink signal.

Mode 2: The determining the reference power corresponding to the precoding matrix in the codebook subset corresponding to the uplink signal according to the first determination result includes:

In the case that the first determination result indicates that the number of antenna ports of the SRS resources in the target resource is the same and the number of antenna ports of the target resource is all greater than 1, the reference power corresponding to the precoding matrix in the codebook subset corresponding to the uplink signal is determined according to the following formula:

$$Pi=P0*Ni/M_1;$$

Where, P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_1$ represents the maximum number of antenna ports supported by the terminal in one SRS resource;

When the first determination result indicates that at least part of the numbers of antenna ports of the target resource is different, and the number of antenna ports of the sounding reference signal resource indicated by the sounding reference signal resource indicator is less than $M_1$, the reference power corresponding to the precoding matrix in the codebook subset corresponding to the uplink signal is used to determine the predetermined second basic power as the reference power corresponding to any precoding matrix in the codebook subset corresponding to the uplink signal;

When the first determination result indicates that at least part of the numbers of antenna ports of the target resource is different, and the number of antenna ports of the sounding reference signal resource indicated by the sounding reference signal resource indicator is equal to $M_1$, the reference power corresponding to the precoding matrix in the codebook subset corresponding to the uplink signal is determined according to the following formula:

$$Pi=P0*Ni/M_1;$$

Where, P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_1$ represents the maximum number of antenna ports supported by the terminal in one SRS resource.

Mode 3: The determining the reference power corresponding to the precoding matrix in the codebook subset corresponding to the uplink signal according to the first determination result includes:

In the case that the terminal has the first preset capability, and the first determination result indicates that the number of antenna ports of the target resource is the same and the number of antenna ports of the target resource is all greater than 1, the reference power corresponding to the precoding matrix in the codebook subset corresponding to the uplink signal is determined according to the following formula:

$$Pi=P0*Ni/M_1;$$

Where, P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_1$ represents the maximum number of antenna ports supported by the terminal in one SRS resource;

In the case that the terminal has the first preset capability, and the first determination result indicates that at least part of the numbers of antenna ports of the target resource are different, the reference power corresponding to the precoding matrix in the codebook subset corresponding to the uplink signal is determined according to the following formula:

$$Pi=P0*\min\{2*Ni/M_2,1\};$$

Where, P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_2$ represents the number of antenna ports of the sounding reference signal resource used to determine the precoding matrix of the uplink signal;

The first preset capability includes at least one of supporting transmitting the uplink signal with full power, supporting being configured with a plurality of sounding reference signal resources for obtaining the channel state information of uplink that associated with different numbers of antenna ports, or supporting transmitting the uplink signal with full power with any two antenna ports.

Wherein, $\min\{2*N/M_2, 1\}$ is the smaller one of $2*N/M_2$ and 1. When the target resource includes one SRS set, the sounding reference signal resource used to determine the precoding matrix of the uplink signal is the target resource; when the target resource includes multiple SRS resources, the sounding reference signal resource used to determine the precoding matrix of the uplink signal is the SRS resource indicated by the SRI.

Wherein, the second basic power is a power determined by the base station according to a channel measurement situation, or the second basic power is a power value predefined by a network device. In addition, it should be noted that the terminal transmitting PUSCH with full power is defined in this embodiment, that is, without considering the simultaneous transmission of PUSCH and other signals, the uplink transmission power corresponding to at least one precoding codeword under the limitation of the uplink codebook subset is the transmission power of the PUSCH calculated according to the uplink power control formula (for example, in the NR system, corresponding to the transmission power of the PUSCH calculated in section 7.1.1 of the 3GPP protocol TS 38.213. When the transmission behavior of the terminal which does not meet the definition of the full power transmission is not full power transmission. If PUSCH and other signals (such as PUCCH or SRS) are transmitted at the same time (in a frequency division multiplexing manner), the transmission power of the terminal may need to be scaled according to the power of each signal. At this time, the transmission power of PUSCH needs to be multiplied by a coefficient related to signal multiplexing. In this case, the terminal transmits PUSCH with full power.

Optionally: the determining whether the number of antenna ports of the target resource are the same includes:

In the case that the terminal has a second preset capability, determining whether the number of antenna ports of the target resource is the same.

Optionally, in a case that the terminal has the third preset capability, the reference power corresponding to the precoding matrix in the codebook subset corresponding to the uplink signal is determined according to a predetermined first power control rule.

That is, when the terminal has one or more capabilities, it is determined whether the number of antenna ports of the target resource is the same, and based on the determination result, the reference power control rule corresponding to the precoding matrix in the codebook subset corresponding to the uplink signal is determined. The reference power corresponding to the precoding matrix in the codebook subset corresponding to the uplink signal is determined based on the transmission power control rule; under other capabilities, other transmission power control rules are used.

Optionally, the second preset capability or the third preset capability includes at least one of the following:

coherent transmission capability of the terminal;
codebook subset constraint information supported by the terminal;
indication information of codebook subset constraint transmitted with full power supported by the terminal, wherein the codebook subset that can be transmitted with full power means that there is at least one precoding matrix in the codebook subset so that the terminal can transmit uplink signals with full power;
power amplifier PA capability of the terminal;
full power transmission capability of the antenna port of the terminal;
capability that whether the terminal supports to transmit PUSCH using a precoding matrix that exceeds the PUSCH coherent transmission capability of the terminal;
full power transmission capability of the terminal.

Optionally, the determining the reference power corresponding to the precoding matrix in the codebook subset corresponding to the uplink signal according to the configuration information of the target resource includes:

In a case that the configuration information of the target resource is the first preset configuration information, determining the reference power corresponding to the precoding matrix in the codebook subset corresponding to the uplink signal according to the capability information of the terminal;

In a case that the configuration information of the target resource is the second preset configuration information, determining the reference power corresponding to the precoding matrix in the codebook subset corresponding to the uplink signal according to the predetermined second power control rule.

That is, under one or more SRS resource configurations, the reference power corresponding to the precoding matrix in the codebook subset corresponding to the uplink signal is determined based on the capabilities of the terminal. Under other SRS resource configurations, the reference power corresponding to the precoding matrix in the codebook subset corresponding to the uplink signal can be determined without the ability of the terminal.

Wherein, the first preset resource configuration may be a predefined configuration information of a target resource. For example, the number of antenna ports of the target resource is a predefined value, such as 4. For another example, the first preset resource configuration is the number of antenna ports of the target resource being equal to the maximum number of antenna ports supported by the terminal for PUCSH transmission. For another example, an example of the first preset resource configuration is: the target resource includes multiple SRS resources, and at least two SRS resources include different numbers of antenna ports.

The second preset resource configuration may be another predefined configuration information of the target resource, for example, the number of antenna ports of the target resource is 2. For another example, the second preset resource configuration is the number of antenna ports of the target resource being less than the maximum number of antenna ports supported by the terminal for PUCSH transmission. For another example, an example of the second preset resource configuration is: the target resource includes one SRS resource or multiple SRS resources including the same number of antenna ports.

Optionally, the target resource includes at least two sounding reference signal resources;

When the first resource is all the sounding reference signal resources of the first sounding reference signal resource set, determining the reference power corresponding to the precoding matrix in the codebook subset corresponding to the uplink signal according to the number of antenna ports of the first resource in the target resource includes:

Determining whether the number of antenna ports of the first resource are the same, and obtaining a second determination result;

Determining the reference power corresponding to the precoding matrix in the codebook subset corresponding to the uplink signal according to the second determination result.

That is, in the case that the target resource includes multiple SRS resources, the reference power corresponding to the precoding matrix in the codebook subset corresponding to the uplink signal may be further determined according to the number of antenna ports of the SRS resource of the SRS resource set in which the SRS resource indicated by the SRI is configured.

Wherein, SRI is SRS resource indication information, used to indicate the SRS resource corresponding to the SRS for determining the precoding matrix of the uplink signal, or used to indicate the SRS resource corresponding to the SRS for determining the analog beamforming of the uplink signal.

Optionally, when determining the reference power corresponding to the precoding matrix in the codebook subset corresponding to the uplink signal according to the second determination result, any one of the following mode 1, mode 2, and mode 3 may be specifically adopted:

Mode 1: In the case that the second determination result indicates that the number of antenna ports of the first resource is the same and is greater than 1, the reference power corresponding to the precoding matrix in the codebook subset corresponding to the uplink signal is determined according to the following formula:

$$Pi=P0*Ni/M_1;$$

Where P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_1$ represents the maximum number of antenna ports supported by the terminal in one SRS resource;

In the case that the second determination result indicates that at least part of the numbers of antenna ports of the first resource is different, the reference power corresponding to the precoding matrix in the codebook subset corresponding to the uplink signal is determined according to the following formula:

$$Pi=P0*Ni/M_2;$$

Where P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, the second ratio is $N/M_2$, where N represents the number of antenna ports with a non-zero transmission power of the uplink signal, and $M_2$ represents the number of antenna ports of the sounding reference signal resource for determining the precoding matrix of the uplink signal.

Mode 2: The determining the reference power corresponding to the precoding matrix in the codebook subset corresponding to the uplink signal according to the second determination result includes:

In the case that the second determination result indicates that the number of antenna ports of the first resource is the same and the number of antenna ports of the target resource is all greater than 1, the reference power corresponding to the precoding matrix in the codebook subset corresponding to the uplink signal is determined according to the following formula:

$$Pi=P0*Ni/M_1;$$

Where P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, the first ratio is $N/M_1$, where N represents the number of antenna ports with a non-zero transmission power of the uplink signal, and $M_1$ represents the maximum number of antenna ports supported by the terminal in one SRS resource.

When the second determination result indicates that at least part of the numbers of antenna ports of the first resource is different, and the number of antenna ports of the sounding reference signal resource indicated by the sounding reference signal resource indicator is less than $M_1$, the determining the reference power corresponding to the precoding matrix in the codebook subset corresponding to the uplink signal is to determine the predetermined second basic power as the reference power corresponding to any precoding matrix in the codebook subset corresponding to the uplink signal;

When the second determination result indicates that at least part of the numbers of antenna ports of the first resource is different, and the number of antenna ports of the sounding reference signal resource indicated by the sounding reference signal resource indicator is equal to $M_1$, the reference power corresponding to the precoding matrix in the codebook subset corresponding to the uplink signal is determined according to the following formula:

$$Pi=P0*Ni/M_1;$$

Where P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_1$ represents the maximum number of antenna ports supported by the terminal in one SRS resource.

Mode 3: The determining the reference power corresponding to the precoding matrix in the codebook subset corresponding to the uplink signal according to the second determination result includes:

In the case that the terminal has the first preset capability, and the second determination result indicates that the number of antenna ports of the first resource is the same and the number of antenna ports of the target resource is all greater than 1, the reference power corresponding to the precoding matrix in the codebook subset corresponding to the uplink signal is determined according to the following formula:

$$Pi=P0*Ni/M_1;$$

Where P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_1$ represents the maximum number of antenna ports supported by the terminal in one SRS resource;

In the case that the terminal has the first preset capability, and the second determination result indicates that at least part of the numbers of antenna ports of the first resource are different, the reference power corresponding to the precoding matrix in the codebook subset corresponding to the uplink signal is determined according the following formula:

$$Pi=P0*\min\{2*Ni/M_2,1\};$$

Where P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, where $M_2$ represents the number of antenna ports of the sounding reference signal resource for determining the precoding matrix of the uplink signal;

The first preset capability includes at least one of supporting transmitting the uplink signal with full power, supporting being configured with a plurality of sounding reference signal resources for obtaining the channel state information of uplink that associated with different numbers of antenna ports, or supporting transmitting the uplink signal with full power with any two antenna ports.

Optionally, when the first resource is the sounding reference signal resource indicated by the sounding reference signal resource indicator, the reference power corresponding to the precoding matrix in the codebook subset corresponding to the uplink signal is determined according to the number of antenna ports of the first resource in the target resource includes:

In the case that the number of antenna ports of the first resource is a fifth preset value, the predetermined second basic power is determined to be the reference power corresponding to any precoding matrix in the codebook subset corresponding to the uplink signal;

When the number of antenna ports of the first resource is a sixth preset value, the reference power corresponding to the precoding matrix in the codebook subset corresponding to the uplink signal is determined according to the following formula:

$$Pi=P0*Ni/M_3;$$

Where P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_3$ represents the number of antenna ports of the first resource.

Wherein, the value of the fifth preset value may be 1, and the value of the sixth preset value may be 2 and 4.

In addition, when the first resource is the sounding reference signal resource indicated by the sounding reference signal resource indicator, and when the reference power corresponding to the precoding matrix in the codebook subset corresponding to the uplink signal is determined according to the number of antenna ports of the first resource, any one of the following mode 1 or mode 2 can also be used:

Mode 1: The determining the reference power corresponding to the precoding matrix in the codebook subset corresponding to the uplink signal according to the number of antenna ports of the first resource in the target resource includes:

In the case that the terminal has the fourth preset capability, determining the reference power corresponding to the precoding matrix in the codebook subset corresponding to the uplink signal according to the number of antenna ports of the first resource.

Optionally, the step further includes:

In the case that the terminal has the fifth preset capability, determining the reference power corresponding to the precoding matrix in the codebook subset corresponding to the uplink signal according to the predetermined third power control rule.

That is, under one or more capabilities, the terminal uses different uplink signal transmission power determination methods for different numbers of antenna ports of the first resource to determine the reference power corresponding to the precoding matrix in the codebook subset corresponding to the uplink signal. Under other capabilities, for different numbers of antenna ports of the first resource, the same uplink signal transmission power determination method is used to determine the reference power corresponding to the precoding matrix in the codebook subset corresponding to the uplink signal.

The fourth preset capability may include a capability of the terminal to support full power transmission. For example, the fourth preset capability includes the terminal supporting the base station to configure multiple resources including different numbers of antenna ports for the terminal to perform full power transmission. For another example, the fourth preset capability includes that combination of any two PA/PUSCH antenna ports of the terminal can perform full power transmission. For another example, the fourth preset capability includes that the terminal does not support the base station to configure multiple resources including different numbers of antenna ports for the terminal to perform full power transmission. For another example, the fourth preset capability includes that any one PA/PUSCH antenna port of the terminal can perform full power transmission.

The fifth preset capability may include another capacity of the terminal to support full power transmission. For example, the fifth preset capability includes that the terminal does not support the base station to configure multiple resources with different numbers of antenna ports for the terminal to perform full power transmission. For another example, the fifth preset capability includes that any one PA/PUSCH antenna port of the terminal can perform full power transmission. The PA/PUSCH antenna port of the terminal can perform full power transmission, that means the PA or PUSCH antenna port of the terminal can reach the transmission power corresponding to the power level of the terminal. For another example, the fifth preset capability includes that the terminal supports the base station to configure multiple resources including different numbers of antenna ports for the terminal to perform full power transmission. For another example, the fifth preset capability includes that combination of any two PA/PUSCH antenna ports of the terminal can perform full power transmission.

Mode 3: The determining the reference power corresponding to the precoding matrix in the codebook subset corresponding to the uplink signal according to the number of antenna ports of the first resource in the target resource includes:

In a case that the number of antenna ports of the first resource is a first preset number, determining the reference power corresponding to the precoding matrix in the codebook subset corresponding to the uplink signal according to the capability information of the terminal;

In a case that the number of antenna ports of the first resource is a second preset number, determining the reference power corresponding to the precoding matrix in the codebook subset corresponding to the uplink signal according to a predetermined fourth power control rule.

That is, under one or the number of antenna ports of the first resource, the reference power corresponding to the precoding matrix in the codebook subset corresponding to the uplink signal is determined based on the capability of the UE, and under the number of antenna ports of other first resources, the transmission power of the uplink signal can be determined without the capability of the UE.

Optionally, the determining the reference power corresponding to the precoding matrix in the codebook subset corresponding to the uplink signal according to the number of antenna ports of the target resource includes:

Determining the reference power corresponding to the precoding matrix in the codebook subset corresponding to the uplink signal according to a relative relationship between the number of antenna ports of the target resource and the maximum number of antenna ports supported by the terminal in one SRS resource.

Wherein, the relationship is the size relationship between the number of antenna ports of the target resource and the maximum number of antenna ports of one SRS resource supported by the terminal.

The determining the reference power corresponding to the precoding matrix in the codebook subset corresponding to the uplink signal according to the number of antenna ports of the target resource includes:

In a case that the second indication information transmitted by the network device is received, and the second indication information indicates that the reference power corresponding to the precoding matrix in the codebook subset corresponding to the uplink signal is determined according to the number of antenna ports of the target resource, determining the reference power corresponding to the precoding matrix in the codebook subset corresponding to the uplink signal according to the number of antenna ports of the target resource;

or

In the case that the third indication information transmitted by the network device is received, determining the reference power corresponding to the precoding matrix in the codebook subset corresponding to the uplink signal according to the number of antenna ports of the target resource, and the third indication information is used to indicate that the reference power corresponding to the precoding matrix in the codebook subset corresponding to the uplink signal is determined according to the number of antenna ports of the target resource.

Wherein, the second indication information may indicate that the content of the reference power corresponding to the precoding matrix in the codebook subset corresponding to the uplink signal is determined according to the number of antenna ports of the target resource, or may indicate that the content of the reference power corresponding to the precoding matrix in the codebook subset corresponding to the uplink signal is determined without the number of antenna ports of the target resource. The third indication information has only one content, that is, it indicates that the reference power corresponding to the precoding matrix in the codebook subset corresponding to the uplink signal is determined according to the number of antenna ports of the target resource.

That is, the terminal may also receive the second indication information transmitted by the base station, and determine, based on the content indicated by the second indication information, whether to determine the reference power corresponding to the precoding matrix in the codebook subset corresponding to the uplink signal according to the number of antenna ports of the target resource. Alternatively, the terminal determines whether the third indication information transmitted by the base station is received, and when receiving the indication information, the reference power corresponding to the precoding matrix in the codebook subset corresponding to the uplink signal is determined according to the number of antenna ports of the target resource.

Optionally, the determining the reference power corresponding to the precoding matrix in the codebook subset corresponding to the uplink signal according to the first indication information from the network device includes:

Determining the reference power corresponding to the precoding matrix in the codebook subset corresponding to the uplink signal according to the method for determining the reference power indicated by the first indication information and at least one of the following information:

Scheduling information of uplink;

Configuration information of the sounding reference signal resource for obtaining the channel state information of uplink.

That is, the reference power corresponding to the precoding matrix in the codebook subset corresponding to the uplink signal is determined based on the scheduling information of uplink and/or the configuration information of the sounding reference signal resource for obtaining the channel state information of uplink combined with the first indication information.

Optionally, the first indication information is used to indicate a manner in which the terminal determines the reference power corresponding to the precoding matrix in the codebook subset corresponding to the uplink signal when the number of antenna ports of the uplink signal is a first preset value;

or

The first indication information is used to indicate a manner in which the terminal determines the reference power corresponding to the precoding matrix in the codebook subset corresponding to the uplink signal when the number of antenna ports of the second resource is a second preset value, and the second resource is the sounding reference signal resource used to determine the precoding matrix of the uplink signal.

Wherein, the first preset value may have one or more values, and the second preset value may also have one or more values.

In addition, the number of antenna ports of an uplink signal corresponds to a method for determining the reference power, and the method for determining the reference power corresponding to the different numbers of antenna ports of uplink signals may be the same or different. In the first indication information, when the number of antenna ports of the uplink signal has different values, the terminal determines the reference power corresponding to the precoding matrix in the codebook subset corresponding to the uplink signal by a joint indication or a separate indication, for example, a joint indication is: the number of antenna ports of the uplink signal is 1 and 2, the first power determination method is used; a separate indication is: when the number of antenna ports of the uplink signal is 1, the first power determination method is used, and when it is 2, the first power determination method is used. In addition, when the number of antenna ports of the uplink signal may have multiple values, the first indication information may only indicate a manner of determining the reference power under one or more of the values. When the uplink signal refers to the PUSCH, the number of antenna ports of the uplink signal is the number of PUSCH ports.

Similarly, the number of antenna ports of a second resource corresponds to a method for determining the reference power. The methods for determining the reference power corresponding to the different numbers of antenna ports of second resources may be the same or different. In the first indication information, when the numbers of antenna ports of the second resource have different values, the terminal determines the reference power corresponding to the precoding matrix in the codebook subset corresponding to the uplink signal by a joint indication or a separate indication, for example, the joint indication is: when the number of antenna ports is 1 and 2, the first power determination method is used; the separate indication is: when the number of antenna ports of the second resource is 1, the first power determination method is used, and when it is 2, the first power determination method is used. In addition, when the numbers of antenna ports of the second resource may have multiple values, the first indication information may only indicate a method for determining the reference power under one or more of the values.

In summary, the determination method of the reference power is described above.

Optionally, the method also includes:

Determining the codebook subset corresponding to the uplink signal and/or the overhead of uplink scheduling information according to the number of antenna ports of the target resource, or the number of antenna ports of the first resource in the target resource, or the fourth indication information from the network device;

Wherein, the first resource is a sounding reference signal resource indicated by a sounding reference signal resource indicator, or all sounding reference signal resources of a first sounding reference signal resource set, and the first sounding reference signal resource set is a resource set where the sounding reference signal indicated by the sounding reference signal resource indicator;

The fourth indication information is used to indicate the method of determining the codebook subset corresponding to the uplink signal and/or the overhead of the uplink scheduling information.

It can be seen that the codebook subset corresponding to the uplink signal and/or the overhead of uplink scheduling information can be determined according to the number of antenna ports of the target resource, or the number of antenna ports of the resource indicated by the SRI, or the number of antenna ports of all resources of the resource set in which the resource indicated by the SRI is configured.

Among them, after the terminal determines the codebook subset corresponding to the uplink signal and/or the overhead of the uplink scheduling information, the terminal determines a precoding and transmission stream number according to the codebook subset corresponding to the uplink signal and/or the overhead of the uplink scheduling information, and then the uplink signal is transmitted according to the precoding matrix and the number of transmission streams, and the transmission power of the uplink signal determined in the above.

Optionally, the determining the overhead of uplink scheduling information according to the number of antenna ports of the target resource, includes:

Determining the overhead of the precoding and transmission stream number indication information of the uplink scheduling information according to the number of antenna ports of the target resource, where the precoding and transmission stream number indication information are used to indicate the precoding matrix and transmission stream number of the uplink signal.

That is, the overhead of the precoding and transmission stream number indication information of the uplink scheduling information can be determined according to the number of antenna ports of the target resource.

Wherein, when the target resource includes one SRS resource set, any one of the following mode 1 and mode 2 may be used to determine the overhead of the indication information for precoding information and number of transmission layers overhead of the indication information for precoding information and number of transmission layers:

Mode 1: The method in Rel-15 version protocol TS38.212 of 3GPP, that is, the terminal determines the overhead of the precoding and transmission stream number indication information in DCI according to the codebook-subset indicated by the base station, the number of antenna ports of the PUSCH, the maxRank (the maximum number of transmission streams) of the PUSCH and the waveform of the uplink transmission, and decode the precoding and transmission stream number indication information in the DCI according to the overhead, and determine the precoding and transmission stream number corresponding to PUSCH transmission;

Mode 2: The terminal determines the number of antenna ports of all SRS resources, and determines the overhead of the indication information for precoding information and number of transmission layers based on the number. Optionally, if the base station indicates a codebook subset constraints signaling to the terminal, the terminal also needs to determine the overhead of the indication information for precoding information and number of transmission layers in combination with the codebook subset constraints signaling. Optionally, if the base station indicates a maximum transmission stream number signaling to the terminal, the terminal also needs to determine the overhead of the precoding and transmission stream number indication in combination with the maximum transmission stream number signaling. For example, the base station configures the terminal with two SRS resources for PUSCH transmission based on the codebook, and the numbers of antenna ports of the two SRS resources are 2 and 4 respectively, and the terminal determines the overhead of the indication information for precoding information and number of transmission layers according to 4 antenna ports. The precoding and transmission stream number indication information are part of the uplink scheduling information.

Wherein, when determining the codebook subset corresponding to the uplink signal and/or the overhead of the uplink scheduling information according to the number of antenna ports of the target resource, any one of the following mode 1, mode 2, mode 3, and mode 4 may be specifically used:

Mode 1: When the target resource includes at least two sounding reference signal resources, the determining the codebook subset corresponding to the uplink signal and/or the overhead of uplink scheduling information according to the number of antenna ports of the target resource includes:

Determining whether the number of antenna ports of the target resource is the same, and obtaining a third determination result;

According to the third determination result, determining the codebook subset corresponding to the uplink signal and/or the overhead of the uplink scheduling information.

Optionally, when the third determination result indicates that the number of antenna ports of the target resource is the same, the terminal determines the codebook subset corresponding to the uplink signal and/or the overhead of the uplink scheduling information using the method in the Rel-15 version protocol TS38.212 of 3GPP.

Optionally, when determining the precoding and transmission stream number of the uplink scheduling information according to the third determination result, if the third determination result indicates that at least part of the numbers of antenna ports of the target resource are different, the maximum number of antenna ports of the target resource is acquired, and the overhead of the indication information for precoding information and number of transmission layers is determined based on the maximum number. Wherein, if the base station indicates the codebook subset constraints signaling to the terminal, the terminal also needs to determine the overhead of the indication information for precoding information and number of transmission layers in combination with the codebook subset constraints signaling. Further, if the base station indicates the maximum transmission stream number signaling to the terminal, the terminal also needs to determine the overhead of the precoding and transmission stream number indication in combination with the maximum transmission stream number signaling. For example, the base station configures the terminal with two SRS resources for PUSCH transmission based on the codebook, and the number of antenna ports of the two SRS resources is 2 and 4 respectively, and the terminal determines the overhead of the indication information for precoding information and number of transmission layers according to 4 antenna ports. The precoding and transmission stream number indication information are part of the uplink scheduling information.

The examples refer to those in the terminal side, which will not be repeated.

Mode 2: The determining the codebook subset corresponding to the uplink signal and/or the overhead of the uplink scheduling information according to the number of antenna ports of the target resource includes:

Obtaining a maximum value of the number of antenna ports of the target resource;

Determining the codebook subset corresponding to the uplink signal and/or the overhead of the uplink scheduling information according to the maximum value of the number of antenna ports of the target resource.

That is, the terminal does not determine whether the number of antenna ports of the target resource is the same, but directly determines the codebook subset corresponding to the uplink signal and/or the overhead of the uplink scheduling information according to the maximum value of the number of antenna ports of the target resource.

Optionally, if the base station indicates the codebook subset constraints signaling to the terminal, the terminal also needs to determine the overhead of the indication information for precoding information and number of transmission layers in combination with the codebook subset constraints signaling. Optionally, if the base station indicates the maximum transmission stream number signaling to the terminal, the terminal also needs to determine the overhead of the precoding and transmission stream number indicator in combination with the maximum transmission stream number signaling. For example, the base station configures the terminal with two SRS resources for PUSCH transmission based on the codebook, and the number of antenna ports of the two SRS resources are 2 and 4 respectively, and the terminal determines the overhead of the precoding and transmission stream number indication information according to 4 antenna ports. The precoding and transmission stream number indication information are part of the uplink scheduling information.

In addition, if the uplink scheduling information is transmitted through the DCI, the terminal also needs to determine a candidate overhead of the DCI according to the precoding and transmission stream number indication information, and receive the DCI by using the overhead. Wherein, when the terminal determines the overhead of the precoding and transmission stream number indication information, the terminal can determine the encoding mode corresponding to the precoding and transmission stream number indication information, and then obtain the precoding and transmission stream number indication information according to the decoding of the DCI.

Mode 3: The determining the codebook subset corresponding to the uplink signal and/or the overhead of the uplink scheduling information according to the number of antenna ports of the target resource includes:

After receiving the fifth indication information transmitted by the network device, and the fifth indication information indicates that the codebook subset corresponding to the uplink signal and/or the overhead of the uplink scheduling information are determined according to the number of antenna ports of the target resource, the codebook subset corresponding to the uplink signal and/or the overhead of the uplink scheduling information is determined according to the number of antenna ports of the target resource.

Mode 4: The determining the codebook subset corresponding to the uplink signal and/or the overhead of uplink scheduling information according to the number of antenna ports of the target resource includes:

In the case of receiving the sixth indication information transmitted by the network device, determining the codebook subset corresponding to the uplink signal and/or the overhead of the uplink scheduling information according to the number of antenna ports of the target resource, the sixth indication information is used to indicate to determine the codebook subset corresponding to the uplink signal and/or the overhead of uplink scheduling information according to the number of antenna ports of the target resource.

Wherein, the fifth indication information may indicate that the codebook subset corresponding to the uplink signal and/or the overhead of the uplink scheduling information is determined according to the number of antenna ports of the target resource, or it may indicate that the codebook subset corresponding to the uplink signal and/or the overhead of the uplink scheduling information is determined without the number of antenna ports of the target resource. The sixth indication information has only one content, that is, it indicates that the codebook subset corresponding to the uplink signal and/or the overhead of the uplink scheduling information is determined according to the number of antenna ports of the target resource.

That is, the terminal may also receive the fifth indication information transmitted by the base station, and determine whether to determine the codebook subset corresponding to the uplink signal and/or the overhead of uplink scheduling information according to the number of antenna ports of the target resource or not based on the content indicated by the fifth indication information. Alternatively, the terminal determines whether the sixth indication information transmitted by the base station is received, and when receiving the sixth indication information, determines the codebook subset corresponding to the uplink signal and/or the overhead of uplink scheduling information according to the number of antenna ports of the target resource.

Optionally, when the first resource is all the sounding reference signal resources of the first sounding reference signal resource set, any one of the following mode 1, mode 2, mode 3, mode 4, and mode 5 may be used:

Mode 1: The determining the codebook subset corresponding to the uplink signal and/or the overhead of uplink scheduling information according to the number of antenna ports of the first resource in the target resource includes:

Determining whether the numbers of antenna ports of the first resource are the same, and obtaining a fourth determination result;

Determining the codebook subset corresponding to the uplink signal and/or the overhead of the uplink scheduling information according to the fourth determination result.

Mode 2: The determining the codebook subset corresponding to the uplink signal and/or the overhead of uplink scheduling information according to the number of antenna ports of the first resource in the target resource includes:

Obtaining a maximum value of the number of antenna ports of the first resource;

Determining the codebook subset corresponding to the uplink signal and/or the overhead of the uplink scheduling information according to the maximum value of the number of antenna ports of the first resource.

Mode 3: The determining the codebook subset corresponding to the uplink signal and/or the overhead of uplink scheduling information according to the number of antenna ports of the first resource in the target resource includes:

After ninth indication information transmitted by the network device is received, and the ninth indication information indicates that the codebook subset corresponding to the uplink signal and/or the overhead of the uplink scheduling information are determined according to the number of antenna ports of the first resource, determining the codebook subset corresponding to the uplink signal and/or the overhead of the uplink scheduling information is determined according to the number of antenna ports of the first resource.

Mode 4: The determining the codebook subset corresponding to the uplink signal and/or the overhead of uplink scheduling information according to the number of antenna ports of the first resource in the target resource includes:

In the case of receiving tenth indication information transmitted by the network device, determining the codebook subset corresponding to the uplink signal and/or the overhead of the uplink scheduling information according to the number of antenna ports of the first resource, the tenth indication information is used to indicate to determine the codebook subset corresponding to the uplink signal and/or the overhead of uplink scheduling information according to the number of antenna ports of the first resource.

Mode 5: The determining the codebook subset corresponding to the uplink signal and/or the overhead of uplink scheduling information according to the number of antenna ports of the first resource in the target resource includes:

In the case that the terminal has a sixth preset capability, determining the codebook subset corresponding to the uplink signal and/or the overhead of uplink scheduling information according to the number of antenna ports of the first resource.

Optionally, the determining the codebook subset corresponding to the uplink signal and/or the overhead of uplink scheduling information according to the number of antenna ports of the first resource in the target resource also includes:

In the case that the terminal has a seventh preset capability, determining the codebook subset corresponding to the uplink signal and/or the overhead of the uplink scheduling information according to a first preset rule.

That is, when the terminal has one or more capabilities, it is determined whether the number of antenna ports of the first resource is the same, and the transmission power control rule of the uplink signal is determined based on the determination result, and the codebook subset corresponding to the uplink signal and/or the overhead of the uplink scheduling information is determined based on the transmission power control rule; under other capabilities, other rules are used to determine the codebook subset corresponding to the uplink signal and/or the overhead of the uplink scheduling information.

Optionally, the sixth preset capability or the seventh preset capability includes at least one of the following:

coherent transmission capability of the terminal;

codebook subset constraints information supported by the terminal;

indication information of the codebook subset constraints supported by the terminal to perform full power transmission, wherein the codebook subset that can be transmitted with full power means that there is at least one precoding matrix in the codebook subset so that the terminal can transmit uplink signals with full power;

full power transmission capability of PAs of the terminal;

full power transmission capability of the antenna port of the terminal;

a capability whether the terminal supports to perform PUSCH transmission using a precoding matrix that exceeds the PUSCH coherent transmission capability of the terminal;

full power transmission capability of the terminal.

Optionally, when the first resource is a sounding reference signal resource indicated by a sounding reference signal resource indicator, determining the codebook subset corresponding to the uplink signal and/or the overhead of uplink scheduling information according to the number of antenna ports of the first resource in the target resource includes:

In the case that the number of antenna ports of the first resource is a third preset number, determining the codebook subset corresponding to the uplink signal and/or the overhead of uplink scheduling information according to the capability information of the terminal and/or the eighth indication information from the network device;

In a case that the number of antenna ports of the first resource is a fourth preset number, determining the codebook subset corresponding to the uplink signal and/or the overhead of uplink scheduling information according to a second preset rule.

Optionally, the determining the codebook subset corresponding to the uplink signal and/or the overhead of uplink scheduling information according to the number of antenna ports of the target resource includes:

In a case that the number of antenna ports of the first resource is the third preset number, determining the codebook subset corresponding to the uplink signal and/or the overhead of uplink scheduling information according to the capability information of the terminal;

In a case that the number of antenna ports of the first resource is a fourth preset number, determining the codebook subset corresponding to the uplink signal and/or the overhead of uplink scheduling information according to the second preset rule.

That is, under the number of antenna ports of one or more first resources, the codebook subset corresponding to the uplink signal and/or the overhead of uplink scheduling information is determined based on the capabilities of the terminal, and under the number of the antenna ports of the first resource, the codebook subset corresponding to the uplink signal and/or the overhead of the uplink scheduling information can be determined without the ability of the terminal.

Optionally, the fourth indication information is used to indicate the method of the terminal determining the codebook subset corresponding to the uplink signal and/or the overhead of the uplink scheduling information when the number of antenna ports of the uplink signal is the third preset value;

or

The fourth indication information is used to indicate the method of the terminal determining the codebook subset corresponding to the uplink signal and/or the overhead of the uplink scheduling information when the number of antenna ports of the second resource is the fourth preset value; the second resource is a sounding reference signal resource used to determine the precoding matrix of the uplink signal.

Wherein, the third preset value may be one or more values, and the fourth preset value may also be one or more values.

In addition, the number of antenna ports of an uplink signal corresponds to a method for determining the transmission power of the uplink signal, and the methods of determining the codebook subset corresponding to the uplink signal and/or the overhead of uplink scheduling information corresponding to numbers of antenna ports of different uplink signals can be the same or different. In the fourth indication information, when the numbers of antenna ports of the uplink signal are different, the method for the terminal to determine the codebook subset corresponding to the uplink signal and/or the overhead mode of the uplink scheduling information may be a joint indication or a separate indication, For example, a joint indication is: when the number of antenna ports of the uplink signal is 1 and 2, the first overhead determination method is used; a separate indication is: when the number of antenna ports of the uplink signal is 1, the first overhead determination method is used, and when it is 2, the first overhead determination method is used. Moreover, when the numbers of antenna ports of the uplink signal may have multiple values, the fourth indication information may only indicate the method for determining the codebook subset corresponding to the uplink signal and/or the overhead of the uplink scheduling information under one or more of the values.

Similarly, the number of antenna ports included a second resource corresponds to a method for determining the transmission power of the uplink signal, and the methods of determining the codebook subset corresponding to the uplink signal and/or the overhead of uplink scheduling information corresponding to numbers of antenna ports of different second resources can be the same or different. In the fourth indication information, when the numbers of antenna ports included the second resource are different, the method for the terminal to determine the codebook subset corresponding to the uplink signal and/or the overhead mode of the uplink scheduling information may be a joint indication or a separate indication, For example, a joint indication is: when the number of antenna ports of the second resource is 1 and 2, the first overhead determination method is used; a separate indication is: when the number of antenna ports of the second resource is 1, the first overhead determination method is used, and when it is 2, the first overhead determination method is used. Moreover, when the numbers of antenna ports of the second resource may have multiple values, the fourth indication information may only indicate the method for determining the codebook subset corresponding to the uplink signal and/or the overhead of the uplink scheduling information under one or more of the values.

Optionally, the capability information of the terminal includes at least one of the following:

A1: codebook subset supported by the terminal;

A2: indication information of codebook subset supported by the terminal that can be transmitted with full power, and the codebook subset transmitted with full power means that at least one precoding matrix included in the codebook subset enables the terminal to transmits the uplink signal with full power;

A3: combination of power amplifiers of the terminal for transmitting the uplink signal with full power;

A4: a maximum number of antenna ports in the target resource when all precoding matrices corresponding to the target resource support full power transmission;

A5: a minimum number of antenna ports in the target resource when all precoding matrices corresponding to the target resource support full power transmission;

A6: combination of antenna ports through which the terminal transmits the uplink signal with full power For item A3, optionally, the method of the UE reporting capability information is: the UE reports a precoding matrix set that supports full power transmission, and PA combination corresponding to the precoding matrices can perform full power transmission.

Optionally, positions of non-zero elements corresponding to any two precoding matrices in the precoding matrix set are different. In this way, the overhead of UE reporting capability can be reduced.

For example, it is possible that the set of precoding matrices reported by the UE is $\{[1\ 1\ 1\ 1], [1\ 0\ 1\ 0], [0\ 1\ 0\ 1]\}$, because positions of the non-zero elements corresponding to any two precoding matrices are different. However, the UE cannot report the precoding matrix set $\{[1\ 1\ 1\ 1], [1\ 0\ 1\ 0], [1\ 0\ j\ 0]\}$, because elements of $[1\ 0\ 1\ 0]$ and $[1\ 0\ j\ 0]$ corresponding to the first and third antenna ports are non-zero. After the base station receives the capability reported by the UE, it is assumed that any precoding matrix whose position of the non-zero element is the same as the position of the non-zero element corresponding to any one of the precoding matrices can be transmitted with full power.

Optionally, each precoding matrix in the precoding matrix set includes only one non-zero antenna port. After the base station receives the capability reported by the UE, it is assumed that the antenna port corresponding to any precoded non-zero element reported by the terminal can perform full power transmission.

For A4, for example, if the upper limit value is P, then the number of antenna ports of the SRS resource for which usage is 'codebook' (that is, the SRS resource used to obtain the CSI of the codebook-based PUSCH) is not greater than P, all TPMIs can be transmitted with full power.

For A5, for example, when the lower limit value is Q, then the number of antenna ports of the SRS resource for which usage is 'codebook' (that is, the SRS resource used to obtain the CSI of the codebook-based PUSCH) is less than Q, all TPMIs can be transmitted with full power.

For item A6, optionally, the UE reports the antenna ports for performing full power transmission in a bitmap manner. Optionally, the terminal reports a 4-bit capability information, and each bit indicates whether a port supports full power transmission. As an example, when each bit is 1, it means that the corresponding antenna port can perform full power transmission, and when it is 0, it means that the corresponding antenna port cannot perform full power transmission; of course, there can be another example, when each bit is 1, it means that the corresponding antenna port cannot perform full power transmission and when it is 0, it means that the corresponding antenna port can perform full power transmission.

Optionally, the capability information of the terminal may further include at least one of the following:

a number of first antenna ports supported by the terminal, the number of antenna ports being N means that when the number of antenna ports used for transmitting PUSCH is greater than or equal to N, the PUSCH being transmitted with full power;

a number of second antenna ports supported by the terminal, the number of antenna ports being N means that when the number of antenna ports used for transmitting PUSCH is greater than N, the PUSCH being transmitting with full power;

a maximum transmission power that each PA of the terminal can reach, for example, the terminal reports that each PA can reach ½ of the transmission power of the PA;

a maximum transmission power that each PA of the terminal can reach.

Optionally, the above-mentioned capabilities reported by the terminal are only applicable to a case that the number of antenna ports is equal to the maximum number of antenna ports of one sounding reference signal resource.

Optionally, the above-mentioned capabilities reported by the terminal are applicable to all SRS resources corresponding to codebook-based uplink transmission.

Optionally, the terminal may report different capabilities for the multiple numbers of antenna ports. That is, if the terminal supports the SRS resources with a maximum of 4 antenna ports, the terminal reports capability X for 4 antenna ports and reports capability Y for 2 antenna ports, where X and Y are two capabilities.

In summary, the embodiments of the present disclosure provide different methods for determining power control, codebook subset constraints, the overhead of the precoding and transmission stream numbers based on different numbers of ports of SRS resources of the SRS resource set of codebook-based uplink transmission in the system, for determining the precoding matrix and the number of transmission streams of PUSCH, for determining the overhead of the DCI and the information indicated by the DCI.

Among them, when the transmission of PUSCH corresponds to different SRS resources, different power control rules are used, which enables the terminal to transmit PUSCH corresponding to different SRS resources in different ways, so that the base station can flexibly schedule the terminal to perform full power transmission to against interference, or schedule the terminal to perform lower power transmission to match the channel in a better way and obtain better performance of the terminal.

In addition, when the transmission of PUSCH corresponds to different SRS resources, different codebook subset constrains and/or the overhead of precoding matrix and the number of transmission streams and/or the overhead of DCI can save overhead or the base station can flexibly schedule the terminal to perform transmission in different ways, so as to obtain better system performance.

The Third Embodiment

The embodiment of the present disclosure also provides a terminal, as shown in FIG. 3, including:

a first receiving module 301, configured to receive uplink scheduling information of uplink;

a first determining module 302, configured to determine transmission power of the uplink signal according to configuration information of a target resource or first indication information from a network device, wherein the target resource includes a sounding reference signal resource configured by the network device for obtaining the channel state information of uplink, and the first indication information is used to indicate a method of determining the transmission power of the uplink signal;

a first transmitting module 303, configured to transmit the uplink signal according to the transmission power and the uplink scheduling information.

Optionally, the first determining module 302 includes:

A first determining sub-module, configured to determine the transmission power of the uplink signal according to a number of antenna ports of a target resource or a number of antenna ports of a first resource in the target resource;

Wherein, the first resource is a sounding reference signal resource indicated by a sounding reference signal resource indicator, or all sounding reference signal resources of a first sounding reference signal resource set, and the first sounding reference signal resource set is a resource set in which a sounding reference signal resource indicated by the sounding reference signal resource indicator is configured.

Optionally, the target resource includes at least two sounding reference signal resources, and the first determining module 302 includes:

A determining sub-module, configured to determine whether the SRS resources in the target resource are with the same number of antenna ports, and obtain a first determination result;

a second determining sub-module, configured to determine the transmission power of the uplink signal according to the first determination result.

Optionally, the second determining sub-module includes:

a first processing unit, configured to: in the case that the first determination result indicates that the number of antenna ports of the SRS resources in the target resource is the same and the number of antenna ports of the target resource is all greater than 1, multiply the predetermined first basic power by the first ratio to obtain the first scaling power, and split the first scaling power equally across the antenna ports on which the UE transmits the uplink signal with non-zero power, wherein the first ratio is $N/M_1$, and N represents the number of antenna ports with a non-zero transmission power of the uplink signal, $M_1$ represents the maximum number of antenna ports supported by the terminal in one SRS resource;

A second processing unit, configured to in the case that the first determination result indicates that at least part of numbers of antenna ports of the SRS resources in the target resource is different, multiply the predetermined first basic power by a second ratio to obtain the second scaling power, and split the second scaling power equally across the antenna ports on which the UE transmits the uplink signal with non-zero power, wherein the second ratio is $N/M_2$, and N represents the number of antenna ports with the non-zero transmission power of the uplink signal, $M_2$ represents the number of antenna ports of the sounding reference signal resource used to determine the precoding matrix of the uplink signal;

or

The second determining sub-module includes:

a third processing unit, configured to: in the case that the first determination result indicates that the number of antenna ports of the SRS resources in the target resource is the same and the number of antenna ports of the target resource is all greater than 1, multiply the predetermined first basic power by the first ratio to obtain the first scaling power, and split the first scaling power equally across the antenna ports on which the UE transmits the uplink signal with non-zero power, wherein the first ratio is $N/M_1$, and N represents the number of antenna ports with a non-zero transmission power of the uplink signal, $M_1$ represents the maximum number of antenna ports supported by the terminal in one SRS resource;

a fourth processing unit, configured to, when the first determination result indicates that at least part of the numbers of antenna ports of the target resource are different, and the number of antenna ports of the sounding reference signal resource indicated by the sounding reference signal resource indicator is less than $M_1$, determine that the uplink signal is transmitted with full power;

a fifth processing unit, configured to: when the first determination result indicates that at least part of the numbers of antenna ports of the target resource is different, and the number of antenna ports of the sounding reference signal resource indicated by the sounding reference signal resource indicator is equal to $M_1$, multiply the predetermined first basic power by the first ratio to obtain the first scaling power, and split the first scaling power equally across the antenna ports on which the UE transmits the uplink signal with non-zero power, wherein the first ratio is $N/M_1$, N represents the number of antenna ports with a non-zero transmission power of the uplink signal, and $M_1$ represents the maximum number of antenna ports supported by the terminal in one SRS resource;

or

The second determining sub-module includes:

a sixth processing unit, configured to, in the case that the terminal has the first preset capability, and the first determination result indicates that the number of antenna ports of the target resource is the same and the number of antenna ports of the target resource is greater than one, multiply the predetermined first basic power by a first ratio to obtain the first scaling power, and split the first scaling power equally across the antenna ports on which the UE transmits the uplink signal with non-zero power, wherein the first ratio is $N/M_1$, N represents the number of antenna ports with a non-zero transmission power of the uplink signal, and $M_1$ represents the maximum number of antenna ports supported by the terminal in one SRS resource;

a seventh processing unit, configured to: in the case that the terminal has the first preset capability, and the first determination result indicates that at least part of the numbers of antenna ports of the target resource are different, multiply the predetermined first basic power by the third ratio to obtain the third scaling power, and split the third scaling power equally across the antenna ports on which the UE transmits the uplink signal with non-zero power, wherein the third ratio is $\min\{2*N/M_2, 1\}$, N represents the antenna ports with a non-zero transmission power of the uplink signal, and $M_2$ represents the number of antenna ports of the sounding reference signal resource used to determine the precoding matrix of the uplink signal;

The first preset capability includes at least one of supporting transmitting the uplink signal with full power, supporting being configured with a plurality of sounding reference signal resources for obtaining the channel state information of uplink that associated with different numbers of antenna ports, or supporting transmitting the uplink signal with full power with any two antenna ports.

Optionally, the target resource includes at least two sounding reference signal resources.

When the first resource is all sounding reference signal resources of the first sounding reference signal resource set, the second determining sub-module includes:

A first judging unit, configured to judge whether the number of antenna ports of the first resource are the same, and obtain a second determination result;

a first determining unit, configured to determine the transmission power of the uplink signal according to the second determination result.

Optionally, the first determining unit includes:

a first processing sub-unit, configured to, when the second determination result indicates that the number of antenna ports of the first resource is the same and is greater than 1, multiply the predetermined first basic power by a first ratio to obtain the first scaling power, and split the first scaling power equally across the antenna ports on which the UE transmits the uplink signal with non-zero power, wherein the first ratio is $N/M_1$, and N represents the number of antenna ports with a non-zero transmission power of the uplink signal, $M_1$ represents the maximum number of antenna ports supported by the terminal in one SRS resource;

a second processing sub-unit, configured to, when the second determination result indicates that at least part of the numbers of antenna ports of the first resource is different, multiply the predetermined first basic power by a second ratio to obtain the second scaling power, and split the second scaling power equally across the antenna ports on which the UE transmits the uplink signal with non-zero power, wherein the second ratio is $N/M_2$, where N represents the number of antenna ports with a non-zero transmission power of the uplink signal, $M_2$ represents the number of antenna ports of the sounding reference signal resource used to determine the precoding matrix of the uplink signal;

or

The first determining unit includes:

a third processing sub-unit, configured to, in the case that the second determination result indicates that the number of antenna ports of the first resource is the same and the number of antenna ports of the target resource is greater than 1, multiply the predetermined first basic power by the first ratio to obtain the first scaling power, and split the first scaling power equally across the antenna ports on which the UE transmits the uplink signal with non-zero power, wherein the first ratio is $N/M_1$, and N represents the number of antenna ports with a non-zero transmission power of the uplink signal, $M_1$ represents the maximum number of antenna ports supported by the terminal in one SRS resource;

a fourth processing sub-unit, configured to, when the second determination result indicates that at least part of the numbers of antenna ports of the first resource is different, and the number of antenna ports of the sounding reference signal resource indicated by the sounding reference signal resource indicator is less than $M_1$, determine that the uplink signal is transmitted with full power;

a fifth processing sub-unit, configured to, when the second determination result indicates that at least part of the numbers of antenna ports of the first resource are different, and the number of antenna ports of the sounding reference signal resource indicated by the sounding reference signal resource indicator is equal to $M_1$, multiply the predetermined first basic power by a first ratio to obtain the first scaling power, and split the first scaling power equally across the antenna ports on which the UE transmits the uplink signal with non-zero power, wherein the first ratio $N/M_1$, N represents the number of antenna ports with a non-zero transmission power of the uplink signal, and $M_1$ represents the maximum number of antenna ports supported by the terminal in one SRS resource;

or

The first determining unit includes:

a sixth processing sub-unit, configured to, in the case that the terminal has the first preset capability, and the second determination result indicates that the number of antenna ports of the first resource is the same and the number of antenna ports of the target resource is greater than 1, multiply the predetermined first basic power by a first ratio to obtain the first scaling power, and split the first scaling power equally across the antenna ports on which the UE transmits the uplink signal with non-zero power, wherein the first ratio is $N/M_1$, N represents the number of antenna ports with a non-zero transmission power of the uplink signal, and $M_1$ represents the maximum number of antenna ports supported by the terminal in one SRS resource;

a seventh processing sub-unit, configured to, in the case that the terminal has the first preset capability, and the second determination result indicates that at least part of the numbers of antenna ports of the first resource are different, multiply the predetermined first basic power by the first ratio to obtain the third scaling power, and split the third scaling power equally across the antenna ports on which the UE transmits the uplink signal with non-zero power, wherein the third ratio is $\min\{2*N/M_2, 1\}$, N represents the antenna ports with a non-zero transmission power of the uplink signal, and $M_2$ represents the number of antenna ports of the sounding reference signal resource used to determine the precoding matrix of the uplink signal;

The first preset capability includes at least one of supporting transmitting the uplink signal with full power, supporting being configured with a plurality of sounding reference signal resources for obtaining the channel state information of uplink that associated with different numbers of antenna ports, or supporting transmitting the uplink signal with full power with any two antenna ports.

Optionally, the first determining module 302 includes:

a third determining sub-module, configured to, when the configuration information of the target resource is the first preset configuration information, determine the transmission power of the uplink signal according to the capability information of the terminal and/or seventh indication information from the network device;

a fourth determining sub-module, configured to, when the configuration information of the target resource is the second preset configuration information, determine the transmission power of the uplink signal according to a predetermined second power control rule.

Optionally, when the first resource is a sounding reference signal resource indicated by a sounding reference signal resource indicator, the first determining sub-module includes:

A second determining unit, configured to, in a case that the number of antenna ports of the first resource is a fifth preset value, determine that the uplink signal is transmitted with full power; an eighth processing unit, configured to, in the case that the number of antenna ports of the first resource is a sixth preset value, multiply the predetermined first basic power by the fourth ratio to obtain the second scaling power, and split the second scaling power equally across the antenna ports on which the UE transmits the uplink signal with non-zero power, wherein the fourth ratio is $N/M_3$, where N represents the number of antenna ports with a non-zero transmission power of the uplink signal, and $M_3$ represents the number of antenna ports of the first resource.

Optionally, the first determining sub-module includes:

a third determining unit, configured to determine the transmission power of the uplink signal according to a relative relationship between the number of antenna ports of the target resource and the maximum number of antenna ports supported by the terminal in one SRS resource.

Optionally, the first determining sub-module includes:

a fourth determining unit, configured to, in a case that the second indication information transmitted by the network device is received, and the second indication information indicates that the transmission power of the uplink signal is determined according to the number of antenna ports of the target resource, determine the transmission power of the uplink signal according to the number of antenna ports of the target resource;

or

In the case that the third indication information transmitted by the network device is received, determine the transmission power of the uplink signal according to the number of antenna ports of the target resource, and the third indication information is used to indicate that the transmission power of the uplink signal is determined according to the number of antenna ports of the target resource.

Optionally, the first indication information is used to indicate a manner in which the terminal determines the transmission power of the uplink signal when the number of antenna ports of the uplink signal is a first preset value;

or

The first indication information is used to indicate a manner in which the terminal determines the transmission power of the uplink signal when the number of antenna ports of the second resource is a second preset value, and the second resource is the sounding reference signal resource used to determine the precoding matrix of the uplink signal.

Optionally, the terminal further includes:

a third determining sub-module, configured to determine the codebook subset corresponding to the uplink signal and/or the overhead of uplink scheduling information according to the number of antenna ports of the target resource, or the number of antenna ports of the first resource in the target resource, or the fourth indication information from the network device;

Wherein, the first resource is a sounding reference signal resource indicated by a sounding reference signal resource indicator, or all sounding reference signal resources of a first sounding reference signal resource set, and the first sounding reference signal resource set is a resource set where the sounding reference signal indicated by the sounding reference signal resource indicator;

The fourth indication information is used to indicate the method of determining the codebook subset corresponding to the uplink signal and/or the overhead of the uplink scheduling information.

Optionally, when the target resource includes at least two sounding reference signal resources, the third determining sub-module includes:

a second judging unit, configured to judge whether the number of antenna ports of the target resource is the same, and obtain a third determination result;

A fifth determining unit, configured to determine the codebook subset corresponding to the uplink signal and/or the overhead of uplink scheduling information according to the third determination result;

or

The third determining sub-module includes:

a first obtaining unit, configured to obtain a maximum value of the number of antenna ports of the target resource;

A sixth determining unit, configured to determine the codebook subset corresponding to the uplink signal and/or the overhead of uplink scheduling information according to the maximum value of the number of antenna ports of the target resource;

or

The third determining sub-module includes:

a seventh determining unit, configured to, in the case that fifth indication information transmitted by the network device is received, and the fifth indication information indicates that the codebook subset corresponding to the uplink signal and/or the overhead of the uplink scheduling information are determined according to the number of antenna ports of the target resource, determine the codebook subset corresponding to the uplink signal and/or the overhead of the uplink scheduling information according to the number of antenna ports of the target resource;

or

The third determining sub-module includes:

an eighth determining unit, configured to, in the case that sixth indication information transmitted by the network device is received, determine the codebook subset corresponding to the uplink signal and/or the overhead of the uplink scheduling information according to the number of antenna ports of the target resource, the sixth indication information is used to indicate to determine the codebook subset corresponding to the uplink signal and/or the overhead of uplink scheduling information according to the number of antenna ports of the target resource.

Optionally, when the first resource is all sounding reference signal resources of the first sounding reference signal resource set, the third determining sub-module includes:

A third judging unit, configured to judge whether the numbers of antenna ports of the first resource are the same, and obtaining a fourth determination result;

A ninth determining unit, configured to determine the codebook subset corresponding to the uplink signal and/or the overhead of the uplink scheduling information according to the fourth determination result;

or

The third determining sub-module includes:

A second obtaining unit, configured to obtain a maximum value of the number of antenna ports of the first resource;

A tenth determining unit, configured to determine the codebook subset corresponding to the uplink signal and/or the overhead of the uplink scheduling information according to the maximum value of the number of antenna ports of the first resource;

or

The third determining sub-module includes:

An eleventh determining unit, configured to, in the case that ninth indication information transmitted by the network device is received, and the ninth indication information indicates that the codebook subset corresponding to the uplink signal and/or the overhead of the uplink scheduling information are determined according to the number of antenna ports of the first resource, determine the codebook subset corresponding to the uplink signal and/or the overhead of the uplink scheduling information according to the number of antenna ports of the first resource;

or

The third determining sub-module includes:

a twelfth determining unit, configured to, in the case that tenth indication information transmitted by the network device is received, determine the codebook subset corresponding to the uplink signal and/or the overhead of the uplink scheduling information according to the number of antenna ports of the first resource, the tenth indication information is used to indicate to determine the codebook subset corresponding to the uplink signal and/or the overhead of uplink scheduling information according to the number of antenna ports of the first resource.

Optionally, when the first resource is the sounding reference signal resource indicated by the sounding reference signal resource indicator, the third determining sub-module includes:

A thirteenth determining unit, configured to, in the case that the number of antenna ports of the first resource is a third preset number, determine the codebook subset corresponding to the uplink signal and/or the overhead of uplink scheduling information according to the capability information of the terminal and/or the eighth indication information from the network device;

A fourteenth determining unit, configured to, in a case that the number of antenna ports of the first resource is a fourth preset number, determine the codebook subset corresponding to the uplink signal and/or the overhead of uplink scheduling information according to a second preset rule.

Optionally, when the first resource is the sounding reference signal resource indicated by the sounding reference signal resource indicator, the terminal further includes:

a fourth determining sub-module, configured to determine the overhead of the indication information for precoding information and number of transmission layers according to the number of antenna ports of the first resource.

Optionally, the fourth indication information is used to indicate the method of the terminal determining the codebook subset corresponding to the uplink signal and/or the overhead of the uplink scheduling information when the number of antenna ports of the uplink signal is the third preset value;

or

The fourth indication information is used to indicate the method of the terminal determining the codebook subset corresponding to the uplink signal and/or the overhead of the uplink scheduling information when the number of antenna ports of the second resource is the fourth preset value; the second resource is a sounding reference signal resource used to determine the precoding matrix of the uplink signal.

Optionally, the capability information of the terminal includes at least one of the following:

codebook subset supported by the terminal;

indication information of codebook subset supported by the terminal that can be transmitted with full power, and the codebook subset transmitted with full power means that at least one precoding matrix included in the codebook subset enables the terminal to transmits the uplink signal with full power;

combination of power amplifiers of the terminal for transmitting the uplink signal with full power;

a maximum number of antenna ports in the target resource when all precoding matrices corresponding to the target resource support full power transmission;

a minimum number of antenna ports in the target resource when all precoding matrices corresponding to the target resource support full power transmission;

combination of antenna ports through which the terminal transmits the uplink signal with full power In summary, the embodiments of the present disclosure can determine the transmission power of the uplink signal according to the configuration information of the sounding reference signal resource configured by the network device for the terminal to obtain the channel state information of uplink, or the indication information from the network device, so that the uplink signal can be transmitted according to the received uplink scheduling information of uplink and the transmission power. Therefore, the embodiments of the present disclosure determine the transmission power of the uplink signal according to the configuration information of the sounding reference signal resource configured by the network device for the terminal to obtain the channel state information of uplink or the specific instruction of the network device, so that the uplink signal can use different uplink transmission power under different SRS resource configuration information, better uplink transmission performance can be obtained for different application scenarios.

Fourth Embodiment

The embodiment of the present disclosure also provides a network device, as shown in FIG. 4, including:

a second determining module 401, configured to determine reference power corresponding to a precoding matrix in a codebook subset corresponding to an uplink signal according to configuration information of a target resource or using a power determination method indicated by first indication information transmitted to a terminal, wherein the target resource includes a sounding reference signal resource configured by the network device for obtaining the channel state information of uplink, and the first indication information is used to indicate a method of determining the transmission power of the uplink signal;

a third determining module 402, configured to determine the uplink scheduling information of uplink according to the reference power corresponding to the precoding matrix in the codebook subset corresponding to the uplink signal;

a second transmitting module 403, configured to transmit the uplink scheduling information to the terminal.

Optionally, the second determining module 401 includes:

a fifth determining sub-module, configured to determine the reference power corresponding to the precoding matrix in the codebook subset corresponding to the uplink signal according to the number of antenna ports of the target resource or the number of antenna ports of the first resource in the target resource, Wherein, the first resource is a sounding reference signal resource indicated by a sounding reference signal resource indicator, or all sounding reference signal resources of a first sounding reference signal resource set, and the first sounding reference signal resource set is the resource set in which the sounding reference signal resource indicated by a sounding reference signal resource is configured.

Optionally, the fifth determining sub-module includes:

A fourth judging unit, configured to judge whether the SRS resources in the target resource are with the same number of antenna ports, and obtain a first determination result;

a fifteenth determining unit, configured to determine the reference power corresponding to the precoding matrix in the codebook subset corresponding to the uplink signal according to the first determination result.

Optionally, the fifteenth determining unit includes:

an eighth processing sub-unit, configured to, in the case that the first determination result indicates that the numbers of antenna ports of the SRS resources in the target resource is the same and the number of antenna ports of the target resource is all greater than 1, determine the reference power corresponding to the precoding matrix in the codebook subset corresponding to the uplink signal is determined according to the following formula:

$$Pi = P0 * Ni / M_1;$$

Where, P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_1$ represents the maximum number of antenna ports supported by the terminal in one SRS resource;

a ninth processing sub-unit, configured to, in the case that the first determination result indicates that at least part of the number of antenna ports of the SRS resources in the target resource is different, determine the reference power corresponding to the precoding matrix in the codebook subset corresponding to the uplink signal according to the following formula:

$$Pi = P0 * Ni / M_2;$$

Wherein, P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_2$ represents the number of antenna ports of the sounding reference signal resource used to determine the precoding matrix of the uplink signal.

or

The fifteenth determining unit includes:

a tenth processing sub-unit, configured to, in the case that the first determination result indicates that the number of antenna ports of the SRS resources in the target resource is the same and the number of antenna ports of the target resource is all greater than 1, determine the reference power corresponding to the precoding matrix in the codebook subset corresponding to the uplink signal according to the following formula:

$Pi=P0*Ni/M_1$;

Where, P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the code-book subset corresponding to the uplink signal, $M_1$ represents the maximum number of antenna ports of a sounding reference signal resource supported by the terminal;

an eleventh processing sub-unit, configured to, when the first determination result indicates that at least part of the numbers of antenna ports of the target resource is different, and the number of antenna ports of the sounding reference signal resource indicated by the sounding reference signal resource indicator is less than $M_1$, determine the reference power corresponding to the precoding matrix in the codebook subset corresponding to the uplink signal, determine the predetermined second basic power as the reference power corresponding to any precoding matrix in the codebook subset corresponding to the uplink signal;

a twelfth processing sub-unit, configured to, when the first determination result indicates that at least part of the numbers of antenna ports of the target resource is different, and the number of antenna ports of the sounding reference signal resource indicated by the sounding reference signal resource indicator is equal to $M_1$, determine the reference power corresponding to the precoding matrix in the codebook subset corresponding to the uplink signal according to the following formula:

$Pi=P0*Ni/M_1$;

Where, P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_1$ represents the maximum number of antenna ports supported by the terminal in one SRS resource.

or

The fifteenth determining unit includes:

a thirteenth processing sub-unit, configured to, in the case that the terminal has the first preset capability, and the first determination result indicates that the number of antenna ports of the target resource is the same and the number of antenna ports of the target resource is all greater than 1, determine the reference power corresponding to the precoding matrix in the codebook subset corresponding to the uplink signal according to the following formula:

$Pi=P0*Ni/M_1$;

Where, P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the code-book subset corresponding to the uplink signal, $M_1$ represents the maximum number of antenna ports supported by the terminal in one SRS resource;

a fourteenth processing sub-unit, configured to, in the case that the terminal has the first preset capability, and the first determination result indicates that at least part of the numbers of antenna ports of the target resource are different, determine the reference power corresponding to the precoding matrix in the codebook subset corresponding to the uplink signal according to the following formula:

$Pi=P0*\min\{2*Ni/M_2,1\}$;

Where, P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the code-book subset corresponding to the uplink signal, $M_2$ represents the number of antenna ports of the sounding reference signal resource used to determine the precoding matrix of the uplink signal;

The first preset capability includes at least one of supporting transmitting the uplink signal with full power, supporting being configured with a plurality of sounding reference signal resources for obtaining the channel state information of uplink that associated with different numbers of antenna ports, or supporting transmitting the uplink signal with full power with any two antenna ports.

Optionally, the target resource includes at least two sounding reference signal resources;

When the first resource is all sounding reference signal resources of the first sounding reference signal resource set, the fifth determining sub-module includes:

A fifth judging unit, configured to judge whether the number of antenna ports of the first resource are the same, and obtaining a second determination result;

a sixteenth determining unit, configured to determine the reference power corresponding to the precoding matrix in the codebook subset corresponding to the uplink signal according to the second determination result.

Optionally, the sixteenth determining unit includes:

a fifteenth processing sub-unit, configured to, in the case that the second determination result indicates that the number of antenna ports of the first resource is the same and is greater than 1, determine the reference power corresponding to the precoding matrix in the codebook subset corresponding to the uplink signal according to the following formula:

$Pi=P0*Ni/M_1$;

Where P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_1$ represents the maximum number of antenna ports supported by the terminal in one SRS resource;

a sixteenth processing sub-unit, configured to, in the case that the second determination result indicates that at least part of the numbers of antenna ports of the first resource is different, determine the reference power corresponding to the precoding matrix in the codebook subset corresponding to the uplink signal according to the following formula:

$$Pi=P0*Ni/M_2;$$

Where P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, the second ratio is $N/M_2$, where N represents the number of antenna ports with a non-zero transmission power of the uplink signal, and $M_2$ represents the number of antenna ports of the sounding reference signal resource for determining the precoding matrix of the uplink signal;

or

The sixteenth determining unit includes:

a seventeenth processing sub-unit, configured to: in the case that the second determination result indicates that the number of antenna ports of the first resource is the same and the number of antenna ports of the target resource is all greater than 1, determine the reference power corresponding to the precoding matrix in the codebook subset corresponding to the uplink signal according to the following formula:

$$Pi=P0*Ni/M_1;$$

Where P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, the first ratio is $N/M_1$, where N represents the number of antenna ports with a non-zero transmission power of the uplink signal, and $M_1$ represents the maximum number of antenna ports supported by the terminal in one SRS resource;

an eighteenth processing sub-unit, configured to, when the second determination result indicates that at least part of the numbers of antenna ports of the first resource is different, and the number of antenna ports of the sounding reference signal resource indicated by the sounding reference signal resource indicator is less than $M_1$, determine the reference power corresponding to the precoding matrix in the codebook subset corresponding to the uplink signal, determine the predetermined second basic power as the reference power corresponding to any precoding matrix in the codebook subset corresponding to the uplink signal;

A nineteenth processing sub-unit, configured to, when the second determination result indicates that at least part of the numbers of antenna ports of the first resource is different, and the number of antenna ports of the sounding reference signal resource indicated by the sounding reference signal resource indicator is equal to $M_1$, determine the reference power corresponding to the precoding matrix in the codebook subset corresponding to the uplink signal according to the following formula:

$$Pi=P0*Ni/M_1;$$

Where P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_1$ represents the maximum number of antenna ports supported by the terminal in one SRS resource;

or

The sixteenth determining unit includes:

a twentieth processing sub-unit, configured to, in the case that the terminal has the first preset capability, and the second determination result indicates that the number of antenna ports of the first resource is the same and the number of antenna ports of the target resource is all greater than 1, determine the reference power corresponding to the precoding matrix in the codebook subset corresponding to the uplink signal according to the following formula:

$$Pi=P0*Ni/M_1;$$

Where P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_1$ represents the maximum number of antenna ports supported by the terminal in one SRS resource;

a twenty-first processing sub-unit, configured to, in the case that the terminal has the first preset capability, and the second determination result indicates that at least part of the numbers of antenna ports of the first resource are different, determine the reference power corresponding to the precoding matrix in the codebook subset corresponding to the uplink signal according the following formula:

$$Pi=P0*\min\{2*Ni/M_2,1\};$$

Where P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, where $M_2$ represents the number of antenna ports of the sounding reference signal resource for determining the precoding matrix of the uplink signal;

The first preset capability includes at least one of supporting transmitting the uplink signal with full power, supporting being configured with a plurality of sounding reference signal resources for obtaining the channel state information of uplink that associated with different numbers of antenna ports, or supporting transmitting the uplink signal with full power with any two antenna ports.

Optionally, the second determining module 401 includes:

a sixth determining sub-module, configured to determine the reference power corresponding to the precoding matrix in the codebook subset corresponding to the uplink signal according to the capability information of the terminal and/or seventh indication information from the network device when the configuration information of the target resource is the first preset configuration information;

a seventh determining sub-module, configured to determine the reference power corresponding to the precoding matrix in the codebook subset corresponding to the uplink signal according to the predetermined second power control rule when the configuration information of the target resource is the second preset configuration information.

Optionally, when the first resource is a sounding reference signal resource indicated by a sounding reference signal resource indicator, the fifth determining sub-module includes:

A seventeenth determining unit, configured to determine the predetermined second basic power as the reference power corresponding to any one of the precoding matrixes in the codebook subset corresponding to the uplink signal when the number of antenna ports of the first resource is a fifth preset value;

a ninth processing unit, configured to, when the number of antenna ports of the first resource is a sixth preset value, determine the reference power corresponding to the precoding matrix in the codebook subset corresponding to the uplink signal according to the following formula:

$$Pi=P0*Ni/M_3;$$

Where P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_3$ represents the number of antenna ports of the first resource.

Optionally, the fifth determining sub-module includes:

an eighteenth determining unit, configured to determine the reference power corresponding to the precoding matrix in the codebook subset corresponding to the uplink signal according to a relative relationship between the number of antenna ports of the target resource and the maximum number of antenna ports supported by the terminal in one SRS resource.

Optionally, the fifth determining sub-module includes:

a nineteenth determining unit, configured to, in a case that the second indication information transmitted by the network device is received, and the second indication information indicates that the reference power corresponding to the precoding matrix in the codebook subset corresponding to the uplink signal is determined according to the number of antenna ports of the target resource, determine the reference power corresponding to the precoding matrix in the codebook subset corresponding to the uplink signal according to the number of antenna ports of the target resource;

or

In the case that the third indication information transmitted by the network device is received, determine the reference power corresponding to the precoding matrix in the codebook subset corresponding to the uplink signal according to the number of antenna ports of the target resource, and the third indication information is used to indicate that the reference power corresponding to the precoding matrix in the codebook subset corresponding to the uplink signal is determined according to the number of antenna ports of the target resource.

Optionally, the first indication information is used to indicate a manner in which the terminal determines the reference power corresponding to the precoding matrix in the codebook subset corresponding to the uplink signal when the number of antenna ports of the uplink signal is a first preset value;

or

The first indication information is used to indicate a manner in which the terminal determines the reference power corresponding to the precoding matrix in the codebook subset corresponding to the uplink signal when the number of antenna ports of the second resource is a second preset value, and the second resource is the sounding reference signal resource used to determine the precoding matrix of the uplink signal.

Optionally, the user equipment further includes:

a seventh determining sub-module, configured to determine the codebook subset corresponding to the uplink signal and/or the overhead of uplink scheduling information according to the number of antenna ports of the target resource, or the number of antenna ports of the first resource in the target resource, or the fourth indication information from the network device;

Wherein, the first resource is a sounding reference signal resource indicated by a sounding reference signal resource indicator, or all sounding reference signal resources of a first sounding reference signal resource set, and the first sounding reference signal resource set is a resource set where the sounding reference signal indicated by the sounding reference signal resource indicator;

The fourth indication information is used to indicate the method of determining the codebook subset corresponding to the uplink signal and/or the overhead of the uplink scheduling information.

Optionally, when the target resource includes at least two sounding reference signal resources, the seventh determining sub-module includes:

A sixth judging unit, configured to judge whether the number of antenna ports of the target resource is the same, and obtain a third determination result;

A twentieth determining unit, configured to determine the codebook subset corresponding to the uplink signal and/or the overhead of the uplink scheduling information according to the third determination result;

or

The seventh determining sub-module includes:

A third obtaining unit, configured to obtain a maximum value of the number of antenna ports of the target resource;

A twenty-first determining unit, configured to determine the codebook subset corresponding to the uplink signal and/or the overhead of the uplink scheduling information according to the maximum value of the number of antenna ports of the target resource;

or

The seventh determining sub-module includes:

a twenty-second determining unit, configured to, in the case that the fifth indication information transmitted by the network device is received, and the fifth indication information indicates that the codebook subset corresponding to the uplink signal and/or the overhead of the uplink scheduling information are determined according to the number of antenna ports of the target resource, determine the codebook subset corresponding to the uplink signal and/or the overhead of the uplink scheduling information according to the number of antenna ports of the target resource;

or

The seventh determining sub-module includes:

a twenty-third determining unit, configured to, in the case that the sixth indication information transmitted by the network device is received, determine the codebook subset corresponding to the uplink signal and/or the overhead of the uplink scheduling information according to the number of antenna ports of the target resource, the sixth indication information is used to indicate to determine the codebook subset corresponding to the uplink signal and/or the overhead of uplink scheduling information according to the number of antenna ports of the target resource.

Optionally, when the first resource is all sounding reference signal resources of the first sounding reference signal resource set, the seventh determining sub-module includes:

A seventh judging unit, configured to judge whether the numbers of antenna ports of the first resource are the same, and obtain a fourth determination result;

A twenty-fourth determining unit, configured to determine the codebook subset corresponding to the uplink signal and/or the overhead of the uplink scheduling information according to the fourth determination result;

or

The seventh determining sub-module includes:

A fourth obtaining unit, configured to obtain a maximum value of the number of antenna ports of the first resource;

A twenty-fifth determining unit, configured to determine the codebook subset corresponding to the uplink signal and/or the overhead of the uplink scheduling information according to the maximum value of the number of antenna ports of the first resource;

or

The seventh determining sub-module includes:

A twenty-sixth determining unit, configured to, in the case that ninth indication information transmitted by the network device is received, and the ninth indication information indicates that the codebook subset corresponding to the uplink signal and/or the overhead of the uplink scheduling information are determined according to the number of antenna ports of the first resource, determine the codebook subset corresponding to the uplink signal and/or the overhead of the uplink scheduling information is determined according to the number of antenna ports of the first resource;

or

The seventh determining sub-module includes:

A twenty-seventh determining unit, configured to, in the case that tenth indication information transmitted by the network device is received, determine the codebook subset corresponding to the uplink signal and/or the overhead of the uplink scheduling information according to the number of antenna ports of the first resource, the tenth indication information is used to indicate to determine the codebook subset corresponding to the uplink signal and/or the overhead of uplink scheduling information according to the number of antenna ports of the first resource.

Optionally, when the first resource is a sounding reference signal resource indicated by a sounding reference signal resource indicator, the seventh determining sub-module includes:

A twenty-eighth determining unit, configured to, in the case that the number of antenna ports of the first resource is a third preset number, determine the codebook subset corresponding to the uplink signal and/or the overhead of uplink scheduling information according to the capability information of the terminal and/or the eighth indication information from the network device;

A twenty-ninth determining unit, configured to, in a case that the number of antenna ports of the first resource is a fourth preset number, determine the codebook subset corresponding to the uplink signal and/or the overhead of uplink scheduling information according to a second preset rule.

Optionally, when the first resource is the sounding reference signal resource indicated by the sounding reference signal resource indication, the user equipment further includes:

An eighth determining sub-module, configured to determine the overhead of the indication information for precoding information and number of transmission layers according to the number of antenna ports of the first resource.

Optionally, the fourth indication information is used to indicate the method of the terminal determining the codebook subset corresponding to the uplink signal and/or the overhead of the uplink scheduling information when the number of antenna ports of the uplink signal is the third preset value;

or

The fourth indication information is used to indicate the method of the terminal determining the codebook subset corresponding to the uplink signal and/or the overhead of the uplink scheduling information when the number of antenna ports of the second resource is the fourth preset value; the second resource is a sounding reference signal resource used to determine the precoding matrix of the uplink signal.

Optionally, the capability information of the terminal includes at least one of the following:

codebook subset supported by the terminal;

indication information of codebook subset supported by the terminal that can be transmitted with full power, and the codebook subset transmitted with full power means that at least one precoding matrix included in the codebook subset enables the terminal to transmits the uplink signal with full power;

combination of power amplifiers of the terminal for transmitting the uplink signal with full power;

a maximum number of antenna ports in the target resource when all precoding matrices corresponding to the target resource support full power transmission;

a minimum number of antenna ports in the target resource when all precoding matrices corresponding to the target resource support full power transmission;

combination of antenna ports through which the terminal transmits the uplink signal with full power.

In summary, the embodiments of the present disclosure can determine the transmission power of the uplink signal according to the configuration information of the sounding reference signal resource configured by the network device for the terminal to obtain the channel state information of uplink, or the indication information from the network device, so that the uplink signal can be transmitted according to the received uplink scheduling information of uplink and the transmission power. Therefore, the embodiments of the present disclosure determine the transmission power of the uplink signal according to the configuration information of the sounding reference signal resource configured by the network device for the terminal to obtain the channel state information of uplink or the specific instruction of the network device, so that the uplink signal can use different uplink transmission power under different SRS resource configuration information, better uplink transmission performance can be obtained for different application scenarios.

Fifth Embodiment

Figure 5:
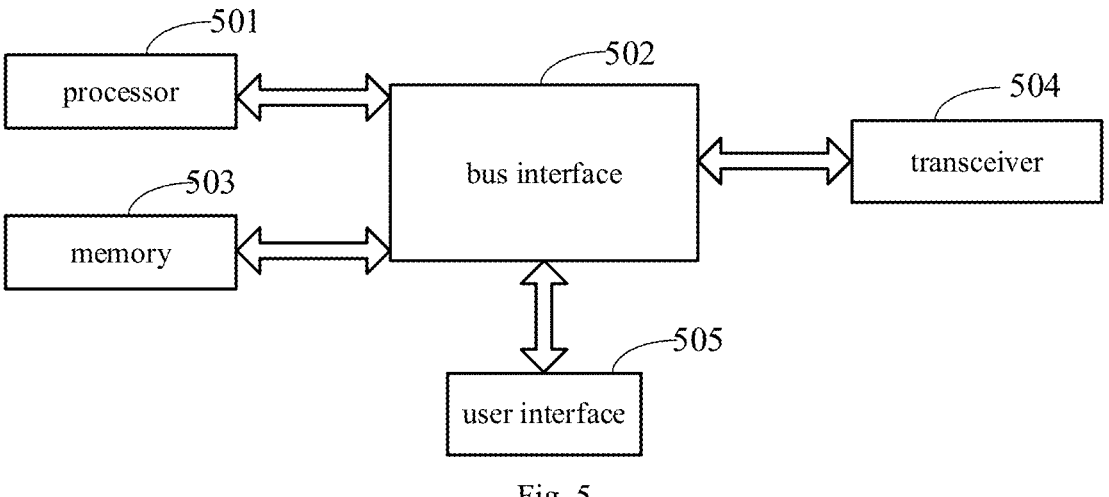
FIG. 5 is a structural block diagram of the UE according to an embodiment of the disclosure.

As shown in FIG. 5, this embodiment provides a user equipment, including:

A processor 501; and a memory 503 connected to the processor 501 through a bus interface 502, the memory 503 is used to store programs and data used by the processor 501 when performing operations, when the processor 501 calls and executes all the programs and data stored in the memory 503, the following process is executed.

The transceiver 504 is connected to the bus interface 502, and is used to receive and transmit data under the control of the processor 501.

Specifically, the processor 501 implements the following steps when executing the computer program:

receiving uplink scheduling information of uplink;

determining transmission power of the uplink signal according to configuration information of a target resource or first indication information from a network device, wherein the target resource includes a sounding reference signal resource configured by the network device for obtaining the channel state information of uplink, and the first indication information is used to indicate a method of determining the transmission power of the uplink signal;

transmitting the uplink signal according to the transmission power and the uplink scheduling information.

Optionally, the processor 501 implements the following steps when executing the computer program:

determining the transmission power of the uplink signal according to a number of antenna ports of a target resource or a number of antenna ports of a first resource in the target resource;

Wherein, the first resource is a sounding reference signal resource indicated by a sounding reference signal resource indicator, or all sounding reference signal resources of a first sounding reference signal resource set, and the first sounding reference signal resource set is a resource set in which a sounding reference signal resource indicated by the sounding reference signal resource indicator is configured.

Optionally, the target resource includes at least two sounding reference signal resources. The processor 501 implements the following steps when executing the computer program:

determining whether the SRS resources in the target resource are with the same number of antenna ports, and obtain a first determination result;

determining the transmission power of the uplink signal according to the first determination result.

Optionally, the processor 501 implements the following steps when executing the computer program:

in the case that the first determination result indicates that the number of antenna ports of the SRS resources in the target resource is the same and the number of antenna ports of the target resource is all greater than 1, multiplying the predetermined first basic power by the first ratio to obtain the first scaling power, and splitting the first scaling power equally across the antenna ports on which the UE transmits the uplink signal with non-zero power, wherein the first ratio is $N/M_1$, and N represents the number of antenna ports with a non-zero transmission power of the uplink signal, $M_1$ represents the maximum number of antenna ports supported by the terminal in one SRS resource;

in the case that the first determination result indicates that at least part of numbers of antenna ports of the SRS resources in the target resource is different, multiplying the predetermined first basic power by a second ratio to obtain the second scaling power, and splitting the second scaling power equally across the antenna ports on which the UE transmits the uplink signal with non-zero power, wherein the second ratio is $N/M_2$, and N represents the number of antenna ports with the non-zero transmission power of the uplink signal, $M_2$ represents the number of antenna ports of the sounding reference signal resource used to determine the precoding matrix of the uplink signal;

or

The determining the transmission power of the uplink signal according to the first determination result includes:

in the case that the first determination result indicates that the number of antenna ports of the SRS resources in the target resource is the same and the number of antenna ports of the target resource is all greater than 1, multiplying the predetermined first basic power by the first ratio to obtain the first scaling power, and splitting the first scaling power equally across the antenna ports on which the UE transmits the uplink signal with non-zero power, wherein the first ratio is $N/M_1$, and N represents the number of antenna ports with a non-zero transmission power of the uplink signal, $M_1$ represents the maximum number of antenna ports supported by the terminal in one SRS resource;

when the first determination result indicates that at least part of the numbers of antenna ports of the target resource are different, and the number of antenna ports of the sounding reference signal resource indicated by the sounding reference signal resource indicator is less than $M_1$, determining that the uplink signal is transmitted with full power;

when the first determination result indicates that at least part of the numbers of antenna ports of the target resource is different, and the number of antenna ports of the sounding reference signal resource indicated by the sounding reference signal resource indicator is equal to $M_1$, multiplying the predetermined first basic power by the first ratio to obtain the first scaling power, and splitting the first scaling power equally across the antenna ports on which the UE transmits the uplink signal with non-zero power, wherein the first ratio is $N/M_1$, N represents the number of antenna ports with a non-zero transmission power of the uplink signal, and $M_1$ represents the maximum number of antenna ports supported by the terminal in one SRS resource;

or

The determining the transmission power of the uplink signal according to the first determination result includes:

in the case that the terminal has the first preset capability, and the first determination result indicates that the number of antenna ports of the target resource is the same and the number of antenna ports of the target resource is greater than one, multiplying the predetermined first basic power by a first ratio to obtain the first scaling power, and splitting the first scaling power equally across the antenna ports on which the UE transmits the uplink signal with non-zero power, wherein the first ratio is $N/M_1$, N represents the number of antenna ports with a non-zero transmission power of the uplink signal, and $M_1$ represents the maximum number of antenna ports supported by the terminal in one SRS resource;

in the case that the terminal has the first preset capability, and the first determination result indicates that at least part of the numbers of antenna ports of the target resource are different, multiplying the predetermined first basic power by the third ratio to obtain the third scaling power, and splitting the third scaling power equally across the antenna ports on which the UE transmits the uplink signal with non-zero power, wherein the third ratio is $\min\{2*N/M_2, 1\}$, N represents the antenna ports with a non-zero transmission power of the uplink signal, and $M_2$ represents the number of antenna ports of the sounding reference signal resource used to determine the precoding matrix of the uplink signal;

The first preset capability includes at least one of supporting transmitting the uplink signal with full power, supporting being configured with a plurality of sounding reference signal resources for obtaining the channel state information of uplink that associated with different numbers of antenna ports, or supporting transmitting the uplink signal with full power with any two antenna ports.

Optionally, the target resource includes at least two sounding reference signal resources. The processor 501 implements the following steps when executing the computer program:

judging whether the number of antenna ports of the first resource are the same, and obtain a second determination result;

determining the transmission power of the uplink signal according to the second determination result.

Optionally, the processor 501 implements the following steps when executing the computer program:

when the second determination result indicates that the number of antenna ports of the first resource is the same and is greater than 1, multiplying the predetermined first basic power by a first ratio to obtain the first scaling power, and splitting the first scaling power equally across the antenna ports on which the UE transmits the uplink signal with non-zero power, wherein the first ratio is $N/M_1$, and N represents the number of antenna ports with a non-zero transmission power of the uplink signal, $M_1$ represents the maximum number of antenna ports supported by the terminal in one SRS resource;

when the second determination result indicates that at least part of the numbers of antenna ports of the first resource is different, multiplying the predetermined first basic power by a second ratio to obtain the second scaling power, and splitting the second scaling power equally across the antenna ports on which the UE transmits the uplink signal with non-zero power, wherein the second ratio is $N/M_2$, where N represents the number of antenna ports with a non-zero transmission power of the uplink signal, $M_2$ represents the number of antenna ports of the sounding reference signal resource used to determine the precoding matrix of the uplink signal;

or

The determining the transmission power of the uplink signal according to the second determination result includes:

in the case that the second determination result indicates that the number of antenna ports of the first resource is the same and the number of antenna ports of the target resource is greater than 1, multiplying the predetermined first basic power by the first ratio to obtain the first scaling power, and splitting the first scaling power equally across the antenna ports on which the UE transmits the uplink signal with non-zero power, wherein the first ratio is $N/M_1$, and N represents the number of antenna ports with a non-zero transmission power of the uplink signal, $M_1$ represents the maximum number of antenna ports supported by the terminal in one SRS resource;

when the second determination result indicates that at least part of the numbers of antenna ports of the first resource is different, and the number of antenna ports of the sounding reference signal resource indicated by the sounding reference signal resource indicator is less than $M_1$, determining that the uplink signal is transmitted with full power;

when the second determination result indicates that at least part of the numbers of antenna ports of the first resource are different, and the number of antenna ports of the sounding reference signal resource indicated by the sounding reference signal resource indicator is equal to $M_1$, multiplying the predetermined first basic power by a first ratio to obtain the first scaling power, and splitting the first scaling power equally across the antenna ports on which the UE transmits the uplink signal with non-zero power, wherein the first ratio $N/M_1$, N represents the number of antenna ports with a non-zero transmission power of the uplink signal, and $M_1$ represents the maximum number of antenna ports supported by the terminal in one SRS resource;

or

The determining the transmission power of the uplink signal according to the second determination result includes:

in the case that the terminal has the first preset capability, and the second determination result indicates that the number of antenna ports of the first resource is the same and the number of antenna ports of the target resource is greater than 1, multiplying the predetermined first basic power by a first ratio to obtain the first scaling power, and splitting the first scaling power equally across the antenna ports on which the UE transmits the uplink signal with non-zero power, wherein the first ratio is $N/M_1$, N represents the number of antenna ports with a non-zero transmission power of the uplink signal, and $M_1$ represents the maximum number of antenna ports supported by the terminal in one SRS resource;

in the case that the terminal has the first preset capability, and the second determination result indicates that at least part of the numbers of antenna ports of the first resource are different, multiplying the predetermined first basic power by the first ratio to obtain the third scaling power, and splitting the third scaling power equally across the antenna ports on which the UE transmits the uplink signal with non-zero power, wherein the third ratio is $\min\{2*N/M_2, 1\}$, N represents the antenna ports with a non-zero transmission power of the uplink signal, and $M_2$ represents the number of antenna ports of the sounding reference signal resource used to determine the precoding matrix of the uplink signal;

The first preset capability includes at least one of supporting transmitting the uplink signal with full power, supporting being configured with a plurality of sounding reference signal resources for obtaining the channel state information of uplink that associated with different numbers of antenna ports, or supporting transmitting the uplink signal with full power with any two antenna ports.

Optionally, the processor 501 implements the following steps when executing the computer program:

when the configuration information of the target resource is the first preset configuration information, determining the transmission power of the uplink signal according to the capability information of the terminal and/or seventh indication information from the network device;

when the configuration information of the target resource is the second preset configuration information, determining the transmission power of the uplink signal according to a predetermined second power control rule.

Optionally, when the first resource is a sounding reference signal resource indicated by a sounding reference signal resource indicator, the processor 501 implements the following steps when executing the computer program:

in a case that the number of antenna ports of the first resource is a fifth preset value, determining that the uplink signal is transmitted with full power;

in the case that the number of antenna ports of the first resource is a sixth preset value, multiplying the predetermined first basic power by the fourth ratio to obtain the second scaling power, and splitting the second scaling power equally across the antenna ports on which the UE transmits the uplink signal with non-zero power, wherein the fourth ratio is $N/M_3$, where N represents the number of antenna ports with a non-zero transmission power of the uplink signal, and $M_3$ represents the number of antenna ports of the first resource.

Optionally, the processor 501 implements the following steps when executing the computer program:

determining the transmission power of the uplink signal according to a relative relationship between the number of antenna ports of the target resource and the maximum number of antenna ports supported by the terminal in one SRS resource.

Optionally, the processor 501 implements the following steps when executing the computer program:

in a case that the second indication information transmitted by the network device is received, and the second indication information indicates that the transmission power of the uplink signal is determined according to the number of antenna ports of the target resource, determining the transmission power of the uplink signal according to the number of antenna ports of the target resource;

or

In the case that the third indication information transmitted by the network device is received, determining the transmission power of the uplink signal according to the number of antenna ports of the target resource, and the third indication information is used to indicate that the transmission power of the uplink signal is determined according to the number of antenna ports of the target resource.

Optionally, the first indication information is used to indicate a manner in which the terminal determines the transmission power of the uplink signal when the number of antenna ports of the uplink signal is a first preset value;

or

The first indication information is used to indicate a manner in which the terminal determines the transmission power of the uplink signal when the number of antenna ports of the second resource is a second preset value, and the second resource is the sounding reference signal resource used to determine the precoding matrix of the uplink signal.

Optionally, the processor 501 implements the following steps when executing the computer program:

determining the codebook subset corresponding to the uplink signal and/or the overhead of uplink scheduling information according to the number of antenna ports of the target resource, or the number of antenna ports of the first resource in the target resource, or the fourth indication information from the network device;

Wherein, the first resource is a sounding reference signal resource indicated by a sounding reference signal resource indicator, or all sounding reference signal resources of a first sounding reference signal resource set, and the first sounding reference signal resource set is a resource set where the sounding reference signal indicated by the sounding reference signal resource indicator;

The fourth indication information is used to indicate the method of determining the codebook subset corresponding to the uplink signal and/or the overhead of the uplink scheduling information.

Optionally, when the target resource includes at least two sounding reference signal resources, the processor 501 implements the following steps when executing the computer program:

judging whether the number of antenna ports of the target resource is the same, and obtain a third determination result;

determining the codebook subset corresponding to the uplink signal and/or the overhead of uplink scheduling information according to the third determination result;

or

The determining the codebook subset corresponding to the uplink signal and/or the overhead of uplink scheduling information according to the number of antenna ports of the target resource includes:

Obtaining a maximum value of the number of antenna ports of the target resource;

Determining the codebook subset corresponding to the uplink signal and/or the overhead of uplink scheduling information according to the maximum value of the number of antenna ports of the target resource;

or

The determining the codebook subset corresponding to the uplink signal and/or the overhead of uplink scheduling information according to the number of antenna ports of the target resource includes:

in the case that fifth indication information transmitted by the network device is received, and the fifth indication information indicates that the codebook subset corresponding to the uplink signal and/or the overhead of the uplink scheduling information are determined according to the number of antenna ports of the target resource, determining the codebook subset corresponding to the uplink signal and/or the overhead of the uplink scheduling information according to the number of antenna ports of the target resource;

or

The determining the codebook subset corresponding to the uplink signal and/or the overhead of uplink scheduling information according to the number of antenna ports of the target resource includes:

in the case that sixth indication information transmitted by the network device is received, determining the codebook subset corresponding to the uplink signal and/or the overhead of the uplink scheduling information according to the number of antenna ports of the target resource, the sixth indication information is used to indicate to determine the codebook subset corresponding to the uplink signal and/or the overhead of uplink scheduling information according to the number of antenna ports of the target resource.

Optionally, when the first resource is all sounding reference signal resources of the first sounding reference signal resource set, the processor 501 implements the following steps when executing the computer program:

judging whether the numbers of antenna ports of the first resource are the same, and obtaining a fourth determination result;

determining the codebook subset corresponding to the uplink signal and/or the overhead of the uplink scheduling information according to the fourth determination result;

or

The determining the codebook subset corresponding to the uplink signal and/or the overhead of uplink scheduling information according to the number of antenna ports of the first resource in the target resource includes:

Obtaining a maximum value of the number of antenna ports of the first resource;

Determining the codebook subset corresponding to the uplink signal and/or the overhead of the uplink scheduling information according to the maximum value of the number of antenna ports of the first resource;

or

The determining the codebook subset corresponding to the uplink signal and/or the overhead of uplink scheduling information according to the number of antenna ports of the first resource in the target resource includes:

in the case that ninth indication information transmitted by the network device is received, and the ninth indication information indicates that the codebook subset corresponding to the uplink signal and/or the overhead of the uplink scheduling information are determined according to the number of antenna ports of the first resource, determining the codebook subset corresponding to the uplink signal and/or the overhead of the uplink scheduling information according to the number of antenna ports of the first resource;

or

The determining the codebook subset corresponding to the uplink signal and/or the overhead of uplink scheduling information according to the number of antenna ports of the first resource in the target resource includes:

in the case that tenth indication information transmitted by the network device is received, determining the codebook subset corresponding to the uplink signal and/or the overhead of the uplink scheduling information according to the number of antenna ports of the first resource, the tenth indication information is used to indicate to determine the codebook subset corresponding to the uplink signal and/or the overhead of uplink scheduling information according to the number of antenna ports of the first resource.

Optionally, when the first resource is the sounding reference signal resource indicated by the sounding reference signal resource indicator, the processor 501 implements the following steps when executing the computer program:

in the case that the number of antenna ports of the first resource is a third preset number, determining the codebook subset corresponding to the uplink signal and/or the overhead of uplink scheduling information according to the capability information of the terminal and/or the eighth indication information from the network device;

in a case that the number of antenna ports of the first resource is a fourth preset number, determining the codebook subset corresponding to the uplink signal and/or the overhead of uplink scheduling information according to a second preset rule.

Optionally, when the first resource is the sounding reference signal resource indicated by the sounding reference signal resource indicator, the terminal further includes:

determining the overhead of the indication information for precoding information and number of transmission layers according to the number of antenna ports of the first resource.

Optionally, the fourth indication information is used to indicate the method of the terminal determining the codebook subset corresponding to the uplink signal and/or the overhead of the uplink scheduling information when the number of antenna ports of the uplink signal is the third preset value;

or

The fourth indication information is used to indicate the method of the terminal determining the codebook subset corresponding to the uplink signal and/or the overhead of the uplink scheduling information when the number of antenna ports of the second resource is the fourth preset value; the second resource is a sounding reference signal resource used to determine the precoding matrix of the uplink signal.

Optionally, the capability information of the terminal includes at least one of the following:

codebook subset supported by the terminal;

indication information of codebook subset supported by the terminal that can be transmitted with full power, and the codebook subset transmitted with full power means that at least one precoding matrix included in the codebook subset enables the terminal to transmits the uplink signal with full power;

combination of power amplifiers of the terminal for transmitting the uplink signal with full power;

a maximum number of antenna ports in the target resource when all precoding matrices corresponding to the target resource support full power transmission;

a minimum number of antenna ports in the target resource when all precoding matrices corresponding to the target resource support full power transmission;

combination of antenna ports through which the terminal transmits the uplink signal with full power.

It should be noted that in FIG. 5, the bus architecture may include any number of interconnected buses and bridges, and various circuits of one or more processors represented by the processor 501 and the memory represented by the memory 503 are linked together. The bus architecture can also link various other circuits such as peripherals, voltage regulators, power management circuits, etc., which are all known in the art, and therefore, will not be further described herein. The bus interface provides the interface. The transceiver 504 may be a plurality of elements, including a transmitter and a transceiver, and provide a unit for communicating with various other devices on a transmission medium. For different user equipment, the user interface 505 may also be an interface capable of connecting externally and internally with the required equipment. The connected equipment includes but not limited to a keypad, a display, a speaker, a microphone, a joystick, and the like. The processor 501 is responsible for managing the bus architecture and general processing, and the memory 503 can store data used by the processor 501 when performing operations.

Those skilled in the art can understand that all or part of the steps of the above-mentioned embodiments can be implemented by hardware, or by a computer program to instruct relevant hardware. The computer program includes instructions for performing part or all of the steps of the above-mentioned method; and the computer program can be stored in a readable storage medium, which can be any form of storage medium.

Sixth Embodiment

Figure 6:
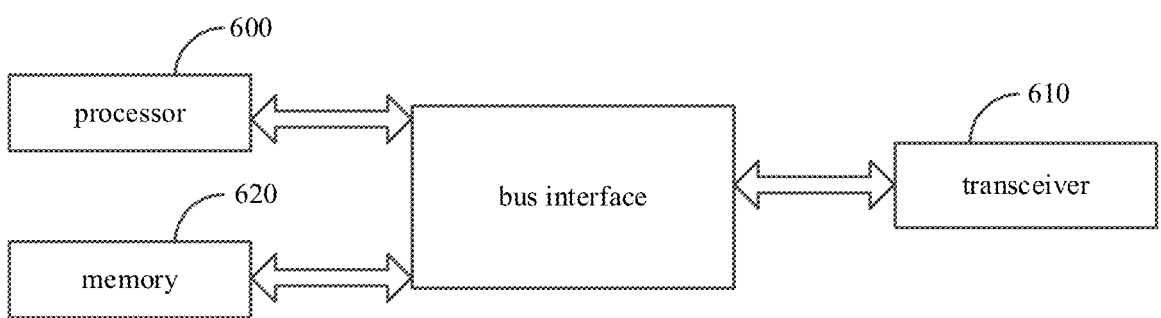
FIG. 6 is a structural block diagram of the network device according to an embodiment of the disclosure.

In order to better achieve the foregoing objective, as shown in FIG. 6, the sixth embodiment of the present disclosure also provides a network device. The network device includes a processor 600, a memory 620 which communicates with the processor 600 through a bus interface, and a transceiver 610 connected to the processor 600 through a bus interface; the memory 620 is used to store programs and data used by the processor when performing operations; data information or pilots are transmitted through the transceiver 610, the uplink control channel is also received through the transceiver 610; when the processor 600 calls and executes the programs and data stored in the memory 620, the following functions are realized:

determining reference power corresponding to a precoding matrix in a codebook subset corresponding to an uplink signal according to configuration information of a target resource or using a power determination method indicated by first indication information transmitted to a terminal, wherein the target resource includes a sounding reference signal resource configured by the network device for obtaining the channel state information of uplink, and the first indication information is used to indicate a method of determining the transmission power of the uplink signal;

determining the uplink scheduling information of uplink according to the reference power corresponding to the precoding matrix in the codebook subset corresponding to the uplink signal;

transmitting the uplink scheduling information to the terminal.

Optionally, the processor 600 implements the following steps when executing the computer program:

determining the reference power corresponding to the precoding matrix in the codebook subset corresponding to the uplink signal according to the number of antenna ports of the target resource or the number of antenna ports of the first resource in the target resource;

Wherein, the first resource is a sounding reference signal resource indicated by a sounding reference signal resource indicator, or all sounding reference signal resources of a first sounding reference signal resource set, and the first sounding reference signal resource set is the resource set in which the sounding reference signal resource indicated by a sounding reference signal resource is configured.

Optionally, the target resource includes at least two sounding reference signal resources, and the processor 600 implements the following steps when executing the computer program:

judging whether the SRS resources in the target resource are with the same number of antenna ports, and obtain a first determination result;

determining the reference power corresponding to the precoding matrix in the codebook subset corresponding to the uplink signal according to the first determination result.

Optionally, the processor 600 implements the following steps when executing the computer program:

in the case that the first determination result indicates that the numbers of antenna ports of the SRS resources in the target resource is the same and the number of antenna ports of the target resource is all greater than 1, determining the reference power corresponding to the precoding matrix in the codebook subset corresponding to the uplink signal is determined according to the following formula:

$$Pi=P0*Ni/M_1;$$

Where, P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_1$ represents the maximum number of antenna ports supported by the terminal in one SRS resource;

in the case that the first determination result indicates that at least part of the number of antenna ports of the SRS resources in the target resource is different, determining the reference power corresponding to the precoding matrix in the codebook subset corresponding to the uplink signal according to the following formula:

$$Pi=P0*Ni/M_2;$$

Wherein, P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_2$ represents the number of antenna ports of the sounding reference signal resource used to determine the precoding matrix of the uplink signal;

or

The determining the reference power corresponding to the precoding matrix in the codebook subset corresponding to the uplink signal according to the first determination result includes:

in the case that the first determination result indicates that the number of antenna ports of the SRS resources in the target resource is the same and the number of antenna ports of the target resource is all greater than 1, determining the reference power corresponding to the precoding matrix in the codebook subset corresponding to the uplink signal according to the following formula:

$$Pi=P0*Ni/M_1;$$

Where, P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_1$ represents the maximum number of antenna ports supported by the terminal in one SRS resource when the first determination result indicates that at least part of the numbers of antenna ports of the target resource is different, and the number of antenna ports of the sounding reference signal resource indicated by the sounding reference signal resource indicator is less than $M_1$, determining the reference power corresponding to the precoding matrix in the codebook subset corresponding to the uplink signal, determine the predetermined second basic power as the reference power corresponding to any precoding matrix in the codebook subset corresponding to the uplink signal;

when the first determination result indicates that at least part of the numbers of antenna ports of the target resource is different, and the number of antenna ports of the sounding reference signal resource indicated by the sounding reference signal resource indicator is equal to $M_1$, determining the reference power corresponding to the precoding matrix in the codebook subset corresponding to the uplink signal according to the following formula:

$$Pi=P0*Ni/M_1;$$

Where, P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_1$ represents the maximum number of antenna ports supported by the terminal in one SRS resource;

or

The determining the reference power corresponding to the precoding matrix in the codebook subset corresponding to the uplink signal according to the first determination result includes:

in the case that the terminal has the first preset capability, and the first determination result indicates that the number of antenna ports of the target resource is the same and the number of antenna ports of the target resource is all greater than 1, determining the reference power corresponding to the precoding matrix in the codebook subset corresponding to the uplink signal according to the following formula:

$$Pi=P0*Ni/M_1;$$

Where, P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_1$ represents the maximum number of antenna ports supported by the terminal in one SRS resource;

in the case that the terminal has the first preset capability, and the first determination result indicates that at least part of the numbers of antenna ports of the target resource are different, determining the reference power corresponding to the precoding matrix in the codebook subset corresponding to the uplink signal according to the following formula:

$$Pi=P0*\min\{2*Ni/M_2,1\};$$

Where, P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_2$ represents the number of antenna ports of the sounding reference signal resource used to determine the precoding matrix of the uplink signal;

The first preset capability includes at least one of supporting transmitting the uplink signal with full power, supporting being configured with a plurality of sounding reference signal resources for obtaining the channel state information of uplink that associated with different numbers of antenna ports, or supporting transmitting the uplink signal with full power with any two antenna ports.

Optionally, the target resource includes at least two sounding reference signal resources, and when the first resource is all sounding reference signal resources of the first sounding reference signal resource set, the processor 600 executes the computer program when implementing the following steps:

judging whether the number of antenna ports of the first resource are the same, and obtaining a second determination result;

determining the reference power corresponding to the precoding matrix in the codebook subset corresponding to the uplink signal according to the second determination result.

Optionally, the processor 600 implements the following steps when executing the computer program:

in the case that the second determination result indicates that the number of antenna ports of the first resource is the same and is greater than 1, determining the reference power corresponding to the precoding matrix in the codebook subset corresponding to the uplink signal according to the following formula:

$$Pi=P0*Ni/M_1;$$

Where P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_1$ represents the maximum number of antenna ports supported by the terminal in one SRS resource;

in the case that the second determination result indicates that at least part of the numbers of antenna ports of the first resource is different, determining the reference power corresponding to the precoding matrix in the codebook subset corresponding to the uplink signal according to the following formula:

$$Pi=P0*Ni/M_2;$$

Where P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, the second ratio is $N/M_2$, where N represents the number of antenna ports with a non-zero transmission power of the uplink signal, and $M_2$ represents the number of antenna ports of the sounding reference signal resource for determining the precoding matrix of the uplink signal;

or

The determining the reference power corresponding to the precoding matrix in the codebook subset corresponding to the uplink signal according to the second determination result includes:

in the case that the second determination result indicates that the number of antenna ports of the first resource is the same and the number of antenna ports of the target resource is all greater than 1, determining the reference power corresponding to the precoding matrix in the codebook subset corresponding to the uplink signal according to the following formula:

$$Pi=P0*Ni/M_1;$$

Where P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, the first ratio is $N/M_1$, where N represents the number of antenna ports with a non-zero transmission power of the uplink signal, and $M_1$ represents the maximum number of antenna ports supported by the terminal in one SRS resource;

when the second determination result indicates that at least part of the numbers of antenna ports of the first resource is different, and the number of antenna ports of the sounding reference signal resource indicated by the sounding reference signal resource indicator is less than $M_1$, determining the reference power corresponding to the precoding matrix in the codebook subset corresponding to the uplink signal, determine the predetermined second basic power as the reference power corresponding to any precoding matrix in the codebook subset corresponding to the uplink signal;

when the second determination result indicates that at least part of the numbers of antenna ports of the first resource is different, and the number of antenna ports of the sounding reference signal resource indicated by the sounding reference signal resource indicator is equal to $M_1$, determining the reference power corresponding to the precoding matrix in the codebook subset corresponding to the uplink signal according to the following formula:

$$Pi=P0*Ni/M_1;$$

Where P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_1$ represents the maximum number of antenna ports supported by the terminal in one SRS resource;

or

The determining the reference power corresponding to the precoding matrix in the codebook subset corresponding to the uplink signal according to the second determination result includes:

in the case that the terminal has the first preset capability, and the second determination result indicates that the number of antenna ports of the first resource is the same and the number of antenna ports of the target resource is all greater than 1, determining the reference power corresponding to the precoding matrix in the codebook subset corresponding to the uplink signal according to the following formula:

$$Pi=P0*Ni/M_1;$$

Where P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_1$ represents the maximum number of antenna ports supported by the terminal in one SRS resource;

in the case that the terminal has the first preset capability, and the second determination result indicates that at least part of the numbers of antenna ports of the first resource are different, determining the reference power corresponding to the precoding matrix in the codebook subset corresponding to the uplink signal according the following formula:

$$Pi=P0*\min\{2*Ni/M_2,1\};$$

Where P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, where $M_2$ represents the number of antenna ports of the sounding reference signal resource for determining the precoding matrix of the uplink signal;

The first preset capability includes at least one of supporting transmitting the uplink signal with full power, supporting being configured with a plurality of sounding reference signal resources for obtaining the channel state information of uplink that associated with different numbers of antenna ports, or supporting transmitting the uplink signal with full power with any two antenna ports.

Optionally, the processor 600 implements the following steps when executing the computer program:

determining the reference power corresponding to the precoding matrix in the codebook subset corresponding to the uplink signal according to the capability information of the terminal and/or seventh indication information from the network device when the configuration information of the target resource is the first preset configuration information;

determining the reference power corresponding to the precoding matrix in the codebook subset corresponding to the uplink signal according to the predetermined second power control rule when the configuration information of the target resource is the second preset configuration information.

Optionally, when the first resource is a sounding reference signal resource indicated by a sounding reference signal resource indicator, the processor 600 implements the following steps when executing the computer program:

determining the predetermined second basic power as the reference power corresponding to any one of the precoding matrixes in the codebook subset corresponding to the uplink signal when the number of antenna ports of the first resource is a fifth preset value;

when the number of antenna ports of the first resource is a sixth preset value, determining the reference power corresponding to the precoding matrix in the codebook subset corresponding to the uplink signal according to the following formula:

$$Pi=P0*Ni/M_3;$$

Where P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_3$ represents the number of antenna ports of the first resource.

Optionally, the processor 600 implements the following steps when executing the computer program:

determining the reference power corresponding to the precoding matrix in the codebook subset corresponding to the uplink signal according to a relative relationship between the number of antenna ports of the target resource and the maximum number of antenna ports supported by the terminal in one SRS resource.

Optionally, the processor 600 implements the following steps when executing the computer program:

in a case that the second indication information transmitted by the network device is received, and the second indication information indicates that the reference power corresponding to the precoding matrix in the codebook subset corresponding to the uplink signal is determined according to the number of antenna ports of the target resource, determining the reference power corresponding to the precoding matrix in the codebook subset corresponding to the uplink signal according to the number of antenna ports of the target resource;

or

In the case that the third indication information transmitted by the network device is received, determining the reference power corresponding to the precoding matrix in the codebook subset corresponding to the uplink signal according to the number of antenna ports of the target resource, and the third indication information is used to indicate that the reference power corresponding to the precoding matrix in the codebook subset corresponding to the uplink signal is determined according to the number of antenna ports of the target resource.

Optionally, the first indication information is used to indicate a manner in which the terminal determines the reference power corresponding to the precoding matrix in the codebook subset corresponding to the uplink signal when the number of antenna ports of the uplink signal is a first preset value;

or

The first indication information is used to indicate a manner in which the terminal determines the reference power corresponding to the precoding matrix in the codebook subset corresponding to the uplink signal when the number of antenna ports of the second resource is a second preset value, and the second resource is the sounding reference signal resource used to determine the precoding matrix of the uplink signal.

Optionally, the processor 600 implements the following steps when executing the computer program:

determining the codebook subset corresponding to the uplink signal and/or the overhead of uplink scheduling information according to the number of antenna ports of the target resource, or the number of antenna ports of the first resource in the target resource, or the fourth indication information from the network device;

Wherein, the first resource is a sounding reference signal resource indicated by a sounding reference signal resource indicator, or all sounding reference signal resources of a first sounding reference signal resource set, and the first sounding reference signal resource set is a resource set where the sounding reference signal indicated by the sounding reference signal resource indicator;

The fourth indication information is used to indicate the method of determining the codebook subset corresponding to the uplink signal and/or the overhead of the uplink scheduling information.

Optionally, when the target resource includes at least two sounding reference signal resources, the processor 600 implements the following steps when executing the computer program:

judging whether the number of antenna ports of the target resource is the same, and obtain a third determination result;

determining the codebook subset corresponding to the uplink signal and/or the overhead of the uplink scheduling information according to the third determination result;

or

The determining the codebook subset corresponding to the uplink signal and/or the overhead of uplink scheduling information according to the number of antenna ports of the target resource includes:

Obtaining a maximum value of the number of antenna ports of the target resource;

Determining the codebook subset corresponding to the uplink signal and/or the overhead of the uplink scheduling information according to the maximum value of the number of antenna ports of the target resource;

or

The determining the codebook subset corresponding to the uplink signal and/or the overhead of uplink scheduling information according to the number of antenna ports of the target resource includes:

in the case that the fifth indication information transmitted by the network device is received, and the fifth indication information indicates that the codebook subset corresponding to the uplink signal and/or the overhead of the uplink scheduling information are determined according to the number of antenna ports of the target resource, determining the codebook subset corresponding to the uplink signal and/or the overhead of the uplink scheduling information according to the number of antenna ports of the target resource;

or

The determining the codebook subset corresponding to the uplink signal and/or the overhead of uplink scheduling information according to the number of antenna ports of the target resource includes:

in the case that the sixth indication information transmitted by the network device is received, determining the codebook subset corresponding to the uplink signal and/or the overhead of the uplink scheduling information according to the number of antenna ports of the target resource, the sixth indication information is used to indicate to determine the codebook subset corresponding to the uplink signal and/or the overhead of uplink scheduling information according to the number of antenna ports of the target resource.

Optionally, when the first resource is all sounding reference signal resources of the first sounding reference signal resource set, the processor 600 implements the following steps when executing the computer program:

judging whether the numbers of antenna ports of the first resource are the same, and obtain a fourth determination result;

determining the codebook subset corresponding to the uplink signal and/or the overhead of the uplink scheduling information according to the fourth determination result;

or

The determining the codebook subset corresponding to the uplink signal and/or the overhead of uplink scheduling information according to the number of antenna ports of the first resource in the target resource includes:

Obtaining a maximum value of the number of antenna ports of the first resource;

Determining the codebook subset corresponding to the uplink signal and/or the overhead of the uplink scheduling information according to the maximum value of the number of antenna ports of the first resource;

or

The determining the codebook subset corresponding to the uplink signal and/or the overhead of uplink scheduling information according to the number of antenna ports of the first resource in the target resource includes:

in the case that ninth indication information transmitted by the network device is received, and the ninth indication information indicates that the codebook subset corresponding to the uplink signal and/or the overhead of the uplink scheduling information are determined according to the number of antenna ports of the first resource, determining the codebook subset corresponding to the uplink signal and/or the overhead of the uplink scheduling information is determined according to the number of antenna ports of the first resource;

or

The determining the codebook subset corresponding to the uplink signal and/or the overhead of uplink scheduling information according to the number of antenna ports of the first resource in the target resource includes:

in the case that tenth indication information transmitted by the network device is received, determining the codebook subset corresponding to the uplink signal and/or the overhead of the uplink scheduling information according to the number of antenna ports of the first resource, the tenth indication information is used to indicate to determine the codebook subset corresponding to the uplink signal and/or the overhead of uplink scheduling information according to the number of antenna ports of the first resource.

Optionally, when the first resource is a sounding reference signal resource indicated by a sounding reference signal resource indicator, the processor 600 implements the following steps when executing the computer program:

in the case that the number of antenna ports of the first resource is a third preset number, determining the codebook subset corresponding to the uplink signal and/or the overhead of uplink scheduling information according to the capability information of the terminal and/or the eighth indication information from the network device;

in a case that the number of antenna ports of the first resource is a fourth preset number, determining the codebook subset corresponding to the uplink signal and/or the overhead of uplink scheduling information according to a second preset rule.

Optionally, when the first resource is the sounding reference signal resource indicated by the sounding reference signal resource indicator, the processor 600 implements the following steps when executing the computer program:

determining the overhead of the indication information for precoding information and number of transmission layers according to the number of antenna ports of the first resource.

Optionally, the fourth indication information is used to indicate the method of the terminal determining the codebook subset corresponding to the uplink signal and/or the overhead of the uplink scheduling information when the number of antenna ports of the uplink signal is the third preset value;

or

The fourth indication information is used to indicate the method of the terminal determining the codebook subset corresponding to the uplink signal and/or the overhead of the uplink scheduling information when the number of antenna ports of the second resource is the fourth preset value; the second resource is a sounding reference signal resource used to determine the precoding matrix of the uplink signal.

Optionally, the capability information of the terminal includes at least one of the following:

codebook subset supported by the terminal;

indication information of codebook subset supported by the terminal that can be transmitted with full power, and the codebook subset transmitted with full power means that at least one precoding matrix included in the codebook subset enables the terminal to transmits the uplink signal with full power;

combination of power amplifiers of the terminal for transmitting the uplink signal with full power;

a maximum number of antenna ports in the target resource when all precoding matrices corresponding to the target resource support full power transmission;

a minimum number of antenna ports in the target resource when all precoding matrices corresponding to the target resource support full power transmission;

combination of antenna ports through which the terminal transmits the uplink signal with full power.

Wherein, in FIG. 6, the bus architecture may include any number of interconnected buses and bridges. Specifically, various circuits of one or more processors represented by the processor 600 and the memory represented by the memory 620 are linked together. The bus architecture can also link various other circuits such as peripherals, voltage regulators, power management circuits, etc., which are all known in the art, and therefore, will not be further described herein. The bus interface provides the interface. The transceiver 610 may be a plurality of elements, including a transmitter and a transceiver, and provide a unit for communicating with various other devices on a transmission medium. The processor 600 is responsible for managing the bus architecture and general processing, and the memory 620 can store data used by the processor 600 when performing operations.

Those skilled in the art can understand that all or part of the steps of the above-mentioned embodiments can be implemented by hardware, or by a computer program to instruct relevant hardware. The computer program includes instructions for performing part or all of the steps of the above-mentioned method; and the computer program can be stored in a readable storage medium, which can be any form of storage medium.

In addition, it should be pointed out that in the device and method of the present disclosure, obviously, each component or each step can be decomposed and/or recombined. These decomposition and/or recombination should be regarded as equivalent solutions of the present disclosure. In addition, the steps of performing the above series of processing can naturally be performed in a time sequence according to the order of description, but it is not necessary to be performed in a time sequence, and some steps can be performed in parallel or independently of each other. Those of ordinary skill in the art can understand that all or any of the steps or components of the methods and devices of the present disclosure can be used in any computing device (including a processor, storage medium, etc.) or a network of computing devices, using hardware, software, firmware, or a combination of them. This can be achieved by those of ordinary skill in the art using their basic programming skills after reading the description of the present disclosure.

Therefore, the objective of the present disclosure can also be realized by running a program or a group of programs on any computing device. The computing device may be a well-known general-purpose device. Therefore, the objective of the present disclosure can also be achieved only by providing a program product containing program code for implementing the method or device. That is, such a program product also constitutes the present disclosure, and a storage medium storing such a program product also constitutes the present disclosure. Obviously, the storage medium may be any well-known storage medium or any storage medium developed in the future. It should also be pointed out that in the device and method of the present disclosure, obviously, each component or each step can be decomposed and/or recombined. These decomposition and/or recombination should be regarded as equivalent solutions of the present disclosure. In addition, the steps of performing the above-mentioned series of processing can naturally be performed in a time sequence according to the order of description, but it is not necessary to be performed in a time sequence. Certain steps can be performed in parallel or independently of each other.

A person of ordinary skill in the art may be aware that the units and algorithm steps of the examples described in combination with the embodiments disclosed herein can be implemented by electronic hardware or a combination of computer software and electronic hardware. Whether these functions are executed by hardware or software depends on the specific application and design constraint conditions of the technical solution. Professionals and technicians can use different methods for each specific application to implement the described functions, but such implementation should not be considered as going beyond the scope of the present disclosure.

Those skilled in the art can clearly understand that, for the convenience and conciseness of description, the specific working process of the above-described system, device, and unit can refer to the corresponding process in the foregoing method embodiment, which will not be repeated here.

In the embodiments provided in this application, it should be understood that the disclosed device and method may be implemented in other ways. For example, the device embodiments described above are merely illustrative, for example, the division of the units is only a logical function division, and there may be other divisions in actual implementation, for example, multiple units or components can be combined or can be integrated into another system, or some features can be ignored or not implemented. In addition, the displayed or discussed mutual coupling or direct coupling or communication connection may be indirect coupling or communication connection through some interfaces, devices or units, and may be in electrical, mechanical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the present disclosure may be integrated into one processing unit, or each unit may exist alone physically, or two or more units may be integrated into one unit.

If the function is implemented in the form of a software functional unit and sold or used as an independent product, it can be stored in a computer readable storage medium. Based on this understanding, the technical solution of the present disclosure can be embodied in the form of a software product in essence or a part that contributes to the related technology. The computer software product is stored in a storage medium and includes several instructions to make a computer device (which may be a personal computer, a server, or a network device, etc.) to execute all or part of the steps of the methods described in the various embodiments of the present disclosure. The aforementioned storage media include: U disk, mobile hard disk, ROM, RAM, magnetic disk or optical disk and other media that can store program codes.

A person of ordinary skill in the art can understand that all or part of the processes in the above-mentioned embodiment methods can be implemented by controlling the relevant hardware through a computer program. The program can be stored in a computer readable storage medium. When executed, it may include the procedures of the above-mentioned method embodiments. Wherein, the storage medium may be a magnetic disk, an optical disk, a read-only memory (ROM), or a random access memory (RAM), etc.

It can be understood that the embodiments described in the present disclosure may be implemented by hardware, software, firmware, middleware, microcode, or a combination thereof. For hardware implementation, modules, units, and sub-units can be implemented in one or more Application Specific Integrated Circuits (ASIC), Digital Signal Processor (DSP), and DSP Device (DSPD), programmable logic devices (PLD), Field-Programmable Gate Array (FPGA), general-purpose processors, controllers, microcontrollers, microprocessors, other electronic units used to implement the functions of the present disclosure or combinations thereof.

For software implementation, the technology described in the embodiments of the present disclosure can be implemented by modules (for example, procedures, functions, etc.) that perform the functions described in the embodiments of the present disclosure. The software codes can be stored in the memory and executed by the processor. The memory can be implemented in the processor or external to the processor.

The above are optional implementations of the present disclosure. It should be pointed out that for those of ordinary skill in the art, several improvements and modifications can be made without departing from the principles of the present disclosure. These improvements and modifications should also be regarded as the protection scope of the present disclosure.

Seventh Embodiment

B1. An uplink transmission method, including:
  determining the codebook subset corresponding to the uplink signal and/or the overhead of uplink scheduling information according to the number of antenna ports of the target resource, or the number of antenna ports of the first resource in the target resource, or the fourth indication information from the network device, wherein the target resource includes a sounding reference signal resource configured by the network device to obtain channel state information of uplink;
  Wherein, the first resource is a sounding reference signal resource indicated by a sounding reference signal resource indicator, or all sounding reference signal resources of a first sounding reference signal resource set, and the first sounding reference signal resource set is a resource set where the sounding reference signal indicated by the sounding reference signal resource indicator;
  The fourth indication information is used to indicate the method of determining the codebook subset corresponding to the uplink signal and/or the overhead of the uplink scheduling information.

B2. The uplink transmitting method according to B1, wherein when the target resource includes at least two sounding reference signal resources, determining the codebook corresponding to the uplink signal and the overhead of the uplink scheduling information according to the number of antenna ports of the target resource includes:
  Determining whether the number of antenna ports of the target resource is the same, and obtaining a third determination result;
  Determining the codebook subset corresponding to the uplink signal and/or the overhead of uplink scheduling information according to the third determination result;
  or
  The determining the codebook subset corresponding to the uplink signal and/or the overhead of uplink scheduling information according to the number of antenna ports of the target resource includes:
  Obtaining the maximum value of the number of antenna ports of the target resource;
  Determining the codebook subset corresponding to the uplink signal and/or the overhead of uplink scheduling information according to the maximum value of the number of antenna ports of the target resource;
  or
  The determining the codebook subset corresponding to the uplink signal and/or the overhead of uplink scheduling information according to the number of antenna ports of the target resource includes:
  in the case that fifth indication information transmitted by the network device is received, and the fifth indication information indicates that the codebook subset corresponding to the uplink signal and/or the overhead of the uplink scheduling information are determined according to the number of antenna ports of the target resource, determining the codebook subset corresponding to the uplink signal and/or the overhead of the uplink scheduling information according to the number of antenna ports of the target resource;
  or
  The determining the codebook subset corresponding to the uplink signal and/or the overhead of uplink scheduling information according to the number of antenna ports of the target resource includes:
  in the case that sixth indication information transmitted by the network device is received, determining the codebook subset corresponding to the uplink signal and/or the overhead of the uplink scheduling information according to the number of antenna ports of the target resource, the sixth indication information is used to indicate to determine the codebook subset corresponding to the uplink signal and/or the overhead of uplink scheduling information according to the number of antenna ports of the target resource.

B3. The uplink transmitting method according to B1, wherein when the first resource is all the sounding reference signal resources of the first sounding reference signal resource set, the determining the codebook subset corresponding to the uplink signal and/or the overhead of uplink scheduling information according to the number of antenna ports of the target resource includes:
  judging whether the numbers of antenna ports of the first resource are the same, and obtaining a fourth determination result;
  determining the codebook subset corresponding to the uplink signal and/or the overhead of the uplink scheduling information according to the fourth determination result;
  or
  The determining the codebook subset corresponding to the uplink signal and/or the overhead of uplink scheduling information according to the number of antenna ports of the first resource in the target resource includes:
  Obtaining a maximum value of the number of antenna ports of the first resource;
  determining the codebook subset corresponding to the uplink signal and/or the overhead of the uplink scheduling information according to the maximum value of the number of antenna ports of the first resource;
  or
  The determining the codebook subset corresponding to the uplink signal and/or the overhead of uplink scheduling information according to the number of antenna ports of the first resource in the target resource includes:
  in the case that ninth indication information transmitted by the network device is received, and the ninth indication information indicates that the codebook subset corresponding to the uplink signal and/or the overhead of the uplink scheduling information are determined according to the number of antenna ports of the first resource, determining the codebook subset corresponding to the uplink signal and/or the overhead of the uplink scheduling information according to the number of antenna ports of the first resource;
  or
  The determining the codebook subset corresponding to the uplink signal and/or the overhead of uplink scheduling information according to the number of antenna ports of the first resource in the target resource includes:

in the case that tenth indication information transmitted by the network device is received, determining the codebook subset corresponding to the uplink signal and/or the overhead of the uplink scheduling information according to the number of antenna ports of the first resource, the tenth indication information is used to indicate to determine the codebook subset corresponding to the uplink signal and/or the overhead of uplink scheduling information according to the number of antenna ports of the first resource.

B4. The uplink transmitting method according to B1, wherein, when the first resource is a sounding reference signal resource indicated by a sounding reference signal resource indication, the determining the codebook subset corresponding to the uplink signal and/or the overhead of uplink scheduling information according to the number of antenna ports of the first resource in the target resource includes:

in the case that the number of antenna ports of the first resource is a third preset number, determining the codebook subset corresponding to the uplink signal and/or the overhead of uplink scheduling information according to the capability information of the terminal and/or the eighth indication information from the network device;

in a case that the number of antenna ports of the first resource is a fourth preset number, determining the codebook subset corresponding to the uplink signal and/or the overhead of uplink scheduling information according to a second preset rule.

B5. The uplink transmitting method according to B1, wherein when the first resource is a sounding reference signal resource indicated by a sounding reference signal resource indicator, the method further includes:

determining the overhead of the indication information for precoding information and number of transmission layers according to the number of antenna ports of the first resource.

B6. The uplink transmitting method according to B1, wherein the fourth indication information is used to indicate the method of the terminal determining the codebook subset corresponding to the uplink signal and/or the overhead of the uplink scheduling information when the number of antenna ports of the uplink signal is the third preset value;

or

The fourth indication information is used to indicate the method of the terminal determining the codebook subset corresponding to the uplink signal and/or the overhead of the uplink scheduling information when the number of antenna ports of the second resource is the fourth preset value; the second resource is a sounding reference signal resource used to determine the precoding matrix of the uplink signal.

B7. The uplink transmitting method according to B4, wherein the capability information of the terminal includes at least one of the following:

codebook subset supported by the terminal;

indication information of codebook subset supported by the terminal that can be transmitted with full power, and the codebook subset transmitted with full power means that at least one precoding matrix included in the codebook subset enables the terminal to transmits the uplink signal with full power;

combination of power amplifiers of the terminal for transmitting the uplink signal with full power;

a maximum number of antenna ports in the target resource when all precoding matrices corresponding to the target resource support full power transmission;

a minimum number of antenna ports in the target resource when all precoding matrices corresponding to the target resource support full power transmission;

combination of antenna ports through which the terminal transmits the uplink signal with full power.

B8. A network device, comprising: a transceiver, a memory, a processor, and a computer program stored in the memory and executed by the processor, wherein the processor implements the following steps when the computer program is executed:

determining the codebook subset corresponding to the uplink signal and/or the overhead of uplink scheduling information according to the number of antenna ports of the target resource, or the number of antenna ports of the first resource in the target resource, or the fourth indication information from the network device, wherein the target resource includes a sounding reference signal resource configured by the network device to obtain channel state information of uplink;

Wherein, the first resource is a sounding reference signal resource indicated by a sounding reference signal resource indicator, or all sounding reference signal resources of a first sounding reference signal resource set, and the first sounding reference signal resource set is a resource set where the sounding reference signal indicated by the sounding reference signal resource indicator;

The fourth indication information is used to indicate the method of determining the codebook subset corresponding to the uplink signal and/or the overhead of the uplink scheduling information.

B9. A network device, including:

a seventh determining sub-module, configured to determine the codebook subset corresponding to the uplink signal and/or the overhead of uplink scheduling information according to the number of antenna ports of the target resource, or the number of antenna ports of the first resource in the target resource, or the fourth indication information from the network device, wherein the target resource includes a sounding reference signal resource configured by the network device to obtain channel state information of uplink;

Wherein, the first resource is a sounding reference signal resource indicated by a sounding reference signal resource indicator, or all sounding reference signal resources of a first sounding reference signal resource set, and the first sounding reference signal resource set is a resource set where the sounding reference signal indicated by the sounding reference signal resource indicator;

The fourth indication information is used to indicate the method of determining the codebook subset corresponding to the uplink signal and/or the overhead of the uplink scheduling information.

B10. A computer-readable storage medium on which a computer program is stored, and when the computer program is executed by a processor, the steps of the uplink transmitting method according to at least one of B1 to B7 are implemented.

What is claimed is:

1. An uplink transmission method, applied to a terminal, comprising:

receiving uplink scheduling information of an uplink signal;

determining transmission power of the uplink signal according to configuration information of at least two target resources, wherein the at least two target resources include a sounding reference signal resource configured by the network device for obtaining channel state information;

transmitting the uplink signal according to the transmission power and the uplink scheduling information, wherein the determining the transmission power of the uplink signal according to the configuration information of the at least two target resources comprises:

determining the transmission power of the uplink signal according to a number of antenna ports of a sounding reference signal resource, in the at least two target resources, indicated by a sounding reference signal resource indicator;

wherein, the method further comprises:

determining an overhead of the uplink scheduling information according to the number of antenna ports of all sounding reference signal resources of a first sounding reference signal resource set in the at least two target resources, wherein the first sounding reference signal resource set is a resource set in which the sounding reference signal resource indicated by the sounding reference signal resource indicator is configured, wherein the determining the overhead of the uplink scheduling information according to the number of antenna ports of all sounding reference signal resources of the first sounding reference signal resource set in the at least two target resources includes:

determining whether the number of antenna ports of all sounding reference signal resources of the first sounding reference signal resource set in the at least two target resources are the same, and obtaining a third determination result;

determining the overhead of uplink scheduling information according to the third determination result;

or the determining the overhead of uplink scheduling information according to the number of antenna ports of all sounding reference signal resources of a first sounding reference signal resource set in the at least two target resources includes:

obtaining a maximum value of the numbers of antenna ports of all sounding reference signal resources of the first sounding reference signal resource set in the at least two target resources;

determining the overhead of uplink scheduling information according to the maximum value of the numbers of antenna ports of all sounding reference signal resources of the first sounding reference signal resource set in the at least two target resources.

2. The uplink transmission method according to claim 1, wherein the determining the transmission power of the uplink signal according to the number of antenna ports of the sounding reference signal resource, in the at least two target resources, indicated by the sounding reference signal resource indicator, includes:

determining whether at least two sounding reference signal resources in the at least two target resources are with the same number of antenna ports, and obtaining a first determination result;

determining the transmission power of the uplink signal according to the first determination result.

3. The uplink transmission method according to claim 1, wherein the determining the transmission power of the uplink signal according to the configuration information of the at least two target resources comprises:

when the configuration information of the at least two target resources is first preset configuration information, determining the transmission power of the uplink signal according to capability information of the terminal and/or seventh indication information from the network device; or when the configuration information of the at least two target resources is second preset configuration information, determining the transmission power of the uplink signal according to a predetermined second power control rule.

4. The uplink transmitting method according to claim 1, wherein the determining the transmission power of the uplink signal according to the number of antenna ports of the sounding reference signal resource, in the at least two target resources, indicated by the sounding reference signal resource indicator includes:

in a case that the number of antenna ports of the sounding reference signal resource is a fifth preset value, determining that the uplink signal is transmitted with full power; or in the case that the number of antenna ports of the sounding reference signal resource is a sixth preset value, multiplying a predetermined first basic power by a fourth ratio to obtain a second scaling power, and splitting the second scaling power equally across the antenna ports on which the terminal transmits the uplink signal with non-zero power, wherein the fourth ratio is $N/M_3$, N represents the number of antenna ports with a non-zero transmission power of the uplink signal, and $M_3$ represents the number of antenna ports of the sounding reference signal resource.

5. The uplink transmission method according to claim 1, wherein the determining the transmission power of the uplink signal according to the number of antenna ports of the sounding reference signal resource, in the at least two target resources, indicated by a sounding reference signal resource indicator comprises:

determining the transmission power of the uplink signal according to a relative relationship between the number of antenna ports of the sounding reference signal resource and the maximum number of antenna ports supported by the terminal in one sounding reference signal resource.

6. The uplink transmitting method according to claim 1, wherein, the uplink scheduling information comprises indication information for precoding information and a quantity of transmission layers.

7. The uplink transmitting method according to claim 1, wherein, the method further comprises:

determining a codebook subset corresponding to the uplink signal according to the number of antenna ports of the sounding reference signal resource, the determining the codebook subset corresponding to the uplink signal according to the number of antenna ports of the sounding reference signal resource includes:

obtaining a maximum value of the numbers of antenna ports of at least two sounding reference signal resources in the at least two target resources;

determining the codebook subset corresponding to the uplink signal according to the maximum value of the numbers of antenna ports of at least two sounding reference signal resources in the at least two target resources;

or the determining the codebook subset corresponding to the uplink signal according to the number of antenna ports of the at least two target resources includes:

in the case that fifth indication information transmitted by the network device is received, and the fifth indication information indicates that the codebook subset corresponding to the uplink signal is determined according to the number of antenna ports of the at least two target resources, determining the codebook subset corresponding to the uplink signal according to the number of antenna ports of the at least two target resources;

or the determining the codebook subset corresponding to the uplink signal according to the number of antenna ports of the at least two target resources includes:

in the case that sixth indication information transmitted by the network device is received, determining the codebook subset corresponding to the uplink signal according to the number of antenna ports of the at least two target resources, wherein the sixth indication information is used to indicate to determine the codebook subset corresponding to the uplink signal according to the number of antenna ports of the at least two target resources.

8. The uplink transmitting method according to claim 3, wherein the capability information of the terminal includes at least one of the following:

a codebook subset supported by the terminal;

indication information of a codebook subset supported by the terminal that can be transmitted with full power, and the codebook subset transmitted with full power means that at least one precoding matrix included in the codebook subset enables the terminal to transmits the uplink signal with full power;

combination of power amplifiers of the terminal for transmitting the uplink signal with full power;

a maximum number of antenna ports in the at least two target resources when all precoding matrices corresponding to the at least two target resources support full power transmission;

a minimum number of antenna ports in the at least two target resources when all precoding matrices corresponding to the at least two target resources support full power transmission;

combination of antenna ports through which the terminal transmits the uplink signal with full power.

9. An uplink transmission method, applied to a network device, including:

determining a reference power corresponding to a precoding matrix in a codebook subset corresponding to an uplink signal according to configuration information of at least two a target resources, wherein the at least two target resources include a sounding reference signal resource configured by the network device for obtaining channel state information;

determining uplink scheduling information of the uplink signal according to the reference power corresponding to the precoding matrix in the codebook subset corresponding to the uplink signal;

transmitting the uplink scheduling information to the terminal, wherein the determining the reference power corresponding to the precoding matrix in the codebook subset corresponding to the uplink signal according to the configuration information of the at least two target resources comprises:

determining the reference power corresponding to the precoding matrix in the codebook subset corresponding to the uplink signal according to a number of antenna ports of a sounding reference signal resource in the at least two target resources;

wherein the method further comprises:

determining an overhead of the uplink scheduling information according to the number of antenna ports of all sounding reference signal resources of a first sounding reference signal resource set in the at least two target resources, wherein the first sounding reference signal resource set is a resource set in which the sounding reference signal resource indicated by the sounding reference signal resource indicator is configured, wherein the determining the overhead of the uplink scheduling information according to the number of antenna ports of all sounding reference signal resources of the first sounding reference signal resource set in the at least two target resources includes:

determining whether the number of antenna ports of all sounding reference signal resources of the first sounding reference signal resource set in the at least two target resources are the same, and obtaining a third determination result;

determining the overhead of uplink scheduling information according to the third determination result;

or the determining the overhead of uplink scheduling information according to the number of antenna ports of all sounding reference signal resources of a first sounding reference signal resource set in the at least two target resources includes:

obtaining a maximum value of the numbers of antenna ports of all sounding reference signal resources of the first sounding reference signal resource set in the at least two target resources;

determining the overhead of uplink scheduling information according to the maximum value of the numbers of antenna ports of all sounding reference signal resources of the first sounding reference signal resource set in the at least two target resources.

10. The uplink transmission method according to claim 9, wherein the determining the reference power corresponding to the precoding matrix in the codebook subset corresponding to the uplink signal according to the number of antenna ports of the sounding reference signal resource, in the at least two target resources, indicated by the sounding reference signal resource indicator comprises:

determining whether at least two sounding reference signal resources in the at least two target resources are with the same number of antenna ports, and obtaining a first determination result;

determining the reference power corresponding to the precoding matrix in the codebook subset corresponding to the uplink signal according to the first determination result.

11. The uplink transmission method according to claim 9, wherein the determining the reference power corresponding to the precoding matrix in the codebook subset corresponding to the uplink signal according to the configuration information of the at least two target resources comprises:

determining the reference power corresponding to the precoding matrix in the codebook subset corresponding to the uplink signal according to capability information of the terminal and/or seventh indication information from the network device when the configuration information of the at least two target resources is first preset configuration information; or determining the reference power corresponding to the precoding matrix in the codebook subset corresponding to the uplink signal according to a predetermined second power control rule when the configuration information of the at least two target resources is second preset configuration information.

12. A user equipment, comprising: a transceiver, a memory, a processor, and a computer program stored in the memory and executed by the processor, wherein the computer program is executed by the processor to implement the following steps:

receiving uplink scheduling information of an uplink signal;

determining transmission power of the uplink signal according to configuration information of at least two target resources, wherein the at least target resources includes a sounding reference signal resource configured by the network device for obtaining channel state information;

transmitting the uplink signal according to the transmission power and the uplink scheduling information, wherein the determining the transmission power of the uplink signal according to the configuration information of the at least two target resources comprises:

determining the transmission power of the uplink signal according to a number of antenna ports of a sounding reference signal resource, in the at least two target resources, indicated by a sounding reference signal resource indicator;

wherein, the computer program is executed by the processor to further implement:

determining an overhead of the uplink scheduling information according to the number of antenna ports of all sounding reference signal resources of a first sounding reference signal resource set in the at least two target resources, wherein the first sounding reference signal resource set is a resource set in which the sounding reference signal resource indicated by the sounding reference signal resource indicator is configured, wherein the determining the overhead of the uplink scheduling information according to the number of antenna ports of all sounding reference signal resources of the first sounding reference signal resource set in the at least two target resources includes:

determining whether the number of antenna ports of all sounding reference signal resources of the first sounding reference signal resource set in the at least two target resources are the same, and obtaining a third determination result;

determining the overhead of uplink scheduling information according to the third determination result;

or the determining the overhead of uplink scheduling information according to the number of antenna ports of all sounding reference signal resources of a first sounding reference signal resource set in the at least two target resources includes:

obtaining a maximum value of the numbers of antenna ports of all sounding reference signal resources of the first sounding reference signal resource set in the at least two target resources;

determining the overhead of uplink scheduling information according to the maximum value of the numbers of antenna ports of all sounding reference signal resources of the first sounding reference signal resource set in the at least two target resources.

13. A network device, comprising: a transceiver, a memory, a processor, and a computer program stored in the memory and executed by the processor, wherein the computer program is executed by the processor to implement the steps of the uplink transmission method according to claim 9.

14. The uplink transmission method according to claim 10, wherein the determining the reference power corresponding to the precoding matrix in the codebook subset corresponding to the uplink signal according to the first determination result comprises:

in the case that the first determination result indicates that the number of antenna ports of sounding reference signal resources in the at least two target resources is the same and the number of antenna ports of the target resource is greater than 1, determining the reference power corresponding to the precoding matrix in the codebook subset corresponding to the uplink signal according to the following formula:

$$Pi=P0*Ni/M_1;$$

wherein, P0 represents a predetermined second basic power, Ni represents a number of antenna ports with non-zero power corresponding to an i-th precoding matrix in the codebook subset corresponding to the uplink signal, and Pi represents the reference power corresponding to the i-th precoding matrix in the codebook subset corresponding to the uplink signal, $M_1$ represents a maximum number of antenna ports supported by the terminal in one SRS resource;

in the case that the first determination result indicates that at least part of the number of antenna ports of the sounding reference signal resources in the at least two target resources is different, determining the reference power corresponding to the precoding matrix in the codebook subset corresponding to the uplink signal according to the following formula:

$$Pi=P0*Ni/M_2;$$

wherein, P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_2$ represents the number of antenna ports of the sounding reference signal resource used to determine the precoding matrix of the uplink signal;

or the determining the reference power corresponding to the precoding matrix in the codebook subset corresponding to the uplink signal according to the first determination result includes:

in the case that the first determination result indicates that the number of antenna ports of the sounding reference signal resources in the at least two target resources is the same and the number of antenna ports of the at least two target resources is greater than 1, determining the reference power corresponding to the precoding matrix in the codebook subset corresponding to the uplink signal according to the following formula:

$$Pi=P0*Ni/M_1;$$

wherein, P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_1$ represents the maximum number of antenna ports supported by the terminal in one sounding reference signal resource;

when the first determination result indicates that at least part of the numbers of antenna ports of the target resource is different, and the number of antenna ports of the sounding reference signal resource indicated by the sounding reference signal resource indicator is less than $M_1$, determining the reference power corresponding to the precoding matrix in the codebook subset corresponding to the uplink signal, determining the predetermined second basic power as the reference power corresponding to any precoding matrix in the codebook subset corresponding to the uplink signal;

when the first determination result indicates that at least part of the numbers of antenna ports of the at least two target resources is different, and the number of antenna ports of the sounding reference signal resource indicated by the sounding reference signal resource indicator is equal to $M_1$, determining the reference power corresponding to the precoding matrix in the codebook subset corresponding to the uplink signal according to the following formula:

$$Pi=P0*Ni/M_1;$$

wherein, P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_1$ represents the maximum number of antenna ports supported by the terminal in one sounding reference signal resource;

or the determining the reference power corresponding to the precoding matrix in the codebook subset corresponding to the uplink signal according to the first determination result includes:

in the case that the terminal has a first preset capability, and the first determination result indicates that the number of antenna ports of the at least two target resources is the same and the number of antenna ports of the at least two target resources is greater than 1, determining the reference power corresponding to the precoding matrix in the codebook subset corresponding to the uplink signal according to the following formula:

$$Pi=P0*Ni/M_1;$$

wherein, P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_1$ represents the maximum number of antenna ports supported by the terminal in one sounding reference signal resource;

in the case that the terminal has the first preset capability, and the first determination result indicates that at least part of the numbers of antenna ports of the at least two target resources is different, determining the reference power corresponding to the precoding matrix in the codebook subset corresponding to the uplink signal according to the following formula:

$$Pi=P0*\min\{2*Ni/M_2,1\};$$

wherein, P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_2$ represents the number of antenna ports of the sounding reference signal resource used to determine the precoding matrix of the uplink signal;

the first preset capability includes at least one of supporting transmitting the uplink signal with full power, supporting being configured with a plurality of sounding reference signal resources for obtaining the channel state information of uplink that associated with different numbers of antenna ports, or supporting transmitting the uplink signal with full power with any two antenna ports.

15. The uplink transmitting method according to claim 9, wherein, the uplink scheduling information comprises indication information for precoding information and a quantity of transmission layers.

16. The uplink transmitting method according to claim 9, wherein the method further comprises determining a codebook subset corresponding to the uplink signal according to the number of antenna ports of the at least two target resources, wherein the determining the codebook subset corresponding to the uplink signal according to the number of antenna ports of the sounding reference signal resource includes:

obtaining a maximum value of the numbers of antenna ports of at least two sounding reference signal resources in the at least two target resources;

determining the codebook subset corresponding to the uplink signal according to the maximum value of the numbers of antenna ports of the at least two target resources;

or the determining the codebook subset corresponding to the uplink signal according to the number of antenna ports of the at least two target resources includes:

in the case that the fifth indication information transmitted by the network device is received, and the fifth indication information indicates that the codebook subset corresponding to the uplink signal are determined according to the number of antenna ports of the at least two target resources, determining the codebook subset corresponding to the uplink signal according to the number of antenna ports of the at least two target resources;

or the determining the codebook subset corresponding to the uplink signal according to the number of antenna ports of the at least two target resources includes:

in the case that sixth indication information transmitted by the network device is received, determining the codebook subset corresponding to the uplink signal according to the number of antenna ports of the at least two target resources, wherein the sixth indication information is used to indicate to determine the codebook subset corresponding to the uplink signal according to the number of antenna ports of the at least two target resources.

17. The uplink transmitting method according to claim 9, wherein the determining the reference power corresponding to the precoding matrix in the codebook subset corresponding to the uplink signal according to the number of antenna ports of a sounding reference signal resource in the at least two target resources comprises:

determining the predetermined second basic power as the reference power corresponding to any one of the precoding matrixes in the codebook subset corresponding to the uplink signal when the number of antenna ports of the sounding reference signal resource in the at least two target resources is a fifth preset value;

when the number of antenna ports of the sounding reference signal resource in the at least two target resources is a sixth preset value, determining the reference power corresponding to the precoding matrix in the codebook subset corresponding to the uplink signal according to the following formula:

$$Pi=P0*Ni/M_3;$$

wherein P0 represents the predetermined second basic power, Ni represents the number of antenna ports with non-zero power corresponding to the i-th precoding matrix in the codebook subset corresponding to the uplink signal, and Pi represents the reference power corresponding to the i-th precoding matrix in the codebook subset corresponding to the uplink signal, $M_3$ represents the number of antenna ports of the sounding reference signal resource in the at least two target resources.

18. The uplink transmission method according to claim 9, wherein the determining the reference power corresponding to the precoding matrix in the codebook subset corresponding to the uplink signal according to the number of antenna ports of the sounding reference signal resource in the at least two target resources comprises:

determining the reference power corresponding to the precoding matrix in the codebook subset corresponding to the uplink signal according to a relative relationship between the number of antenna ports of the at least two target resource and the maximum number of antenna ports supported by the terminal in one sounding reference signal resource.

19. The uplink transmission method according to claim 9, wherein the determining the reference power corresponding to the precoding matrix in the codebook subset corresponding to the uplink signal according to the number of antenna ports of the sounding reference signal resource in the at least two target resources comprises:

in a case that second indication information transmitted by the network device is received, and the second indication information indicates that the reference power corresponding to the precoding matrix in the codebook subset corresponding to the uplink signal is determined according to the number of antenna ports of the at least two target resources, determining the reference power corresponding to the precoding matrix in the codebook subset corresponding to the uplink signal according to the number of antenna ports of the at least two target resources;

or in the case that third indication information transmitted by the network device is received, determining the reference power corresponding to the precoding matrix in the codebook subset corresponding to the uplink signal according to the number of antenna ports of the at least two target resources, wherein the third indication information is used to indicate that the reference power corresponding to the precoding matrix in the codebook subset corresponding to the uplink signal is determined according to the number of antenna ports of the at least two target resources.

* * * * *